United States Patent

Shimada et al.

Patent Number: 5,694,251
Date of Patent: Dec. 2, 1997

[54] Fθ LENS

[75] Inventors: Katsumi Shimada; Kazuhiro Tsujita; Masaru Noguchi, all of Kanagawa-ken, Japan

[73] Assignee: Fuji Photo Film Co., Ltd., Kanagawa, Japan

[21] Appl. No.: 202,263

[22] Filed: Feb. 25, 1994

[30] Foreign Application Priority Data

| Feb. 26, 1993 | [JP] | Japan | 5-038532 |
| Nov. 18, 1993 | [JP] | Japan | 5-289231 |
| Nov. 18, 1993 | [JP] | Japan | 5-289232 |

[51] Int. Cl.$^6$ ............... G02B 3/00; G02B 26/08; G02B 9/00
[52] U.S. Cl. ............... 359/662; 359/206
[58] Field of Search ............... 359/662, 206

[56] References Cited

U.S. PATENT DOCUMENTS

| 3,973,833 | 8/1976 | Lawson . | |
| 4,179,183 | 12/1979 | Tateoka et al. . | |
| 4,863,250 | 9/1989 | Ishizuka | 359/662 |
| 5,085,350 | 2/1992 | Nishihata | 359/206 |
| 5,087,987 | 2/1992 | Simbal | 359/663 |
| 5,111,325 | 5/1992 | De Jager | 359/662 |
| 5,200,861 | 4/1993 | Moskovich | 359/662 |
| 5,270,851 | 12/1993 | Makino et al. | 359/662 |

FOREIGN PATENT DOCUMENTS

| 0341518 | 11/1989 | European Pat. Off. | G02B 26/10 |
| 189255 | 9/1907 | Germany . | |
| 3127601 | 4/1982 | Germany | G02B 9/16 |
| 4227595 | 2/1993 | Germany | G02B 26/10 |
| 53-137631 | 12/1978 | Japan | 359/662 |
| 61-51289 | 11/1986 | Japan | G02B 13/00 |

OTHER PUBLICATIONS

Patent Abstracts of Japan vol. 15, No. 265 (E-1086) Jul. 5, 1991 and JP-A-03088576 (Brother Ind) Apr. 12, 1991 *abstract.

Patent Abstracts of Japan, vol. 17, No. 360 (P-1569), Jul. 7, 1993 (JP-A-05 053 051, Mar. 5, 1993).

Patent Abstracts of Japan, vol. 15, No. 281 (P-1228), Jul. 17, 1991(JP-A-03 096 936, Apr. 22, 1991).

Primary Examiner—David C. Nelms
Assistant Examiner—Jordan M. Schwartz
Attorney, Agent, or Firm—Sughrue, Mion, Zinn, Macpeak & Seas, PLLC

[57] ABSTRACT

An fθ lens includes first and second lens groups arranged in this order from the entrance pupil side. The first lens group consists of a first lens having a negative or positive refracting power. The second lens group consists of a second lens having a positive refracting power and a third lens having a negative refracting power with the second and third lenses being cemented together. The second lens group has a positive refracting power as a whole. The following formulae (1) to (4) are satisfied.

$$12 \leq v_{d2} - v_{d3} \tag{1}$$

$$-0.035 \leq \Sigma(\phi_i/v_{di}) \leq 0.005 \tag{2}$$

$$0.7 \leq \phi_{23} \leq 2.0 \tag{3}$$

$$0.03 \leq d_{12} \leq 0.20 \tag{4}$$

wherein $\phi_i$ represents the power of i-th lens as numbered from the entrance pupil side standardized on the basis of the power of the whole system, $\phi_{23}$ represents the power of the second lens group standardized on the basis of the power of the whole system, $v_{di}$ represents the Abbe's number for the sodium d-line of i-th lens as numbered from the entrance pupil side and $d_{12}$ represents the surface separation between the first and second lens groups standardized on the basis of the focal length of the whole system.

3 Claims, 35 Drawing Sheets

(DEG)

(DEG)

(DEG)

DEFLECTING SURFACE

SURFACE TO BE SCANNED (DEG)

LATERAL COLOR ABERRATION (×10⁻³)
——— W1−W2
------ W3−W2

(DEG)

ASTIGMATIC FIELD CURVES
——— W1
------ W2
— — — W3

(DEG)

LINEARITY (%)
——— W1
------ W2
— — — W3

FIG. 4A
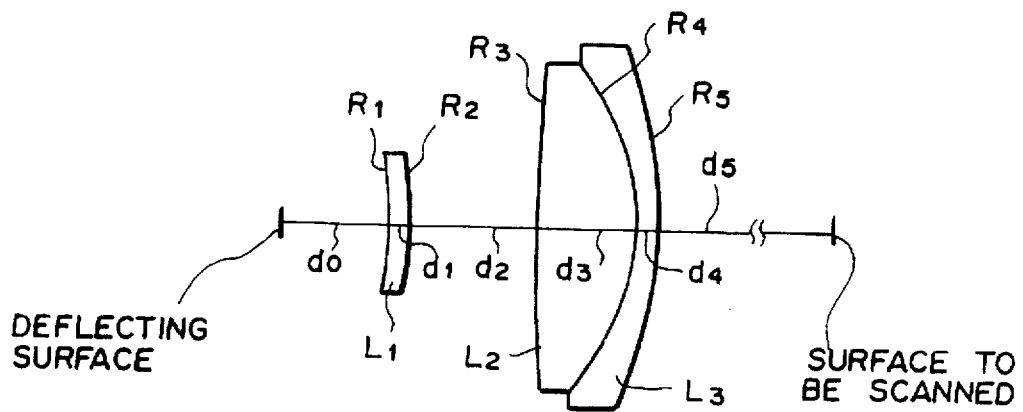
DEFLECTING SURFACE
SURFACE TO BE SCANNED
FIG. 4B (DEG)
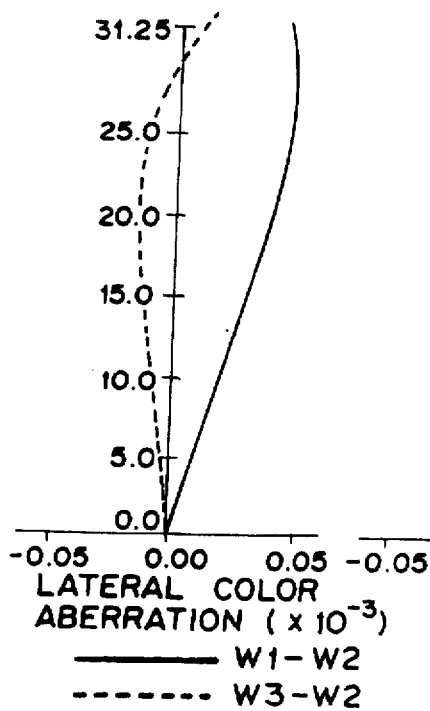
LATERAL COLOR ABERRATION (×10⁻³)
—— W1−W2
------ W3−W2
FIG. 4C (DEG)
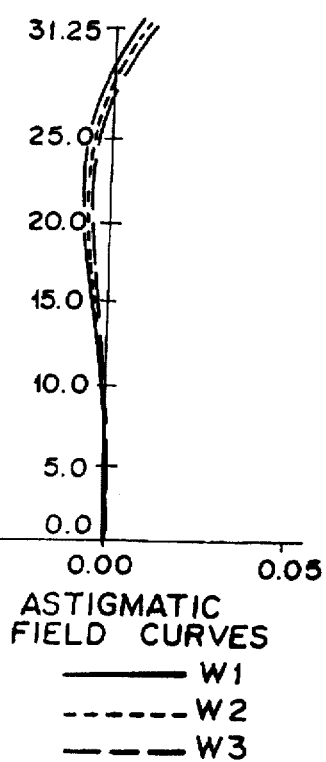
ASTIGMATIC FIELD CURVES
—— W1
------ W2
— — — W3
FIG. 4D (DEG)
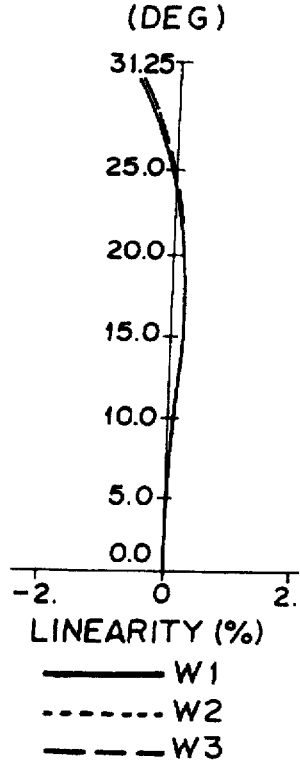
LINEARITY (%)
—— W1
------ W2
— — — W3

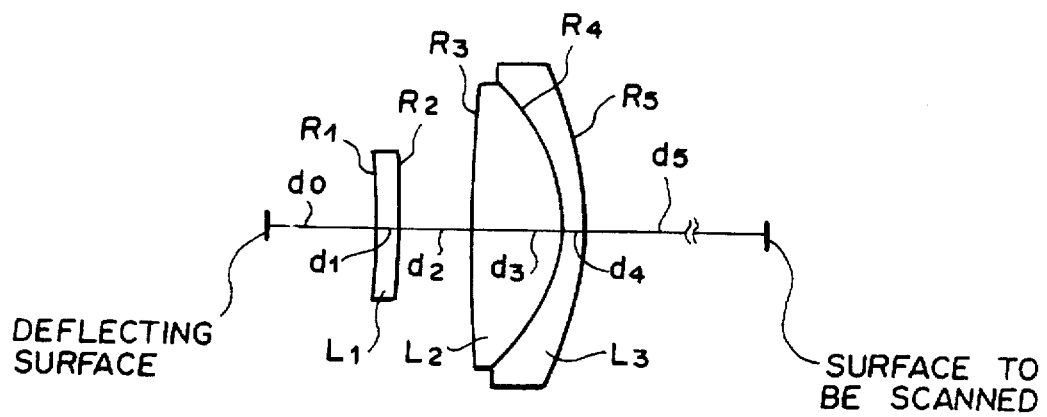
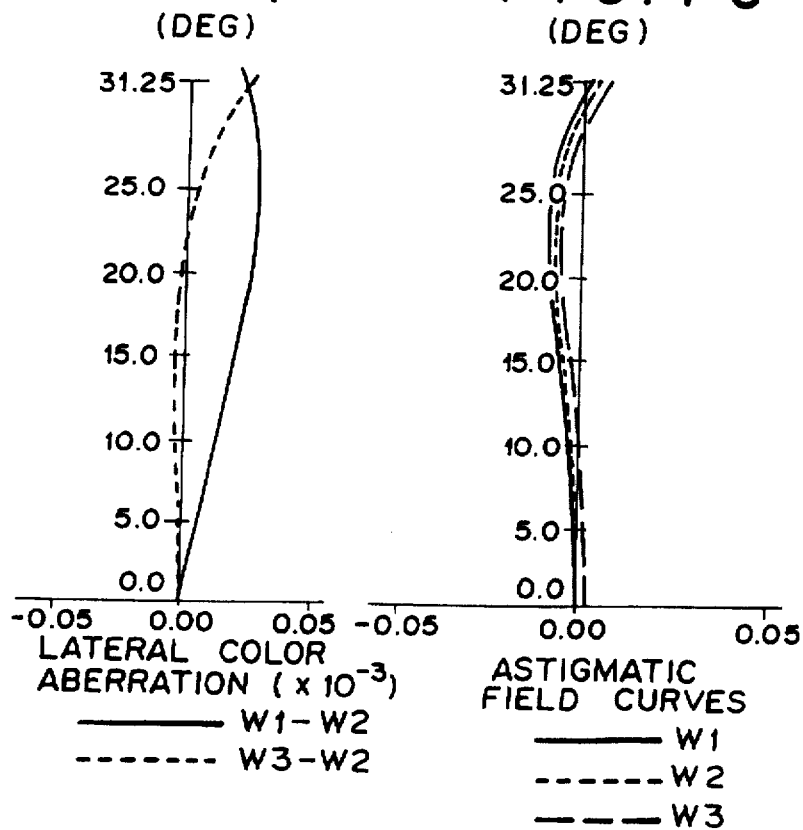
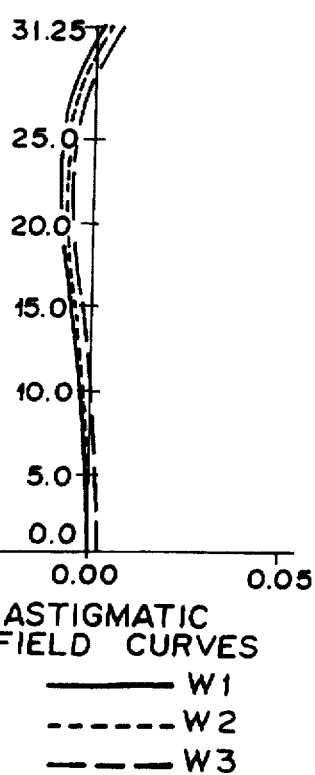
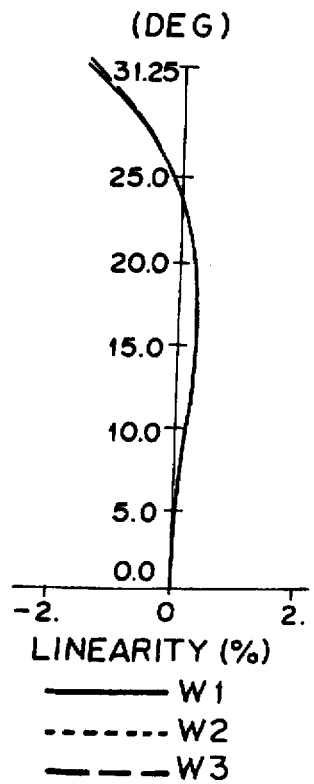

DEFLECTING SURFACE

SURFACE TO BE SCANNED

LATERAL COLOR ABERRATION ($\times 10^{-3}$)

———— W1−W2
------- W3−W2

ASTIGMATIC FIELD CURVES

———— W1
------- W2
— — — W3

LINEARITY (%)

———— W1
------- W2
— — — W3

LATERAL COLOR
ABERRATION (× 10⁻³)
——— W1-W2
------- W3-W2

ASTIGMATIC
FIELD CURVES
——— W1
------ W2
——— W3

LINEARITY (%)
——— W1
------ W2
——— W3

DEFLECTING SURFACE

SURFACE TO BE SCANNED (DEG)

LATERAL COLOR ABERRATION (× 10⁻³)
—— W1-W2
------ W3-W2

(DEG)

ASTIGMATIC FIELD CURVES
—— W1
------ W2
--- W3

(DEG)

LINEARITY (%)
—— W1
------ W2
--- W3

DEFLECTING SURFACE

SURFACE TO BE SCANNED (DEG)

LATERAL COLOR ABERRATION ($\times 10^{-3}$)
—— W1−W2
----- W3−W2

(DEG)

ASTIGMATIC FIELD CURVES
—— W1
----- W2
—— W3

(DEG)

LINEARITY (%)
—— W1
----- W2
—— W3

(DEG)
LATERAL COLOR ABERRATION (×10⁻³)
——— W1-W2
------ W3-W2

(DEG)
ASTIGMATIC FIELD CURVES
——— W1
------ W2
— — — W3

(DEG)
LINEARITY (%)
——— W1
------ W2
— — — W3

LATERAL COLOR
ABERRATION ( x 10⁻³)
——— W1-W2
------- W3-W2

ASTIGMATIC
FIELD CURVES
——— W1
------ W2
——— W3

LINEARITY (%)
——— W1
------ W2
——— W3

LATERAL COLOR
ABERRATION ( x10⁻³)
——— W1-W2
------- W3-W2

ASTIGMATIC
FIELD CURVES
——— W1
------ W2
— — W3

LINEARITY (%)
——— W1
------ W2
— — W3

LATERAL COLOR
ABERRATION ($\times 10^{-3}$)
——— W1-W2
- - - - - W3-W2

ASTIGMATIC
FIELD CURVES
——— W1
- - - - - W2
— — — W3

LINEARITY (%)
——— W1
- - - - - W2
— — — W3

LATERAL COLOR
ABERRATION ($\times 10^{-3}$)
—— W1-W2
------ W3-W2

ASTIGMATIC
FIELD CURVES
—— W1
------ W2
— — — W3

LINEARITY (%)
—— W1
------ W2
— — — W3

LATERAL COLOR
ABERRATION (×10⁻³)
—— W1-W2
------ W3-W2

ASTIGMATIC
FIELD CURVES
—— W1
------ W2
— — W3

LINEARITY (%)
—— W1
------ W2
— — W3

LATERAL COLOR
ABERRATION ( x $10^{-3}$ )
——— W1-W2
------ W3-W2

ASTIGMATIC
FIELD CURVES
——— W1
------ W2
— — W3

LINEARITY (%)
——— W1
------ W2
— — W3

LATERAL COLOR
ABERRATION ( x 10⁻³)
——— W1-W2
------ W3-W2

ASTIGMATIC
FIELD CURVES
——— W1
------ W2
— — — W3

LINEARITY (%)
——— W1
------ W2
— — — W3

Fθ LENS

BACKGROUND OF THE INVENTION

1. Field of the Invention

This invention relates to an fθ lens for a scanning optical system, and more particularly to an fθ lens suitable for use in a scanning optical system in which a plurality of laser beams having different wavelengths are used.

2. Description of the Prior Art

Recently there has been put into wide use various instruments such as a laser beam printer in which a laser beam scanning optical system is used. In such an optical system, an fθ lens is used to cause a laser beam, which is deflected by a rotary polygonal mirror or the like, to scan the surface of a medium at a constant speed. The fθ lens is a lens which satisfies a condition that Y=fθ wherein θ represents the incident angle of the laser beam to the lens, f represents the focal length of the lens and Y represents the height of the image formed.

Conventionally the fθ lens is designed on the assumption that a monochromatic or single wavelength laser beam is used and accordingly the color aberration causes no problem and correction of the color aberration has been unnecessary heretofore.

However, for instance, in a laser recording system in which color images are recorded on silver salt film by use of a plurality of laser beams having different wavelengths, e.g., red, green and blue laser beams, the problem of color aberration must be taken into account. As is well known in the art, the color aberration includes the axial color aberration and the lateral color aberration. The axial color aberration shifts the position of the image in the direction of the optical axis depending on the wavelength and practically does not cause a serious problem since the focal depth of the laser beam is sufficiently large. However, the lateral color aberration causes the position of the image to shift in the direction perpendicular to the optical axis depending on the wavelength, and accordingly, the beam is shifted in the scanning direction by different distance depending on the wavelength, which makes it impossible to precisely superimpose the spots of the respective colors one on another and adversely affects the quality of images.

Though this problem may be overcome by operating the laser beams of the respective colors in different timings, this approach requires complicated control and is not suitable for high-speed scanning.

In Japanese Patent Publication No. 61(1986)-51289, there is disclosed a technique for correcting lateral color aberration. However this technique can correct lateral color aberration only by a wavelength of 20 nm and is originally developed to correct color aberration due to fluctuation in wavelength of a semiconductor laser. Accordingly it cannot be applied to a multiple wavelength scanning optical system for color image recording.

An fθ lens disclosed in Japanese Unexamined Patent Publication No. 62(1987)-262812 can correct the lateral color aberration for two or more laser beams with a high accuracy under predetermined conditions. However the fθ lens comprises four elements in three lens groups. When the number of lens elements is large, the manufacturing cost increases, and at the same time, errors in processing the lens elements and assembly of the same can accumulate. Further in order to satisfy the disclosed conditions, the material for the lens elements must be selected within a narrow range.

SUMMARY OF THE INVENTION

In view of the foregoing observations and description, the primary object of the present invention is to provide an fθ lens which can correct the color aberration with a high accuracy over a wide wavelength range, and consists of a small number of lens elements to permit reduction of the size of the optical system, the manufacturing cost and the error in assembly.

In accordance with a first aspect of the present invention, there is provided an fθ lens comprising a first lens group which consists of a first lens having a negative or positive refracting power, and a second lens group which consists of a second lens having a positive refracting power and a third lens having a negative refracting power, the second and third lenses being cemented together, the second lens group having a positive refracting power as a whole, and the first and second lens groups being arranged in this order from the entrance pupil (deflecting surface) side and satisfying the following formulae (1) to (4), $$12 \leq v_{d2} - v_{d3} \tag{1}$$

$$-0.035 \leq \Sigma(\phi_i/v_{di}) \leq 0.005 \tag{2}$$

$$0.7 \leq \phi_{23} \leq 2.0 \tag{3}$$

$$0.03 \leq d_{12} \leq 0.20 \tag{4}$$

wherein $\phi_i$ represents the power of i-th lens as numbered from the entrance pupil side standardized on the basis of the power of the whole system, $\phi_{23}$ represents the power of the second lens group standardized on the basis of the power of the whole system, $v_{di}$ represents the Abbe's number for the sodium d-line of i-th lens as numbered from the entrance pupil side and $d_{12}$ represents the surface separation between the first and second lens groups standardized on the basis of the focal length of the whole system.

In accordance with a second aspect of the present invention, there is provided an fθ lens comprising first and second lens groups arranged in this order from the entrance pupil (deflecting surface) side, the first lens group consisting of first and second lenses cemented together, the refracting powers of the first and second lenses being one of the combinations of negative and positive, positive and positive, and positive and negative, the second lens group consisting of a third lens having a positive or negative refracting power, and the first and second lens groups satisfying the following formulae (5) to (9), $$2 \leq |v_{d1} - v_{d2}| \tag{5}$$

$$-0.020 \leq \Sigma(\phi_i/v_{di}) \leq 0.005 \tag{6}$$

$$35 \leq v_{dL} \tag{7}$$

$$1.0 \leq \phi_{12} \leq 2.5 \tag{8}$$

$$0.01 \leq d_{12} \leq 0.22 \tag{9}$$

wherein $\phi_i$ represents the power of i-th lens as numbered from the entrance pupil side standardized on the basis of the power of the whole system, $\phi_{12}$ represents the power of the first lens group standardized on the basis of the power of the whole system, $v_{di}$ represents the Abbe's number for the sodium d-line of i-th lens as numbered from the entrance pupil side, $v_{dL}$ represents the Abbe's number for the sodium d-line of one of the first and second lenses having the smaller dispersive power than the other and $d_{12}$ represents the surface separation between the first and second lens groups standardized on the basis of the focal length of the whole system.

In accordance with a third aspect of the present invention, there is provided an fθ lens for scanning light emanating from a deflecting point comprising a first lens having a positive refracting power and second lens having a negative refracting power, the first and second lenses being cemented together with the first lens positioned on the entrance pupil side (deflecting point side) and satisfying the following formulae (10) to (12).

$$n_{d1} < n_{d2} \quad (10)$$

$$0.4 \leq v_{d2}/v_{d1} \leq 0.8 \quad (11)$$

$$1.5 \leq \phi_1 \leq 4.7 \quad (12)$$

wherein $n_{d1}$ and $n_{d2}$ respectively represent the refractive indices for the sodium d-line of the first and second lenses, $v_{d1}$ and $v_{d2}$ respectively represent the Abbe's numbers for the sodium d-line of the first and second lenses, and $\phi_1$ represents the power of the first lens standardized on the basis of the power of the whole system, said fθ lens being used in a position where the distance between the deflecting point and the entrance pupil side surface of the first lens standardized on the basis of the focal length of the whole system is in the range of 0.1 to 0.4 inclusive (either of these values being standardized on the basis of the focal length of the whole system).

The lens elements of the fθ lens in accordance with the first to third aspects of the present invention need not be limited to spherical lenses but may be aspheric lenses.

The fθ lens in accordance with the first aspect of the present invention comprises only three lens elements in two lens groups and simple in structure.

Further when the formulae (1) to (4) are satisfied, the color aberration can be corrected over a wide wavelength range.

The formula (1) limits the relation between the Abbe's numbers of the second and third lenses of the second lens group, which is a cemented lens. The difference between the Abbe's numbers governs the amount of color aberration generated at the interface between the second and third lenses. When the difference between the Abbe's numbers of the second and third lenses is smaller than 12, the negative color aberration generated at the interface is reduced and the positive color aberration increases as a whole.

The formula (2) relates to correction of the axial color aberration in paraxial theory and in order to correct the axial color aberration, the value of $\Sigma(\phi_i/v_{di})$ must be substantially 0. Further in order to correct the lateral color aberration, the axial color aberration must be small to a certain extent. In accordance with the first aspect of the present invention, the relation between the power of each lens and the Abbe's number thereof is limited by the formula (2) in order to correct the lateral color aberration. When the value of $\Sigma(\phi_i/v_{di})$ is smaller than the lower limit, the negative lateral color aberration increases and when the value of $\Sigma(\phi_i/v_{di})$ is larger than the upper limit, the positive lateral color aberration increases.

The formula (3) relates to the Petzval sum and limits the amount of curvature of field. That is, when the power of the second lens group standardized on the basis of the power of the whole system is larger than the upper limit, the fθ characteristic becomes too large in the positive direction to correct, and at the same time, the amount of curvature of field in the three-dimensional meridional image surface becomes too large in the negative direction to correct. On the other hand, when it is smaller than the lower limit, the amount of curvature of field in the three-dimensional meridional image surface becomes too large in the positive direction to correct.

Further, since the fθ characteristic depends on the distance from the entrance pupil, the position of the first and second lens groups relative to the entrance pupil must be limited in order to correct the fθ characteristic. However since the position of the first lens group is more restricted by the system in which the fθ lens is employed and accordingly it is preferable to limit the position of the second lens system. That is, the formula (4) limits the position of the second lens group by limiting the distance between the first and second lens groups. When the distance between the first and second lens groups is smaller than the lower limit, the fθ characteristic becomes too large in the positive direction to correct, and when it is larger than the upper limit, the size of the second lens group increases, which adds to the manufacturing cost of the fθ lens.

The fθ lens in accordance with the second aspect of the present invention comprises only three lens elements in two lens groups and simple in structure.

Further when the formulae (5) to (9) are satisfied, the color aberration can be corrected over a wide wavelength range.

The formula (5) limits the relation between the Abbe's numbers of the first and second lenses of the first lens group, which is a cemented lens. The difference between the Abbe's numbers governs the amount of color aberration generated at the interface between the first and second lenses. When the difference between the Abbe's numbers of the first and second lenses is smaller than 2, correction of color aberration becomes difficult and at the same time, the power of the first lens group, which is a cemented lens, becomes too large (irrespective of whether it has a positive refractive power or a negative refractive power) and both the curvature of field and the fθ characteristic deteriorate.

The formula (6) relates to correction of the axial color aberration in paraxial theory and in order to correct the axial color aberration, the value of $\Sigma(\phi_i/v_{di})$ must be substantially 0. Further in order to correct the lateral color aberration, the axial color aberration must be small to a certain extent. In accordance with the second aspect of the present invention, the relation between the power of each lens and the Abbe's number thereof is limited by the formula (6) in order to correct the lateral color aberration. When the value of $\Sigma(\phi_i/v_{di})$ is smaller than the lower limit, the negative lateral color aberration increases and when the value of $\Sigma(\phi_i/v_{di})$ is larger than the upper limit, the positive lateral color aberration increases.

The formula (7) defines the lower limit of the Abbe's number for the sodium d-line of one of the first and second lenses having the smaller dispersive power than the other. From the viewpoint of the achromatism, the more this value is, the better. When this value is smaller than the lower limit, the Abbe's number for the sodium d-line of the other lens must be smaller than that of said one lens. In such a case, said the other lens must be formed from SF glass. However the SF glass has a large refractive index, which results in a large Petzval sum and makes difficult correction of the curvature of field.

The formula (8) relates to the Petzval sum and limits the amount of curvature of field. That is, when the power of the first lens group standardized on the basis of the power of the whole system is larger than the upper limit, the second lens group (the third lens) becomes a negative lens and the power of the negative lens becomes so strong that the fθ characteristic sharply deteriorates at the edge of the angle of view when the curvature of field and the color aberration are corrected. On the other hand, when the power of the first lens group is smaller than the lower limit, the power of the second lens group must be strong in the positive direction and accordingly the second lens group must be a meniscus lens having a small radius of curvature which is difficult to manufacture. Further it gives rise to a problem that the curvature of field becomes large and fluctuation of the lateral color aberration with change of the angle of view becomes large.

Further, since the fθ characteristic depends on the distance from the entrance pupil as described above, the position of the first and second lens groups relative to the entrance pupil must be limited in order to correct the fθ characteristic. However since the position of the first lens group is more restricted by the system in which the fθ lens is employed and accordingly it is preferable to limit the position of the second lens system. That is, the formula (9) limits the position of the second lens group by limiting the distance between the first and second lens groups. When the distance between the first and second lens groups is smaller than the lower limit, the fθ characteristic becomes too large in the positive direction to correct, and when it is larger than the upper limit, the fθ characteristic becomes too large in the negative direction to correct and the size of the second lens group increases, which adds to the manufacturing cost of the fθ lens.

The fθ lens in accordance with the third aspect of the present invention comprises only two lens elements in a single lens group and simple in structure.

Further when the formulae (10) to (12) are satisfied and the fθ lens being used in a position where the distance between the deflecting point and the entrance pupil side surface of the first lens standardized on the basis of the focal length of the whole system is in the range of 0.1 to 0.4 inclusive, the color aberration can be corrected over a wide wavelength range.

The formula (10) limits the relation between the refractive indices for the sodium d-line of the first and second lenses. When the refractive index of the first lens is not smaller than that of the second lens, the color aberration becomes too large in the positive direction and at the same time, the amount of curvature of field in the three-dimensional meridional image surface becomes too large in the negative direction, whereby it becomes difficult to correct both the color aberration and the curvature of field.

The formula (11) limits the relation between the Abbe's numbers of the first and second lenses forming a cemented lens group. The ratio of the Abbe's numbers governs the amount of color aberration generated at the interface between the first and second lenses. When the ratio of the Abbe's numbers of the first and second lenses is larger than 0.8, the color aberration generated at the interface in the negative direction becomes small and the color aberration in the positive direction increases as a whole, which results in under correction. On the other hand, when the ratio of the Abbe's numbers of the first and second lenses is smaller than 0.4, the color aberration generated at the interface in the negative direction becomes large and the color aberration in the negative direction increases as a whole, which results in over correction.

The formula (12) relates to the Petzval sum and limits the amount of curvature of field. That is, when the power of the first lens standardized on the basis of the power of the whole system is larger than the upper limit 4.7, the fθ characteristic becomes too large in the positive direction to correct and at the same time, the amount of curvature of field in the three-dimensional meridional image surface becomes too large in the negative direction to correct. On the other hand, when the power of the first lens is smaller than the lower limit 1.5, the amount of curvature of field in the three-dimensional meridional image surface becomes too large in the positive direction to correct.

Further, since the fθ characteristic depends on the distance from the entrance pupil as described above, the distance between the deflecting point (the intersection of the deflecting surface and the optical axis) and the surface of the first lens must be in a predetermined range. When the distance between the deflecting point and the surface of the first lens standardized on the basis of the focal length of the whole system is smaller than the lower limit 0.1, the fθ characteristic becomes too large in the positive direction to correct, and when it is larger than the upper limit 0.4, the fθ characteristic becomes too large in the negative direction to correct and at the same time, the size of the second lens group increases, which adds to the manufacturing cost of the fθ lens. Further when the distance is smaller than the lower limit, the amount of curvature of field in the three-dimensional meridional image surface becomes too large in the negative direction to correct and when the distance is larger than the upper limit, the amount of curvature of field in the three-dimensional meridional image surface becomes too large in the positive direction to correct.

BRIEF DESCRIPTION OF THE DRAWINGS

FIG. 4A is a view showing the arrangement of the lens elements in an fθ lens of a fourth embodiment in accordance with the first aspect of the present invention, FIG. 4B is a graph showing the lateral color aberration of the fθ lens shown in FIG. 4A for three wavelengths W1, W2 and W3, FIG. 4C is a graph showing the astigmatic field curves (curvature of field) of the fθ lens shown in FIG. 4A for the three wavelengths W1, W2 and W3, FIG. 4D is a graph showing the linearity (fθ characteristic) of the fθ lens shown in FIG. 4A for the three wavelengths W1, W2 and W3, FIG. 7A is a view showing the arrangement of the lens elements in an fθ lens of a seventh embodiment in accordance with the first aspect of the present invention, FIG. 7B is a graph showing the lateral color aberration of the fθ lens shown in FIG. 7A for three wavelengths W1, W2 and W3, FIG. 7C is a graph showing the astigmatic field curves (curvature of field) of the fθ lens shown in FIG. 7A for the three wavelengths W1, W2 and W3, FIG. 7D is a graph showing the linearity (fθ characteristic) of the fθ lens shown in FIG. 7A for the three wavelengths W1, W2 and W3.

DESCRIPTION OF THE PREFERRED EMBODIMENTS

Figure 1A:
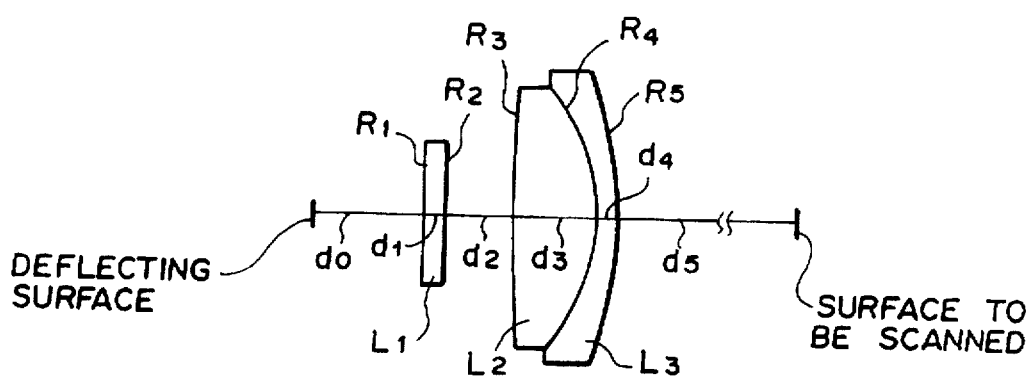
FIG. 1A is a view showing the arrangement of the lens elements in an fθ lens of a first embodiment in accordance with the first aspect of the present invention.

In accordance with the first aspect of the present invention, there will be described with reference to FIGS. 1 (1A to 1D) to 13 (13A to 13D) and tables 1 to 13, hereinbelow, thirteen embodiments of a fθ lens. FIGS. 1A to 13A respectively show the arrangements of the lens elements of the fθ lenses of first to thirteenth embodiments, and FIGS. 1B, 1C and 1D to 13B, 13C and 13D respectively show the lateral color aberration, the astigmatic field curves (curvature of field) and the linearity (fθ characteristic) of the fθ lenses of the first to thirteenth embodiments when three laser beams having different wavelengths W1, W2 and W3 used in a scanning optical system enter the respective fθ lenses. The values of the wavelengths W1, W2 and W3 are shown on the top of the tables corresponding to the fθ lenses.

Each fθ lens comprises a first lens group which consists of a single first lens L1 having a negative or positive refracting power, and a second lens group which consists of a second lens L2 having a positive refracting power and a third lens L3 having a negative refracting power. The second and third lenses L2 and L3 are cemented together and the second lens group has a positive refracting power as a whole. The first and second lens groups are arranged in this order from the entrance pupil (deflecting surface) side and satisfies the following formulae (1) to (4), $$12 \leq v_{d2} - v_{d3} \quad (1)$$

$$-0.035 \leq \Sigma(\phi_i/v_{di}) \leq 0.005 \quad (2)$$

$$0.7 \leq \phi_{23} \leq 2.0 \quad (3)$$

$$0.03 \leq d_{12} \leq 0.20 \quad (4)$$

wherein $\phi_i$ represents the power of i-th lens as numbered from the entrance pupil side standardized on the basis of the power of the whole system, $\phi_{23}$ represents the power of the second lens group standardized on the basis of the power of the whole system, $v_{di}$ represents the Abbe's number for the sodium d-line of i-th lens as numbered from the entrance pupil side and $d_{12}$ represents the air separation between the first and second lens groups standardized on the basis of the focal length of the whole system.

In the first embodiment shown in FIG. 1A, the factors limited by the formulae (2) to (4) are set substantially at the middle of the ranges defined by the formulae. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 1. The radii of curvature R of the refracting surfaces and the axial surface separations d are in the values standardized on the basis of the focal length of the whole system. (the same for all the embodiments including the embodiments in accordance with the second and third aspects of the present invention described later) The numbers in the leftmost column of table 1 designate the numbers of the symbols R, d, $n_d$ and $v_d$ as numbered from the entrance pupil (deflecting surface) side. (the same for all the tables in this specification)

TABLE 1

| wavelength W1;810 nm, W2;750 nm, W3;680 nm, angle of view 62.5° | | | | |
|---|---|---|---|---|
| i | Ri | di | $n_d$ | $v_d$ |
| OBJ | — | infinity | | |
| 0 | infinity | 0.10391 | | |
| 1 | −1.76735 | 0.02474 | $n_{d1}$ 1.48749 | $v_{d1}$ 70.4 |
| 2 | 18.24431 | 0.07422 | | |
| 3 | 2.39800 | 0.09896 | $n_{d2}$ 1.63930 | $v_{d2}$ 45.1 |
| 4 | −0.21884 | 0.02474 | $n_{d3}$ 1.80518 | $v_{d3}$ 25.5 |
| 5 | −0.46351 | 1.03924 | | |
| surface scanned | infinity | — | | |

Figure 1B:
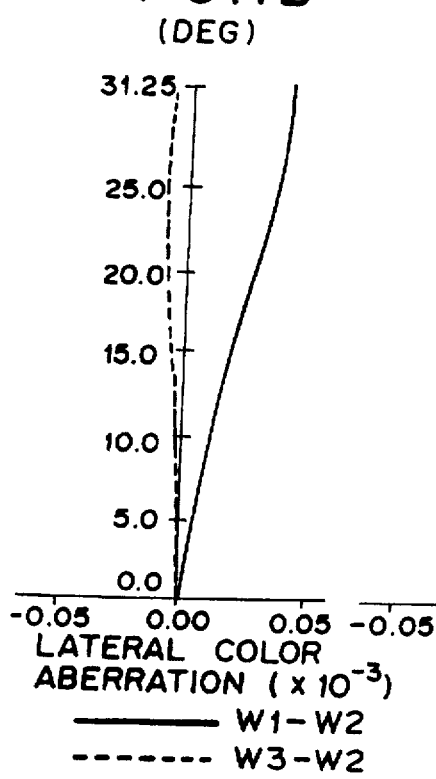
FIG. 1B is a graph showing the lateral color aberration of the fθ lens shown in FIG. 1A for three wavelengths W1, W2 and W3.
Figure 1C:
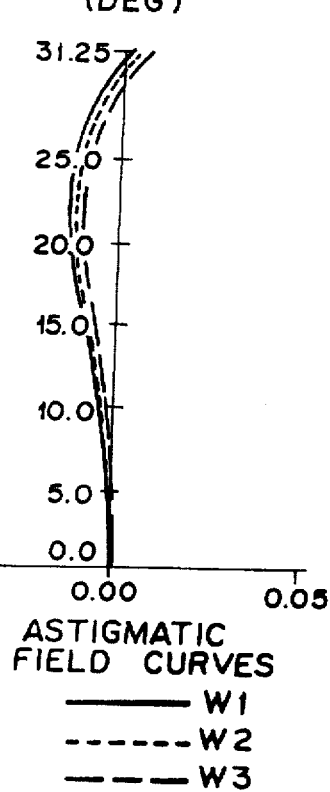
FIG. 1C is a graph showing the astigmatic field curves (curvature of field) of the fθ lens shown in FIG. 1A for the three wavelengths W1, W2 and W3.
Figure 1D:
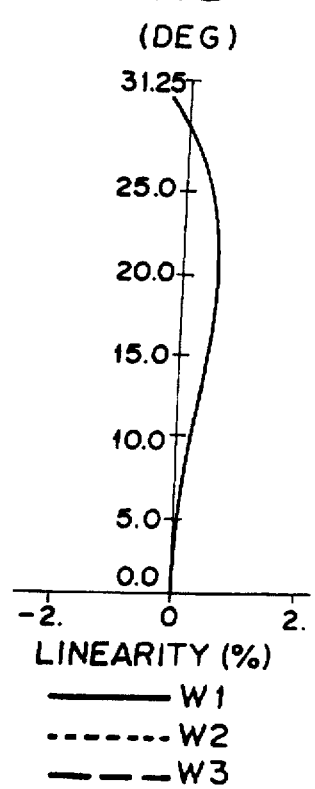
FIG. 1D is a graph showing the linearity (fθ characteristic) of the fθ lens shown in FIG. 1A for the three wavelengths W1, W2 and W3.

$v_{d2} - v_{d3} = 19.6$
lateral color aberration $0.049 \times 10^{-3}$
$\Sigma(\phi_i/v_{di}) = -0.007$
curvature of field 0.016
$\phi_{23} = 1.24$
fθ characteristic 1.16%
$d_{12} = 0.07422$ FIGS. 1B to 1D respectively show the lateral color aberration, the astigmatic field curves (curvature of field) in the scanning direction and the linearity (fθ characteristic) of the fθ lens of the first embodiment when laser beams having wavelengths of 810 nm (W1), 750 nm (W2) and 680 nm (W3) enter the fθ lens. In FIGS. 1C and 1D, the astigmatic field curves and the linearity for the wavelengths W1, W2 and W3 are respectively shown by the solid line, the fine broken line and the rough broken line, but when one or both of the broken lines coincide with the solid line, the broken line is not shown. (the same for all the embodiments including the embodiments in accordance with the second and third aspects of the present invention described later)

As can be understood from FIGS. 1B to 1D, in the fθ lens of this embodiment, the lateral color aberration is well corrected for the respective wavelengths in spite of a simple structure consisting of only three lens elements in two lens groups.

Figure 2A:
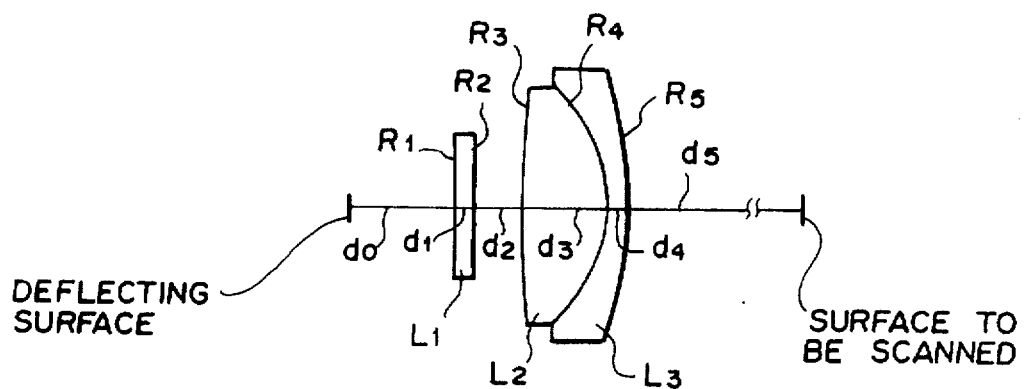
FIG. 2A is a view showing the arrangement of the lens elements in an fθ lens of a second embodiment in accordance with the first aspect of the present invention.

In the second embodiment shown in FIG. 2A, the difference between the Abbe's numbers of the second lens L2 and the third lens L3 is set to a value close to the lower limit of the range defined by the formula (1). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 2.

TABLE 2

| wavelength W1;810 nm, W2;750 nm, W3;680 nm, angle of view 62.5° | | | | |
|---|---|---|---|---|
| i | Ri | di | $n_d$ | $v_d$ |
| OBJ | — | infinity | | |
| 0 | infinity | 0.10390 | | |
| 1 | −1.19973 | 0.02474 | $n_{d1}$ 1.80518 | $v_{d1}$ 25.5 |
| 2 | 7.58872 | 0.05332 | | |
| 3 | 2.00978 | 0.09895 | $n_{d2}$ 1.72342 | $v_{d2}$ 38.0 |
| 4 | −0.17584 | 0.02474 | $n_{d3}$ 1.80518 | $v_{d3}$ 25.5 |
| 5 | −0.46377 | 1.08380 | | |
| surface scanned | infinity | — | | |

Figure 2B:
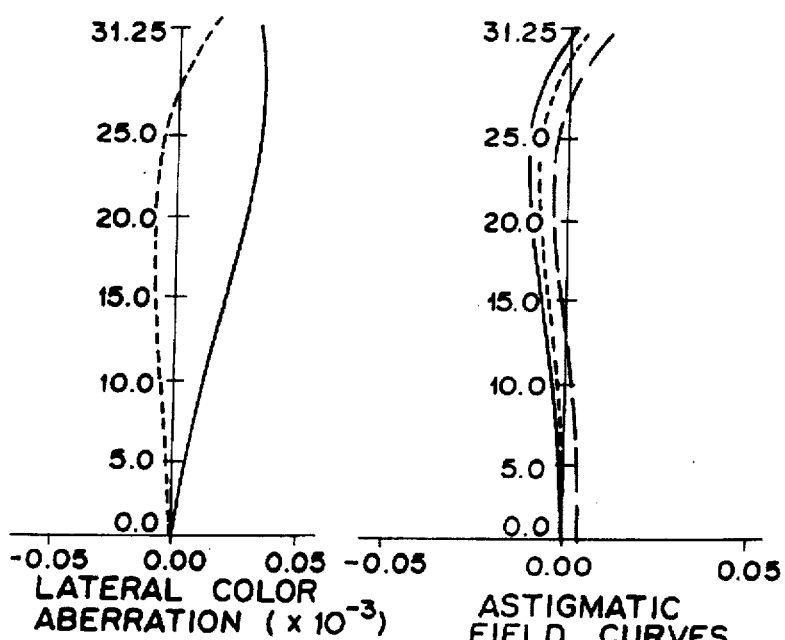
FIG. 2B is a graph showing the lateral color aberration of the fθ lens shown in FIG. 2A for three wavelengths W1, W2 and W3.
Figure 2C:
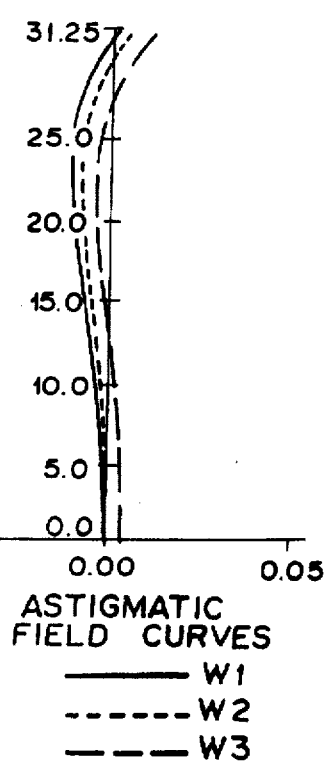
FIG. 2C is a graph showing the astigmatic field curves (curvature of field) of the fθ lens shown in FIG. 2A for the three wavelengths W1, W2 and W3.
Figure 2D:
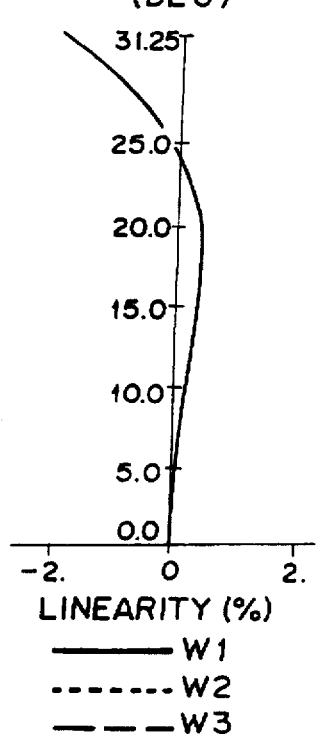
FIG. 2D is a graph showing the linearity (fθ characteristic) of the fθ lens shown in FIG. 2A for the three wavelengths W1, W2 and W3.

$v_{d2} - v_{d3} = 12.5$
lateral color aberration $0.039 \times 10^{-3}$
$\Sigma(\phi_i/v_{di}) = -0.020$
curvature of field 0.014
$\phi_{23} = 1.61$
fθ characteristic 2.39%
$d_{12} = 0.05332$ FIGS. 2B to 2D respectively show the lateral color aberration, the astigmatic field curves in the scanning direction and the linearity of the f θ lens of the second embodiment when laser beams having wavelengths of 810 nm (W1), 750 nm (W2) and 680 nm (W3) enter the f θ lens.

As can be understood from FIGS. 2B to 2D, in the f θ lens of this embodiment, the lateral color aberration is well corrected for the respective wavelengths in spite of a simple structure consisting of only three lens elements in two lens groups.

Figure 3A:
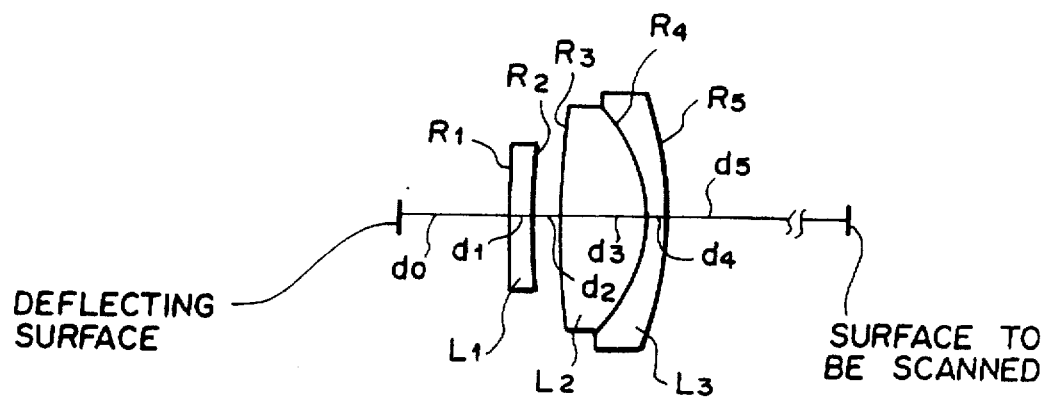
FIG. 3A is a view showing the arrangement of the lens elements in an fθ lens of a third embodiment in accordance with the first aspect of the present invention.

In the third embodiment shown in FIG. 3A, the surface separation $d_{12}$ between the first and second lens groups is set to a value close to the lower limit of the range defined by the formula (4). The radii of curvature R of the refracting surfaces, the axial surface separations d, and the refractive indexes $n_d$ and the Abbe's numbers $v_d$ of the lenses for the sodium d-line in the f θ lens of this embodiment are shown in table 3.

TABLE 3

| wavelength W1:810 nm, W2:750 nm, W3:680 nm, angle of view 62.5° | | | | |
|---|---|---|---|---|
| i | Ri | di | $n_d$ | $v_d$ |
| OBJ | — | infinity | | |
| 0 | infinity | 0.10393 | | |
| 1 | −14.8476 | 0.02475 | $n_{d1}$ 1.80518 | $v_{d1}$ 25.5 |
| 2 | 0.73495 | 0.03228 | | |
| 3 | 0.94676 | 0.09898 | $n_{d2}$ 1.62012 | $v_{d2}$ 49.8 |
| 4 | −0.17322 | 0.02475 | $n_{d3}$ 1.64769 | $v_{d3}$ 33.8 |
| 5 | −0.42690 | 1.07406 | | |
| surface scanned | infinity | | | |

Figure 3B:
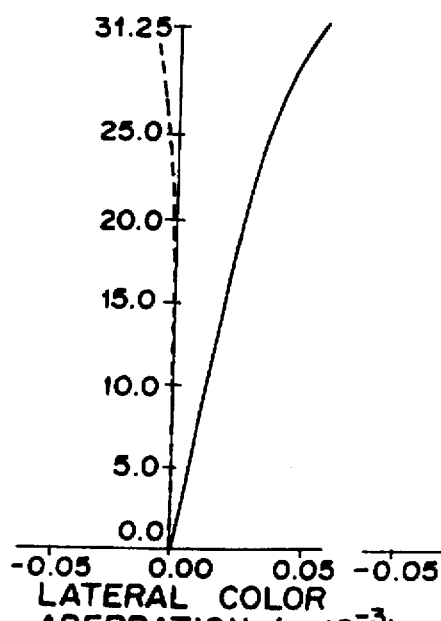
FIG. 3B is a graph showing the lateral color aberration of the fθ lens shown in FIG. 3A for three wavelengths W1, W2 and W3.
Figure 3C:
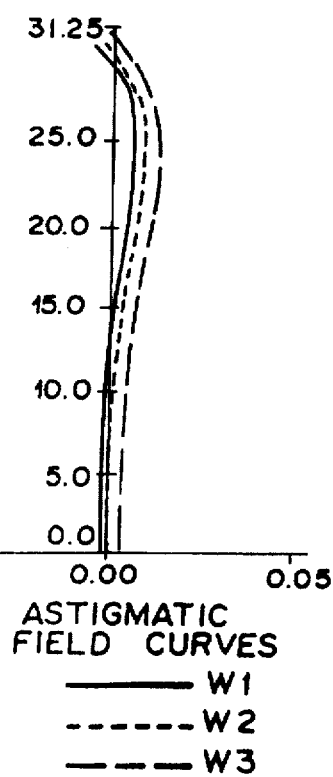
FIG. 3C is a graph showing the astigmatic field curves (curvature of field) of the fθ lens shown in FIG. 3A for the three wavelengths W1, W2 and W3.
Figure 3D:
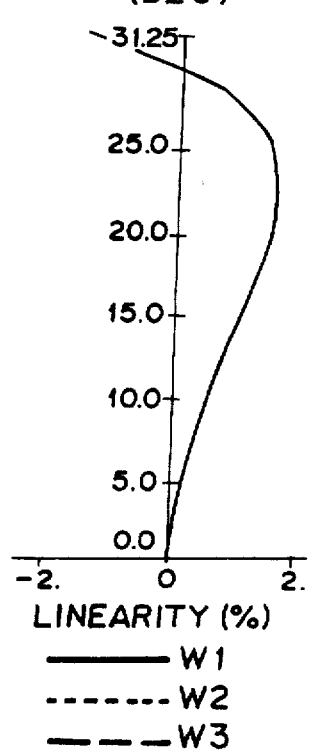
FIG. 3D is a graph showing the linearity (fθ characteristic) of the fθ lens shown in FIG. 3A for the three wavelengths W1, W2 and W3.

$v_{d2} - v_{d3} = 16.0$
lateral color aberration $0.074 \times 10^{-3}$
$\Sigma(\phi_i/v_{di}) = -0.025$
curvature of field 0.016
$\phi_{23} = 1.94$
f θ characteristic 3.04%
$d_{12} = 0.03228$ FIGS. 3B to 3D respectively show the lateral color aberration, the astigmatic field curves in the scanning direction and the linearity of the f θ lens of the third embodiment when laser beams having wavelengths of 810 nm (W1), 750 nm (W2) and 680 nm (W3) enter the f θ lens.

As can be understood from FIGS. 3B to 3D, in the f θ lens of this embodiment, the lateral color aberration is well corrected for the respective wavelengths in spite of a simple structure consisting of only three lens elements in two lens groups.

In the fourth embodiment shown in FIG. 4A, the first lens L1 has a negative refracting power and the surface separation $d_{12}$ between the first and second lens groups is set to a relatively large value in the range defined by the formula (4). The radii of curvature R of the refracting surfaces, the axial surface separations d, and the refractive indexes $n_d$ and the Abbe's numbers $v_d$ of the lenses for the sodium d-line in the f θ lens of this embodiment are shown in table 4.

TABLE 4

| wavelength W1:810 nm, W2:750 nm, W3:680 nm, angle of view 62.5° | | | | |
|---|---|---|---|---|
| i | Ri | di | $n_d$ | $v_d$ |
| OBJ | — | infinity | | |
| 0 | infinity | 0.10390 | | |
| 1 | −0.45615 | 0.02474 | $n_{d1}$ 1.51680 | $v_{d1}$ 64.2 |
| 2 | −0.48189 | 0.14842 | | |
| 3 | 8.15793 | 0.11379 | $n_{d2}$ 1.66672 | $v_{d2}$ 48.3 |
| 4 | −0.28119 | 0.02474 | $n_{d3}$ 1.80518 | $v_{d3}$ 25.5 |
| 5 | −0.56734 | 1.02736 | | |

TABLE 4-continued

| wavelength W1:810 nm, W2:750 nm, W3:680 nm, angle of view 62.5° | | | | |
|---|---|---|---|---|
| i | Ri | di | $n_d$ | $v_d$ |
| surface scanned | infinity | — | | |

$v_{d2} - v_{d3} = 22.8$
lateral color aberration $0.055 \times 10^{-3}$
$\Sigma(\phi_i/v_{di}) = -0.004$
curvature of field 0.015
$\phi_{23} = 1.01$
f θ characteristic 1.03%
$d_{12} = 0.14842$ FIGS. 4B to 4D respectively show the lateral color aberration, the astigmatic field curves in the scanning direction and the linearity of the f θ lens of the fourth embodiment when laser beams having wavelengths of 810 nm (W1), 750 nm (W2) and 680 nm (W3) enter the f θ lens.

As can be understood from FIGS. 4B to 4D, in the f θ lens of this embodiment, the lateral color aberration is well corrected for the respective wavelengths in spite of a simple structure consisting of only three lens elements in two lens groups.

Figure 5A:
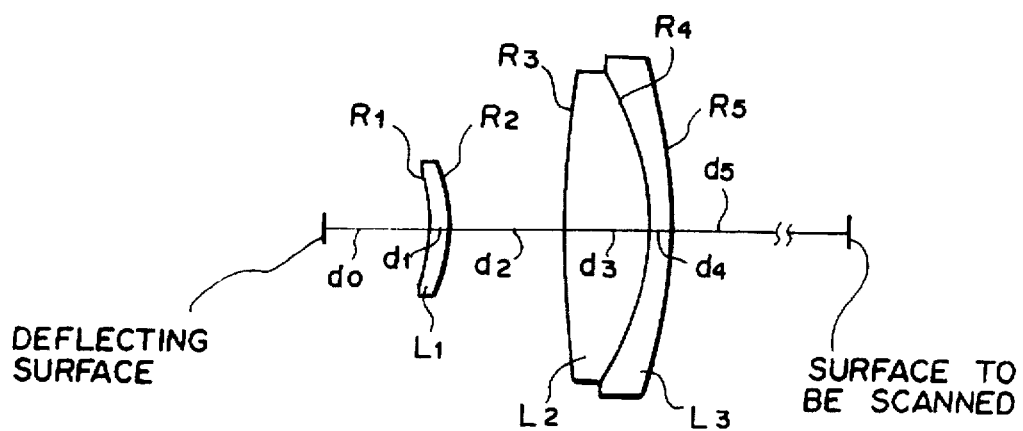
FIG. 5A is a view showing the arrangement of the lens elements in an fθ lens of a fifth embodiment in accordance with the first aspect of the present invention.

In the fifth embodiment shown in FIG. 5A, the first lens L1 has a positive refracting power. The radii of curvature R of the refracting surfaces, the axial surface separations d, and the refractive indexes $n_d$ and the Abbe's numbers $v_d$ of the lenses for the sodium d-line in the f θ lens of this embodiment are shown in table 5.

TABLE 5

| wavelength W1:810 nm, W2:750 nm, W3:680 nm, angle of view 62.5° | | | | |
|---|---|---|---|---|
| i | Ri | di | $n_d$ | $v_d$ |
| OBJ | — | infinity | | |
| 0 | infinity | 0.10390 | | |
| 1 | −0.14842 | 0.02474 | $n_{d1}$ 1.51680 | $v_{d1}$ 64.2 |
| 2 | −0.14564 | 0.13018 | | |
| 3 | 1.25361 | 0.09895 | $n_{d2}$ 1.53172 | $v_{d2}$ 48.8 |
| 4 | −0.30864 | 0.02474 | $n_{d3}$ 1.80518 | $v_{d3}$ 25.5 |
| 5 | −0.67737 | 0.97906 | | |
| surface scanned | infinity | — | | |

Figure 5B:
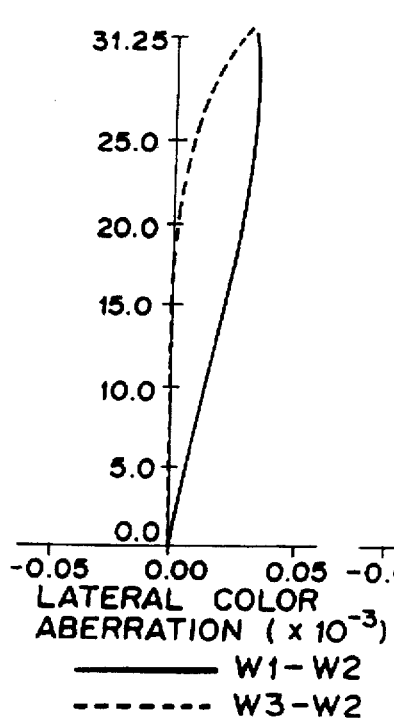
FIG. 5B is a graph showing the lateral color aberration of the fθ lens shown in FIG. 5A for three wavelengths W1, W2 and W3.
Figure 5C:
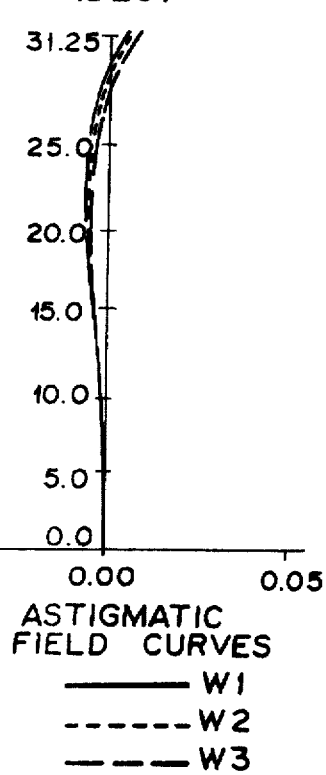
FIG. 5C is a graph showing the astigmatic field curves (curvature of field) of the fθ lens shown in FIG. 5A for the three wavelengths W1, W2 and W3.
Figure 5D:
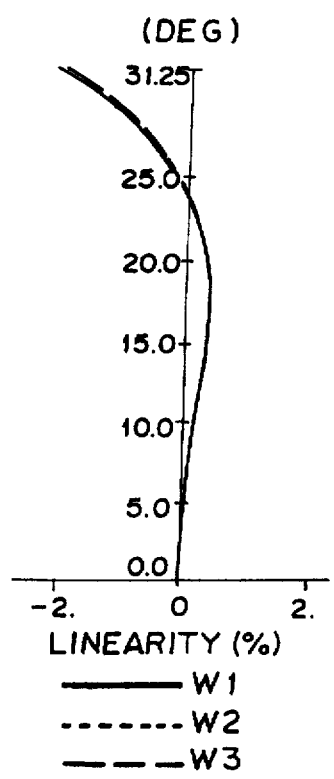
FIG. 5D is a graph showing the linearity (fθ characteristic) of the fθ lens shown in FIG. 5A for the three wavelengths W1, W2 and W3.

$v_{d2} - v_{d3} = 23.3$
lateral color aberration $0.034 \times 10^{-3}$
$\Sigma(\phi_i/v_{di}) = -0.006$
curvature of field 0.011
$\phi_{23} = 0.73$
f θ characteristic 2.52%
$d_{12} = 0.13018$ FIGS. 5B to 5D respectively show the lateral color aberration, the astigmatic field curves in the scanning direction and the linearity of the f θ lens of the fifth embodiment when laser beams having wavelengths of 810 nm (W1), 750 nm (W2) and 680 nm (W3) enter the f θ lens.

As can be understood from FIGS. 5B to 5D, in the f θ lens of this embodiment, the lateral color aberration is well corrected for the respective wavelengths in spite of a simple structure consisting of only three lens elements in two lens groups.

Figure 6A:
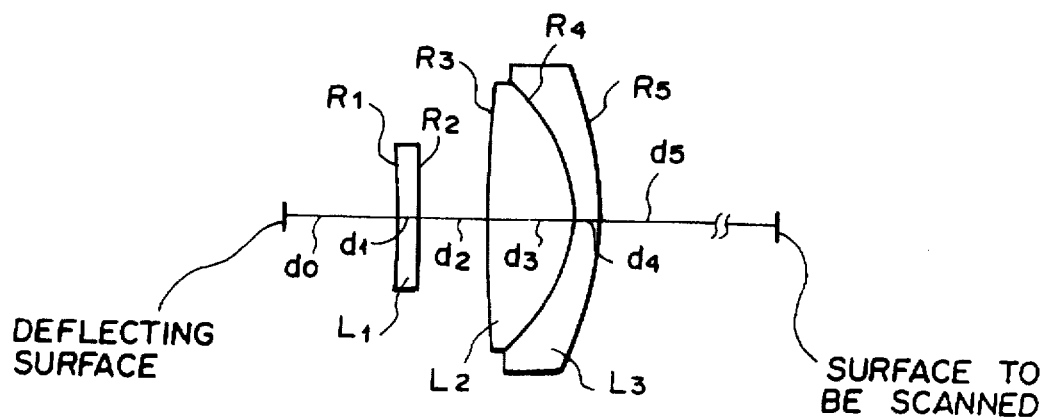
FIG. 6A is a view showing the arrangement of the lens elements in an fθ lens of a sixth embodiment in accordance with the first aspect of the present invention.

In the sixth embodiment shown in FIG. 6A, the factors limited by the formulae (2) to (4) are set substantially at the middle of the ranges defined by the formulae. The radii of curvature R of the refracting surfaces, the axial surface separations d, and the refractive indexes $n_d$ and the Abbe's numbers $v_d$ of the lenses for the sodium d-line in the f θ lens of this embodiment are shown in table 6.

TABLE 6 wavelength W1;870 nm, W2;810 nm, W3;750 nm, angle of view 62.5°

| i | Ri | di | $n_d$ | $v_d$ |
|---|---|---|---|---|
| OBJ | — | infinity | | |
| 0 | infinity | 0.10390 | | |
| 1 | −0.69730 | 0.02474 | $n_{d1}$ 1.51680 | $v_{d1}$ 64.2 |
| 2 | −4.91198 | 0.07766 | | |
| 3 | 3.12259 | 0.09895 | $n_{d2}$ 1.65844 | $v_{d2}$ 50.9 |
| 4 | −0.18906 | 0.02474 | $n_{d3}$ 1.72825 | $v_{d3}$ 28.3 |
| 5 | −0.44235 | 1.09609 | | |
| surface scanned | infinity | — | | |

Figure 6B:
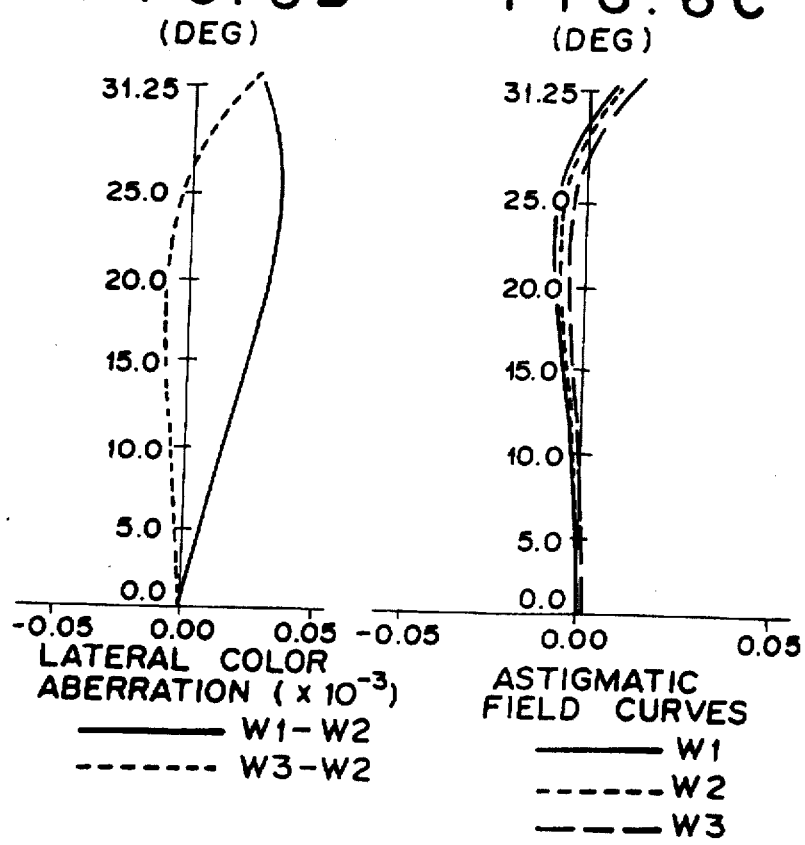
FIG. 6B is a graph showing the lateral color aberration of the fθ lens shown in FIG. 6A for three wavelengths W1, W2 and W3.
Figure 6C:
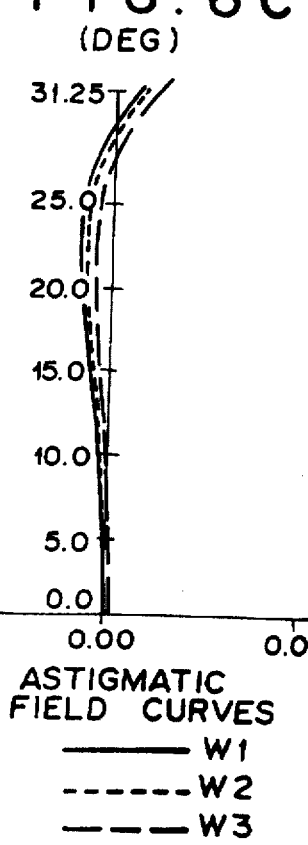
FIG. 6C is a graph showing the astigmatic field curves (curvature of field) of the fθ lens shown in FIG. 6A for the three wavelengths W1, W2 and W3.
Figure 6D:
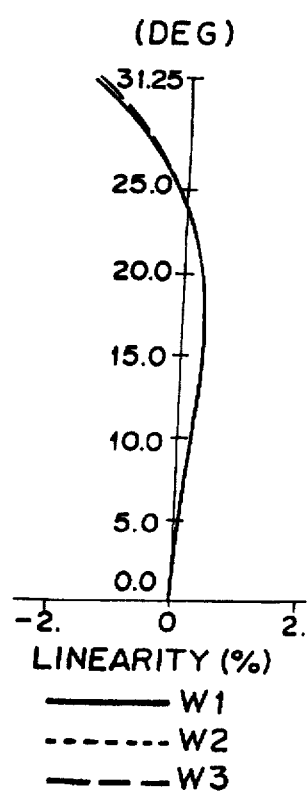
FIG. 6D is a graph showing the linearity (fθ characteristic) of the fθ lens shown in FIG. 6A for the three wavelengths W1, W2 and W3.

$v_{d2} - v_{d3} = 22.6$
lateral color aberration $0.041 \times 10^{-3}$
$\Sigma(\phi i/v_{di}) = -0.012$
curvature of field 0.015
$\phi_{23} = 1.48$
fθ characteristic 1.88%
$d_{12} = 0.07766$ FIGS. 6B to 6D respectively show the lateral color aberration, the astigmatic field curves in the scanning direction and the linearity of the fθ lens of the sixth embodiment when laser beams having wavelengths of 870 nm (W1), 810 nm (W2) and 750 nm (W3) enter the fθ lens.

As can be understood from FIGS. 6B to 6D, in the fθ lens of this embodiment, the lateral color aberration is well corrected for the respective wavelengths in spite of a simple structure consisting of only three lens elements in two lens groups.

In the seventh embodiment shown in FIG. 7A, the factors limited by the formulae (2) to (4) are set substantially at the middle of the ranges defined by the formulae. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 7.

TABLE 7 wavelength W1;890 nm, W2;830 nm, W3;780 nm, angle of view 62.5°

| i | Ri | di | $n_d$ | $v_d$ |
|---|---|---|---|---|
| OBJ | — | infinity | | |
| 0 | infinity | 0.10390 | | |
| 1 | −0.57722 | 0.02474 | $n_{d1}$ 1.56732 | $v_{d1}$ 42.8 |
| 2 | −1.68735 | 0.08847 | | |
| 3 | 4.06146 | 0.09895 | $n_{d2}$ 1.62299 | $v_{d2}$ 58.1 |
| 4 | −0.20052 | 0.02474 | $n_{d3}$ 1.72825 | $v_{d3}$ 28.3 |
| 5 | −0.39721 | 1.11410 | | |
| surface scanned | infinity | — | | |

$v_{d2} - v_{d3} = 29.8$
lateral color aberration $0.029 \times 10^{-3}$
$\Sigma(\phi i/v_{di}) = -0.019$
curvature of field 0.013
$\phi_{23} = 1.46$
fθ characteristic 1.75%
$d_{12} = 0.08847$ FIGS. 7B to 7D respectively show the lateral color aberration, the astigmatic field curves in the scanning direction and the linearity of the fθ lens of the seventh embodiment when laser beams having wavelengths of 890 nm (W1), 830 nm (W2) and 780 nm (W3) enter the fθ lens.

As can be understood from FIGS. 7B to 7D, in the fθ lens of this embodiment, the lateral color aberration is well corrected for the respective wavelengths in spite of a simple structure consisting of only three lens elements in two lens groups.

Figure 8A:
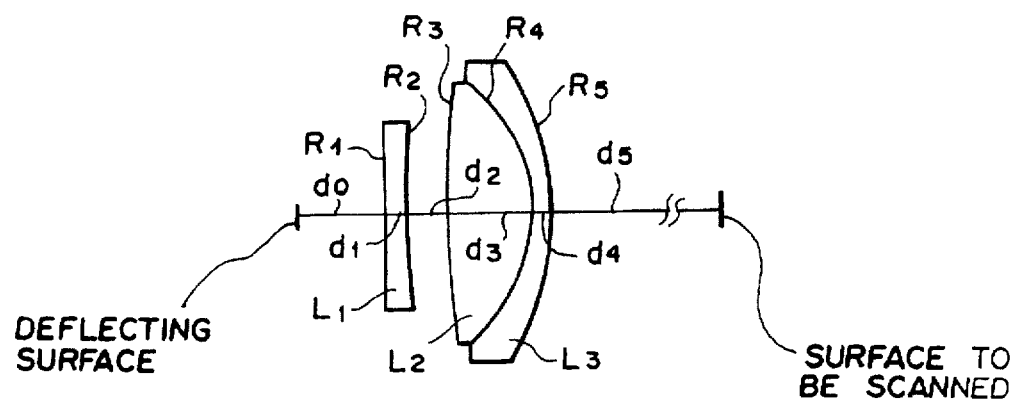
FIG. 8A is a view showing the arrangement of the lens elements in an fθ lens of an eighth embodiment in accordance with the first aspect of the present invention.

In the eighth embodiment shown in FIG. 8A, the first lens L1 has a negative refracting power and the difference between the longest and the shortest of the wavelengths W1 to W3 of the laser beams entering the fθ lens is enlarged. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 8.

TABLE 8 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14278 | | |
| 1 | −1.61585 | 0.02380 | $n_{d1}$ 1.60000 | $v_{d1}$ 42.5 |
| 2 | 1.80042 | 0.04427 | | |
| 3 | 1.08641 | 0.09519 | $n_{d2}$ 1.49700 | $v_{d2}$ 81.6 |
| 4 | −0.18913 | 0.01904 | $n_{d3}$ 1.64844 | $v_{d3}$ 50.9 |
| 5 | −0.32890 | 1.06515 | | |
| surface scanned | infinity | — | | |

Figure 8B:
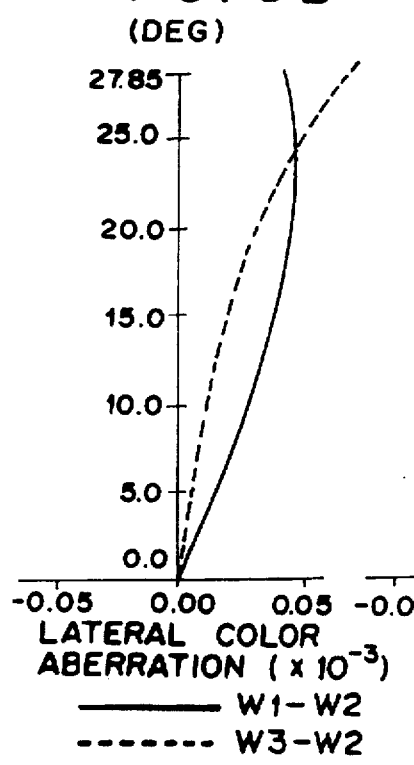
FIG. 8B is a graph showing the lateral color aberration of the fθ lens shown in FIG. 8A for three wavelengths W1, W2 and W3.
Figure 8C:
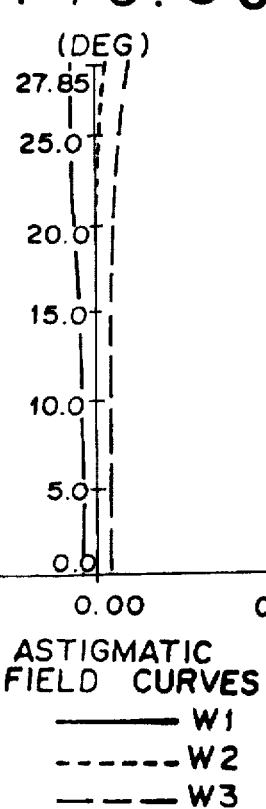
FIG. 8C is a graph showing the astigmatic field curves (curvature of field) of the fθ lens shown in FIG. 8A for the three wavelengths W1, W2 and W3.
Figure 8D:
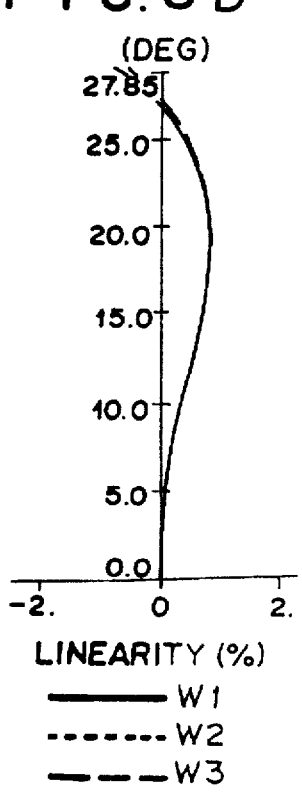
FIG. 8D is a graph showing the linearity (fθ characteristic) of the fθ lens shown in FIG. 8A for the three wavelengths W1, W2 and W3.

$v_{d2} - v_{d3} = 30.7$
lateral color aberration $0.071 \times 10^{-3}$
$\Sigma(\phi i/v_{di}) = -0.007$
curvature of field 0.002
$\phi_{23} = 1.58$
fθ characteristic 1.44%
$d_{12} = 0.04427$ FIGS. 8B to 8D respectively show the lateral color aberration, the astigmatic field curves in the scanning direction and the linearity of the fθ lens of the eighth embodiment when laser beams having wavelengths of 680 nm (W1), 532 nm (W2) and 473 nm (W3) enter the fθ lens.

As can be understood from FIGS. 8B to 8D, in the fθ lens of this embodiment, the lateral color aberration is well corrected for the respective wavelengths in spite of a simple structure consisting of only three lens elements in two lens groups.

Figure 9A:
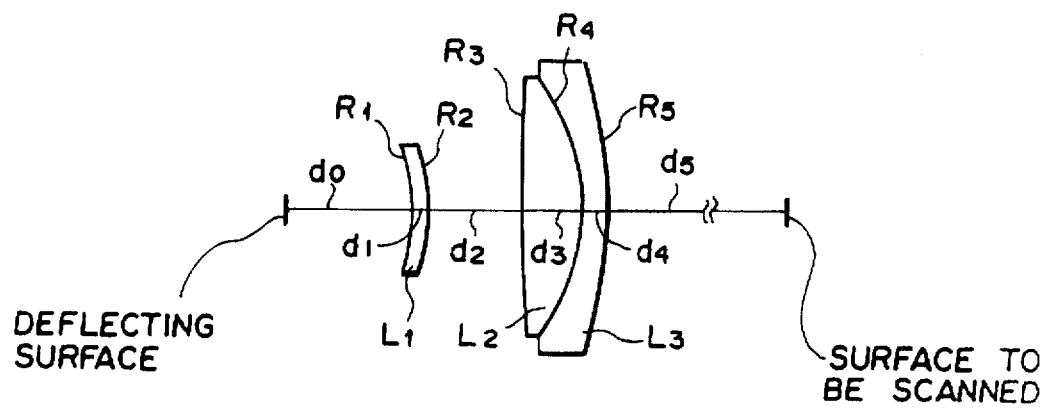
FIG. 9A is a view showing the arrangement of the lens elements in an fθ lens of a ninth embodiment in accordance with the first aspect of the present invention.

In the ninth embodiment shown in FIG. 9A, the first lens L1 has a positive refracting power and the difference between the longest and the shortest of the wavelengths W1 to W3 of the laser beams entering the fθ lens is enlarged. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 9.

TABLE 9 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.09518 | | |
| 1 | −1.61194 | 0.01666 | $n_{d1}$ 1.65844 | $v_{d1}$ 50.9 |
| 2 | −0.16505 | 0.09968 | | |
| 3 | 1.37817 | 0.07138 | $n_{d2}$ 1.49700 | $v_{d2}$ 81.6 |
| 4 | −0.21639 | 0.02855 | $n_{d3}$ 1.67003 | $v_{d3}$ 47.2 |
| 5 | −0.50462 | 1.01642 | | |
| surface scanned | infinity | — | | |

Figure 9B:
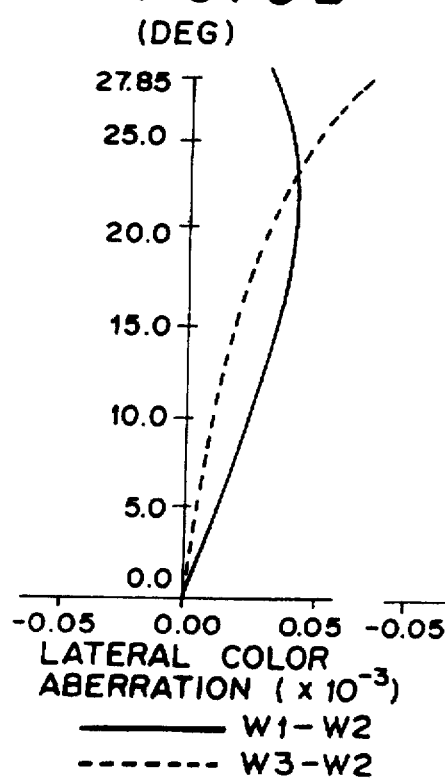
FIG. 9B is a graph showing the lateral color aberration of the fθ lens shown in FIG. 9A for three wavelengths W1, W2 and W3.
Figure 9C:
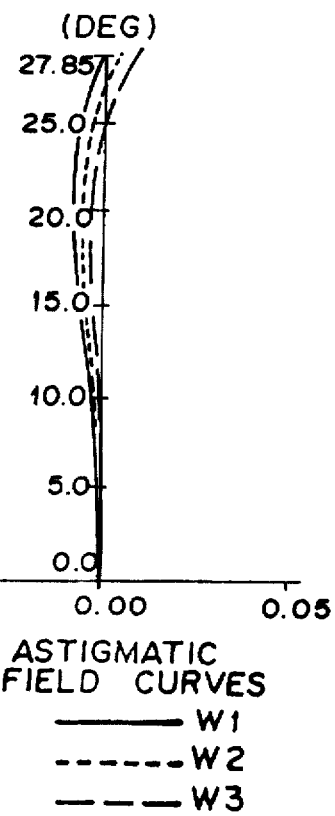
FIG. 9C is a graph showing the astigmatic field curves (curvature of field) of the fθ lens shown in FIG. 9A for the three wavelengths W1, W2 and W3.
Figure 9D:
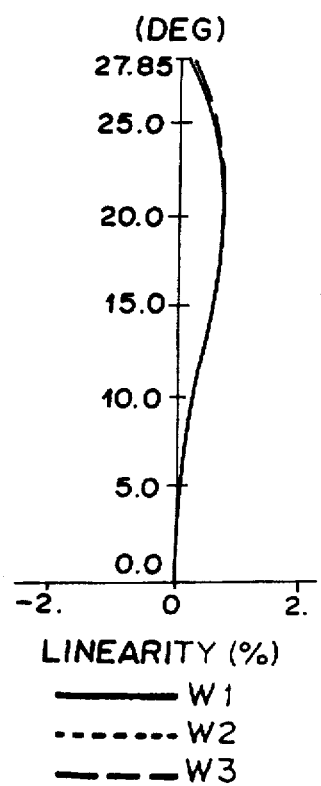
FIG. 9D is a graph showing the linearity (fθ characteristic) of the fθ lens shown in FIG. 9A for the three wavelengths W1, W2 and W3.

$v_{d2} - v_{d3} = 34.4$
lateral color aberration $0.071 \times 10^{-3}$
$\Sigma(\phi i/v_{di}) = -0.002$
curvature of field 0.011
$\phi_{23} = 0.89$
fθ characteristic 0.69%
$d_{12} = 0.09968$ FIGS. 9B to 9D respectively show the lateral color aberration, the astigmatic field curves in the scanning direction and the linearity of the fθ lens of the ninth embodiment when laser beams having wavelengths of 680 nm (W1), 532 nm (W2) and 473 nm (W3) enter the fθ lens.

As can be understood from FIGS. 9B to 9D, in the fθ lens of this embodiment, the lateral color aberration is well corrected for the respective wavelengths in spite of a simple structure consisting of only three lens elements in two lens groups.

As can be understood from the description above, in the fθ lens in accordance with the first aspect of the present invention, the color aberration can be corrected with a high accuracy over a wide wavelength range, and accordingly, the error in superimposing the beam spots can be reduced in the scanning optical system or the like using a plurality of laser beams having different wavelengths. Further since being simple in structure, the fθ lens in accordance with the first aspect of the present invention can be manufactured at low cost.

The fθ lens in accordance with the first aspect of the present invention need not be limited to those described above but may be variously modified so long as the formulae (1) to (4) are satisfied.

The fθ lenses of tenth to thirteenth embodiments shown in FIGS. 10A to 13A comprise an aspheric lense.

Figure 10A:
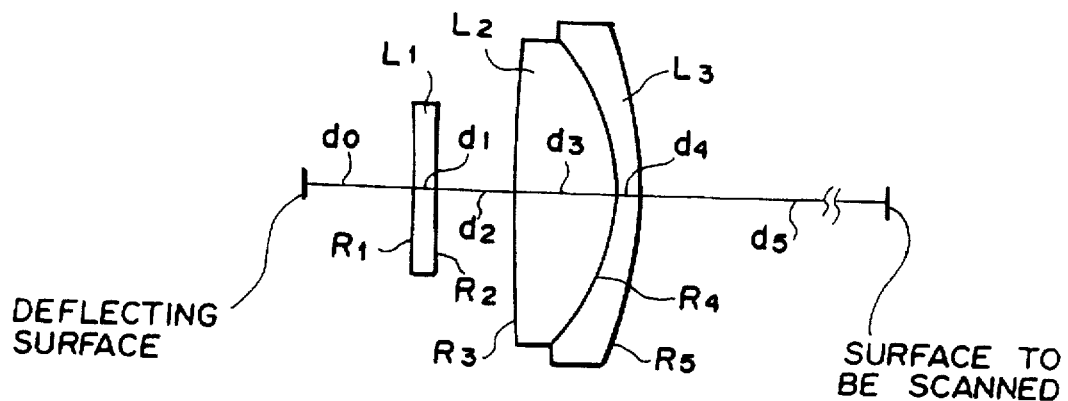
FIG. 10A is a view showing the arrangement of the lens elements in an fθ lens of a tenth embodiment in accordance with the first aspect of the present invention.

In the tenth embodiment shown in FIG. 10A, the first surface of the first lens L1 (the entrance surface) is an aspheric surface as shown in table 10 and the factors limited by the formulae (2) to (4) are set substantially at the middle of the ranges defined by the formulae. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 10.

In table 10, the value designated by ★ represents the radius of curvature on the optical axis (at the vertex of the aspheric surface) and means that the aspheric surface has a shape defined by the following formula (13). (the same in tables 11 to 13, 21 to 24, 34 and 35)

$$x = ch^2/[1+\{1-(1+k)c^2h^2\}^{1/2}] + a_1 h^4 + a_2 h^6 + a_3 h^8 + a_4 h^{10} \quad (13)$$

wherein x represents the length of a perpendicular line between a point on an aspheric plane at a height of h above the optical axis and a plane tangent to the aspheric plane (a plane perpendicular to the optical axis) (as standardized on the basis of the focal length of the whole system), h represents the height above the optical axis (as standardized on the basis of the focal length of the whole system), c represents the curvature at the vertex of the aspheric plane (the reciprocal of the radius of curvature $=1/R$), k represents a conic constant, and $a_1$ to $a_4$ respectively represents four-dimensional, six-dimensional, eight-dimensional and ten-dimensional aspheric coefficients.

TABLE 10 wavelength W1:810 nm, W2:750 nm, W3:680 nm, angle of view 62.5°

| i | Ri | di | $n_d$ | $v_d$ |
|---|----|----|-------|-------|
| OBJ | — | infinity | | |
| 0 | infinity | 0.11999 | | |
| 1 | −1.65445★ | 0.02475 | $n_{d1}$ 1.48749 | $v_{d1}$ 70.4 |
| 2 | 26.55325 | 0.07455 | | |
| 3 | 2.88037 | 0.09941 | $n_{d2}$ 1.63930 | $v_{d2}$ 45.1 |
| 4 | −0.21440 | 0.02485 | $n_{d3}$ 1.80518 | $v_{d3}$ 25.5 |
| 5 | −0.44731 | 1.04490 | | |

TABLE 10-continued wavelength W1:810 nm, W2:750 nm, W3:680 nm, angle of view 62.5°

| i | Ri | di | $n_d$ | $v_d$ |
|---|----|----|-------|-------|
| surface scanned | infinity | — | | |

Figure 10B:
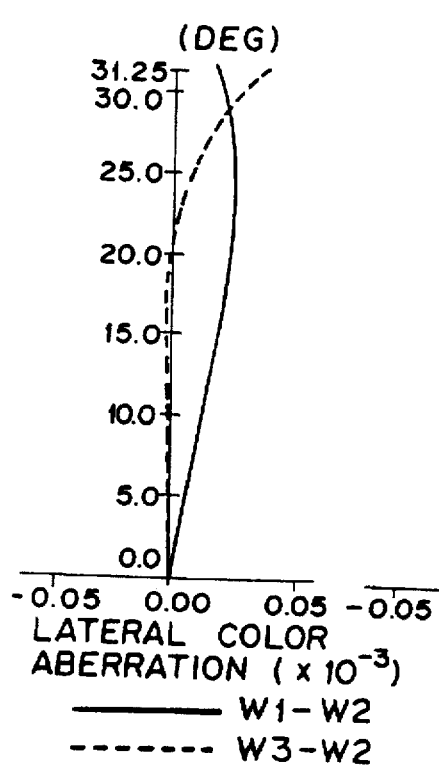
FIG. 10B is a graph showing the lateral color aberration of the fθ lens shown in FIG. 10A for three wavelengths W1, W2 and W3.
Figure 10C:
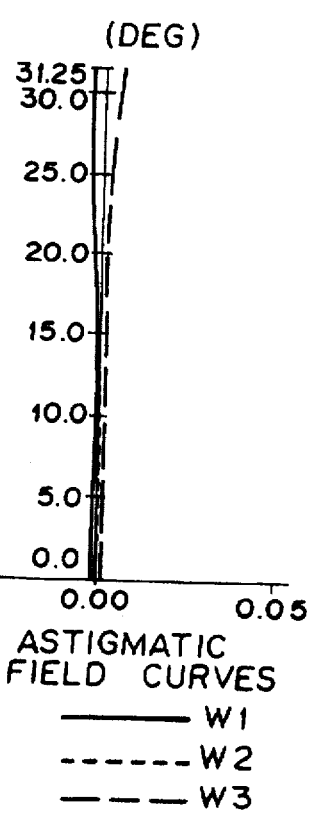
FIG. 10C is a graph showing the astigmatic field curves (curvature of field) of the fθ lens shown in FIG. 10A for the three wavelengths W1, W2 and W3.
Figure 10D:
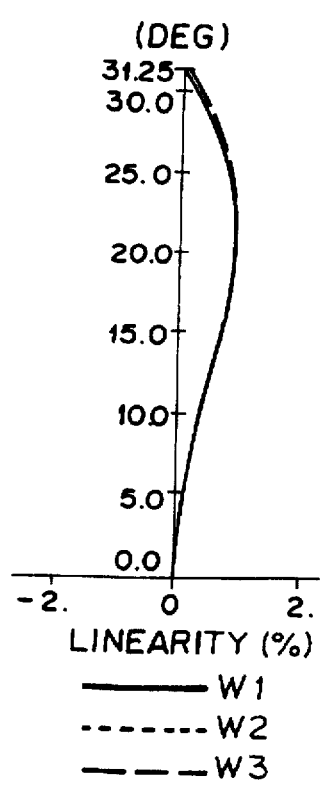
FIG. 10D is a graph showing the linearity (fθ characteristic) of the fθ lens shown in FIG. 10A for the three wavelengths W1, W2 and W3.

$v_{d2} - v_{d3} = 19.6$
lateral color aberration $0.038 \times 10^{-3}$
$\Sigma(\phi i/v_{di}) = -0.007$
curvature of field 0.001
$\phi_{23} = 1.25$
fθ characteristic 0.89%
$d_{12} = 0.07455$
$k = -7.7304$
$a_1 = 0.2513$
$a_2 = 1.4333 \times 10^2$
$a_3 = 0$
$a_4 = 0$ FIGS. 10B to 10D respectively show the lateral color aberration, the astigmatic field curves in the scanning direction and the linearity of the fθ lens of the tenth embodiment when laser beams having wavelengths of 810 nm (W1), 750 nm (W2) and 680 nm (W3) enter the fθ lens.

As can be understood from FIGS. 10B to 10D, in the fθ lens of this embodiment, the lateral color aberration is well corrected for the respective wavelengths in spite of a simple structure consisting of only three lens elements in two lens groups.

Figure 11A:
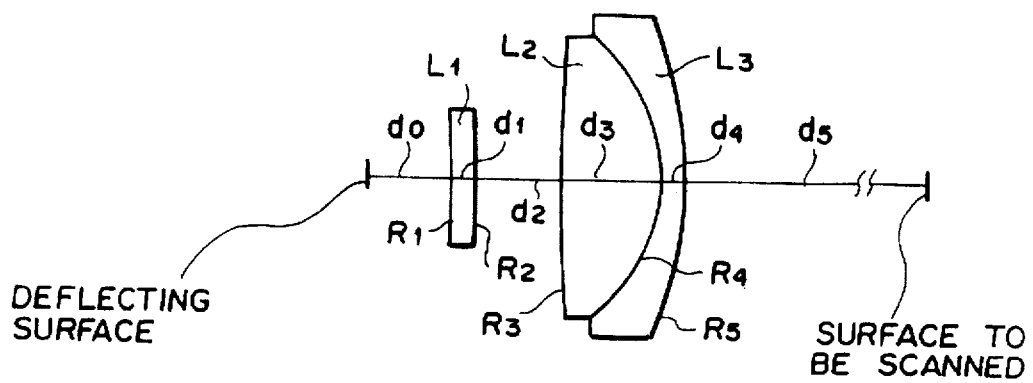
FIG. 11A is a view showing the arrangement of the lens elements in an fθ lens of an eleventh embodiment in accordance with the first aspect of the present invention.

In the eleventh embodiment shown in FIG. 11A, the second surface of the first lens L1 (the exit surface) is an aspheric surface as shown in table 11 and the factors limited by the formulae (2) to (4) are set substantially at the middle of the ranges defined by the formulae. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 11.

TABLE 11 wavelength W1:870 nm, W2:810 nm, W3:750 nm, angle of view 62.5°

| i | Ri | di | $n_d$ | $v_d$ |
|---|----|----|-------|-------|
| OBJ | — | infinity | | |
| 0 | infinity | 0.07950 | | |
| 1 | −0.71770 | 0.02484 | $n_{d1}$ 1.51680 | $v_{d1}$ 64.2 |
| 2 | −6.02623★ | 0.08604 | | |
| 3 | 5.67504 | 0.09937 | $n_{d2}$ 1.65844 | $v_{d2}$ 50.9 |
| 4 | −0.17857 | 0.02484 | $n_{d3}$ 1.72825 | $v_{d3}$ 28.3 |
| 5 | −0.41850 | 1.10872 | | |
| surface scanned | infinity | — | | |

Figure 11B:
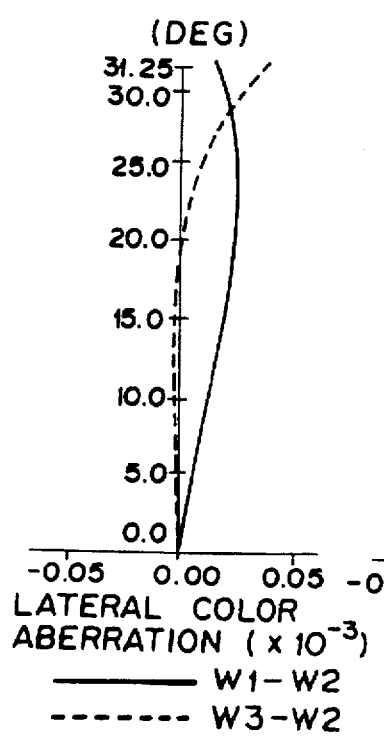
FIG. 11B is a graph showing the lateral color aberration of the fθ lens shown in FIG. 11A for three wavelengths W1, W2 and W3.
Figure 11C:
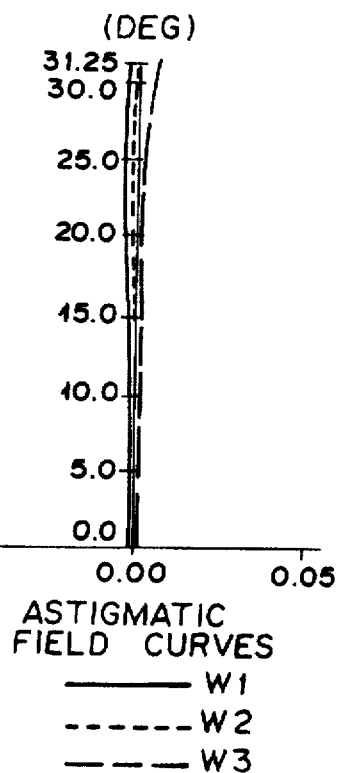
FIG. 11C is a graph showing the astigmatic field curves (curvature of field) of the fθ lens shown in FIG. 11A for the three wavelengths W1, W2 and W3.
Figure 11D:
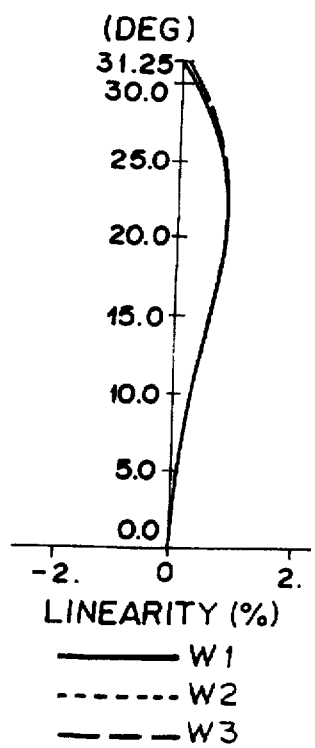
FIG. 11D is a graph showing the linearity (fθ characteristic) of the fθ lens shown in FIG. 11A for the three wavelengths W1, W2 and W3.

$v_{d2} - v_{d3} = 22.6$
lateral color aberration $0.036 \times 10^{-3}$
$\Sigma(\phi i/v_{di}) = -0.014$
curvature of field 0.002
$\phi_{23} = 1.46$
fθ characteristic 0.82%
$d_{12} = 0.08604$
$k = 4383.87$
$a_1 = 0.8706$
$a_2 = -1.0612 \times 10^2$
$a_3 = 3.5625 \times 10^4$
$a_4 = 0$ FIGS. 11B to 11D respectively show the lateral color aberration, the astigmatic field curves in the scanning direction and the linearity of the fθ lens of the eleventh embodiment when laser beams having wavelengths of 870 nm (W1), 810 nm (W2) and 750 nm (W3) enter the fθ lens.

As can be understood from FIGS. 11B to 11D, in the fθ lens of this embodiment, the lateral color aberration is well corrected for the respective wavelengths in spite of a simple structure consisting of only three lens elements in two lens groups.

Figure 12A:
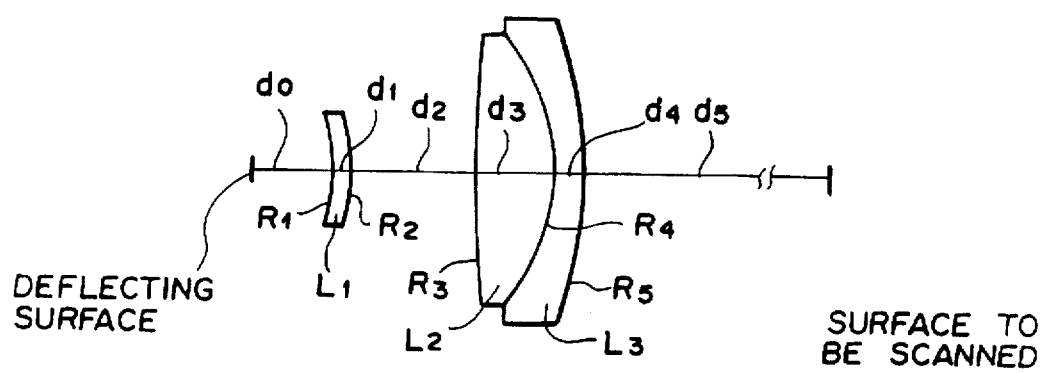
FIG. 12A is a view showing the arrangement of the lens elements in an fθ lens of an twelfth embodiment in accordance with the first aspect of the present invention.

In the twelfth embodiment shown in FIG. 12A, the first surface of the second lens L2 (the entrance surface) is an aspheric surface as shown in table 12, the first lens L1 has a positive refracting power and the difference between the longest and the shortest of the wavelengths W1 to W3 of the laser beams entering the fθ lens is enlarged. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 12.

TABLE 12 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.07613 | | |
| 1 | −0.16136 | 0.01665 | $n_{d1}$ 1.65844 | $v_{d1}$ 50.9 |
| 2 | −0.16480 | 0.11960 | | |
| 3 | 1.69737★ | 0.07137 | $n_{d2}$ 1.49700 | $v_{d2}$ 81.6 |
| 4 | −0.21108 | 0.02855 | $n_{d3}$ 1.67003 | $v_{d3}$ 47.2 |
| 5 | −0.47179 | 1.02119 | | |
| surface scanned | infinity | — | | |

Figure 12B:
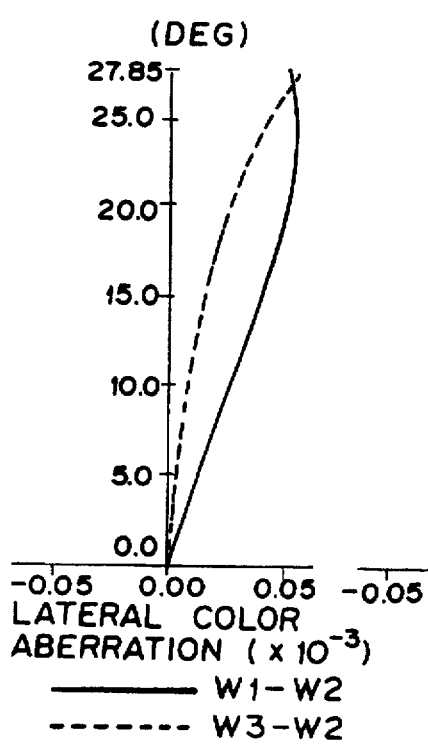
FIG. 12B is a graph showing the lateral color aberration of the fθ lens shown in FIG. 12A for three wavelengths W1, W2 and W3.
Figure 12C:
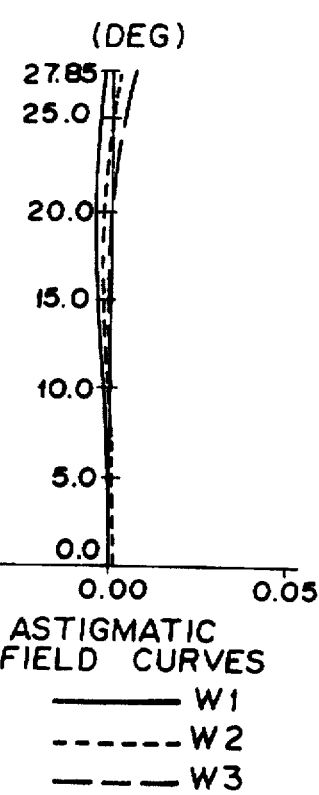
FIG. 12C is a graph showing the astigmatic field curves (curvature of field) of the fθ lens shown in FIG. 12A for the three wavelengths W1, W2 and W3.
Figure 12D:
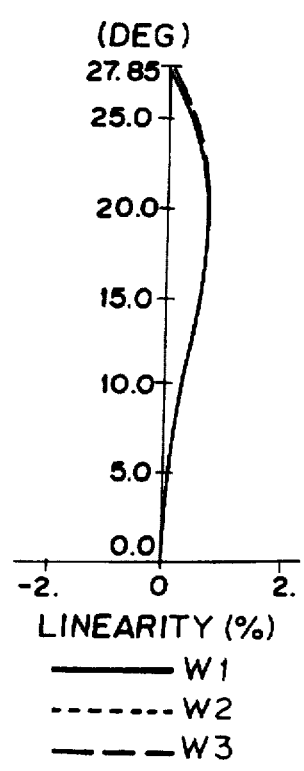
FIG. 12D is a graph showing the linearity (fθ characteristic) of the fθ lens shown in FIG. 12A for the three wavelengths W1, W2 and W3.

$v_{d2} - v_{d3} = 34.4$
lateral color aberration $0.057 \times 10^{-3}$
$\Sigma(\phi i/v_{di}) = -0.002$
curvature of field 0.005
$\phi_{23} = 0.90$
fθ characteristic 0.69%
$d_{12} = 0.11960$
$k = 30.6572$
$a_1 = -0.4346$
$a_2 = -2.5820$
$a_3 = 0$
$a_4 = 0$ FIGS. 12B to 12D respectively show the lateral color aberration, the astigmatic field curves in the scanning direction and the linearity of the fθ lens of the twelfth embodiment when laser beams having wavelengths of 680 nm (W1), 532 nm (W2) and 473 nm (W3) enter the fθ lens.

As can be understood from FIGS. 12B to 12D, in the fθ lens of this embodiment, the lateral color aberration is well corrected for the respective wavelengths in spite of a simple structure consisting of only three lens elements in two lens groups.

Figure 13A:
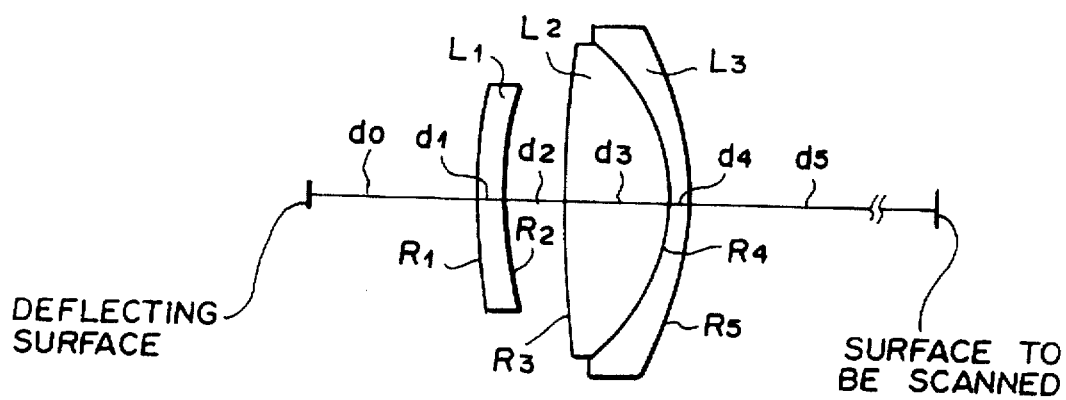
FIG. 13A is a view showing the arrangement of the lens elements in an fθ lens of an thirteenth embodiment in accordance with the first aspect of the present invention.

In the thirteenth embodiment shown in FIG. 13A, the second surface of the third lens L3 (the exit surface) is an aspheric surface as shown in table 13 and the difference between the longest and the shortest of the wavelengths W1 to W3 of the laser beams entering the fθ lens is enlarged. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 13.

TABLE 13 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.15546 | | |
| 1 | 0.77803 | 0.02380 | $n_{d1}$ 1.60000 | $v_{d1}$ 42.5 |
| 2 | 0.48766 | 0.05440 | | |

TABLE 13-continued wavelength W1;680 nm, W2;532 nm, W3;473 nm, angle of view 55.7°

| i | Ri | di | $n_d$ | $v_d$ |
|---|---|---|---|---|
| 3 | 1.53489 | 0.09520 | $n_{d2}$ 1.49700 | $v_{d2}$ 81.6 |
| 4 | −0.18752 | 0.01904 | $n_{d3}$ 1.65844 | $v_{d3}$ 50.9 |
| 5 | −0.34026★ | 1.03201 | | |
| surface scanned | infinity | — | | |

Figure 13B:
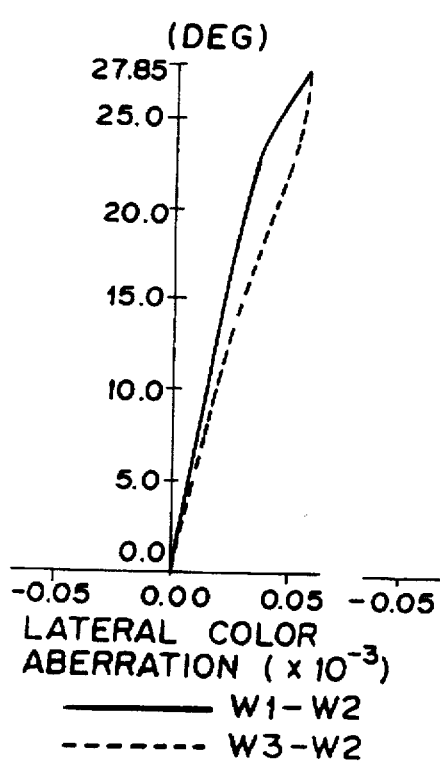
FIG. 13B is a graph showing the lateral color aberration of the fθ lens shown in FIG. 13A for three wavelengths W1, W2 and W3.
Figure 13C:
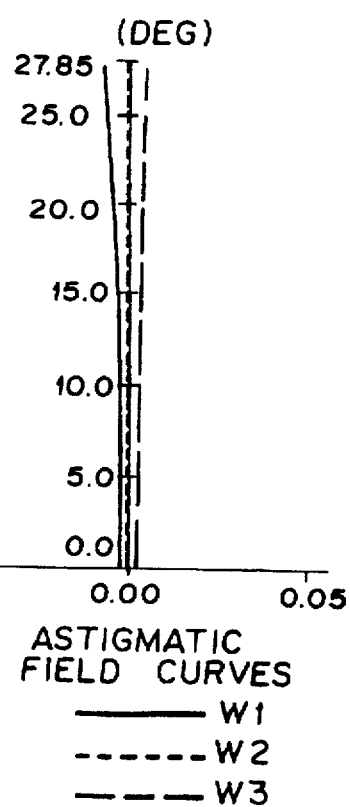
FIG. 13C is a graph showing the astigmatic field curves (curvature of field) of the fθ lens shown in FIG. 13A for the three wavelengths W1, W2 and W3.
Figure 13D:
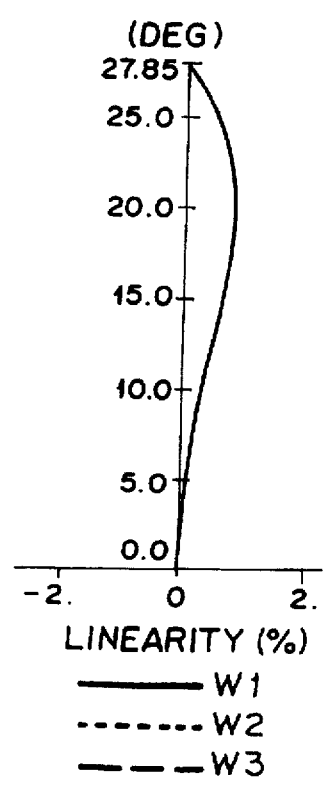
FIG. 13D is a graph showing the linearity (fθ characteristic) of the fθ lens shown in FIG. 13A for the three wavelengths W1, W2 and W3.

$v_{d2} - v_{d3} = 30.7$
lateral color aberration $0.057 \times 10^{-3}$
$\Sigma(\phi i/v_{di}) = -0.004$
curvature of field 0.001
$\phi_{23} = 1.39$
fθ characteristic 0.82%
$d_{12} = 0.05440$
$k = 0.5643$
$a_1 = 0.4421$
$a_2 = -1.7884$
$a_3 = -5.1822 \times 10$
$a_4 = -1.9613 \times 10^3$ FIGS. 13B to 13D respectively show the lateral color aberration, the astigmatic field curves in the scanning direction and the linearity of the fθ lens of the thirteenth embodiment when laser beams having wavelengths of 680 nm (W1), 532 nm (W2) and 473 nm (W3) enter the fθ lens.

As can be understood from FIGS. 13B to 13D, in the fθ lens of this embodiment, the lateral color aberration is well corrected for the respective wavelengths in spite of a simple structure consisting of only three lens elements in two lens groups.

fθ lenses of eleven embodiments in accordance with the second aspect of the present invention will be described with reference to FIGS. 14 (14A to 14D) to 24 (24A to 24D) and tables 14 to 24, hereinbelow. FIGS. 14A to 24A respectively show the arrangements of the lens elements of the fθ lenses of first to eleventh embodiments, and FIGS. 14B, 14C and 14D to 24B, 24C and 24D respectively show the lateral color aberration, the astigmatic field curves (curvature of field) and the linearity (fθ characteristic) of the fθ lenses of the first to eleventh embodiments when three laser beams having different wavelengths W1, W2 and W3 used in a scanning optical system enter the respective fθ lenses. The values of the wavelengths W1, W2 and W3 are shown on the top of the tables corresponding to the fθ lenses.

Each fθ lens comprises first and second lens groups arranged in this order from the entrance pupil (deflecting surface) side. The first lens group consists of first and second lenses L1' and L2' cemented together, the refracting powers of the first and second lenses L1' and L2' being one of the combinations of negative and positive, positive and positive, and positive and negative. The second lens group consists of a third lens L3' having a positive or negative refracting power. The first and second lens groups satisfies the following formulae (5) to (9), $$2 \leq |v_{d1} - v_{d2}| \tag{5}$$

$$-0.020 \leq \Sigma(\phi/v_{di}) \leq 0.005 \tag{6}$$

$$35 \leq v_{d2} \tag{7}$$

$$1.0 \leq \phi_{12} \leq 2.5 \tag{8}$$

$$0.01 \leq d_{12} \leq 0.22 \tag{9}$$

wherein $\phi_i$ represents the power of i-th lens as numbered from the entrance pupil side standardized on the basis of the power of the whole system, $\phi_{12}$ represents the power of the first lens group standardized on the basis of the power of the whole system, vdi represents the Abbe's number for the sodium d-line of i-th lens as numbered from the entrance pupil side, $v_{dL}$ represents the Abbe's number for the sodium d-line of one of the first and second lenses having the smaller dispersive power than the other and $d_{12}$ represents the surface separation between the first and second lens groups standardized on the basis of the focal length of the whole system.

Figure 14A:
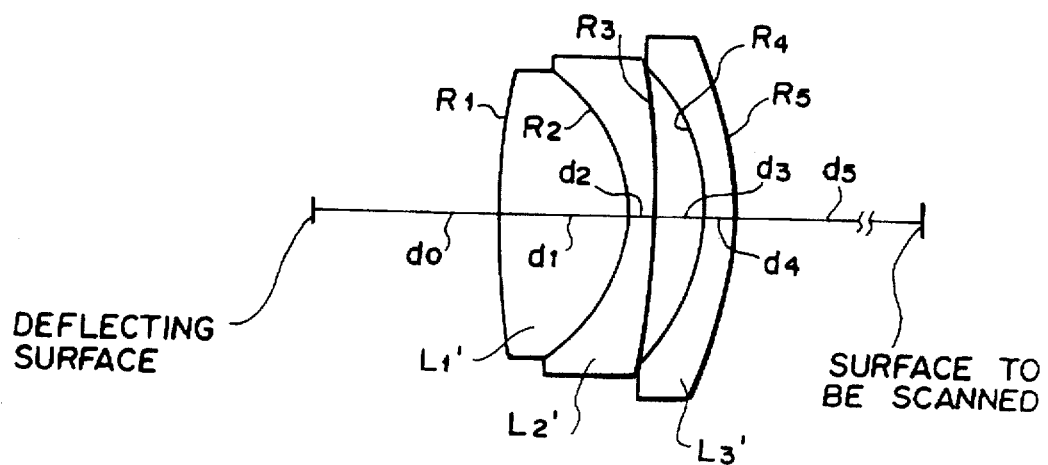
FIG. 14A is a view showing the arrangement of the lens elements in an fθ lens of a first embodiment in accordance with the second aspect of the present invention.

In the first embodiment of the second aspect of the present invention shown in FIG. 14A, the first lens L1' has a positive refracting power, the second lens L2' has a negative refracting power and the power of the first lens group is set close to the upper limit of the range defined by the formula (8). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 14.

TABLE 14 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 0.68707 | 0.09480 | $n_{d1}$ 1.62280 | $v_{d1}$ 56.9 |
| 2 | −0.12788 | 0.01896 | $n_{d2}$ 1.54041 | $v_{d2}$ 51.0 |
| 3 | −0.59246 | 0.03447 | | |
| 4 | −0.16691 | 0.02370 | $n_{d3}$ 1.57845 | $v_{d3}$ 41.7 |
| 5 | −0.31521 | 0.85500 | | |
| surface scanned | infinity | — | | |

Figure 14B:
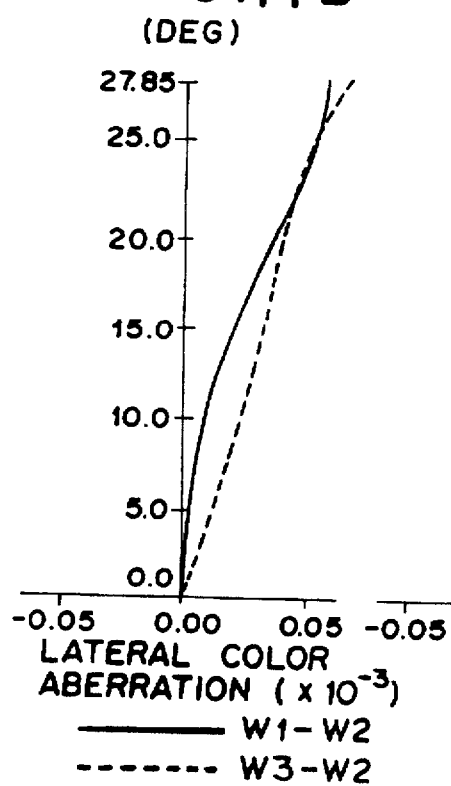
FIG. 14B is a graph showing the lateral color aberration of the fθ lens shown in FIG. 14A for three wavelengths W1, W2 and W3.
Figure 14C:
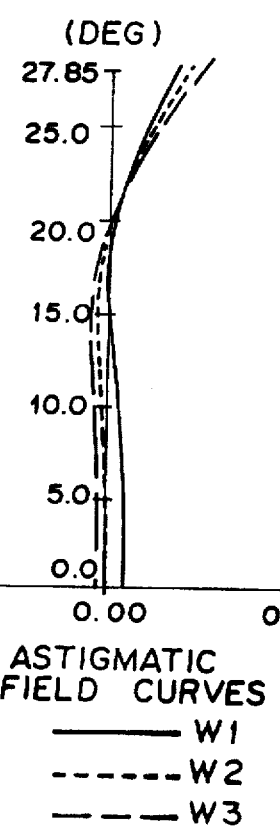
FIG. 14C is a graph showing the astigmatic field curves (curvature of field) of the fθ lens shown in FIG. 14A for the three wavelengths W1, W2 and W3.
Figure 14D:
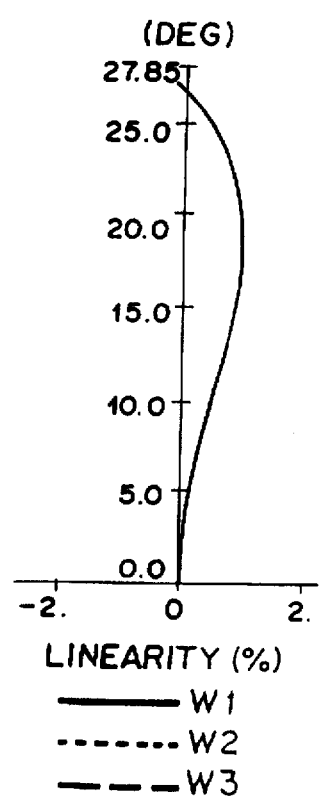
FIG. 14D is a graph showing the linearity (fθ characteristic) of the fθ lens shown in FIG. 14A for the three wavelengths W1, W2 and W3.

$|v_{d1} - v_{d2}| = 5.9$
lateral color aberration $0.067 \times 10^{-3}$
$\Sigma(\phi i/v_{di}) = -0.004$
curvature of field 0.023
$v_{dL} = 56.9$
fθ characteristic 1.28%
$\phi_{12} = 2.37$
$d_{12} = 0.03447$ FIGS. 14B to 14D respectively show the lateral color aberration, the astigmatic field curves in the scanning direction and the linearity of the fθ lens of the first embodiment when laser beams having wavelengths of 680 nm (W1), 532 nm (W2) and 473 nm (W3) enter the fθ lens.

As can be understood from FIGS. 14B to 14D, in the fθ lens of this embodiment, the lateral color aberration is well corrected for the respective wavelengths in spite of a simple structure consisting of only three lens elements in two lens groups.

Figure 15A:
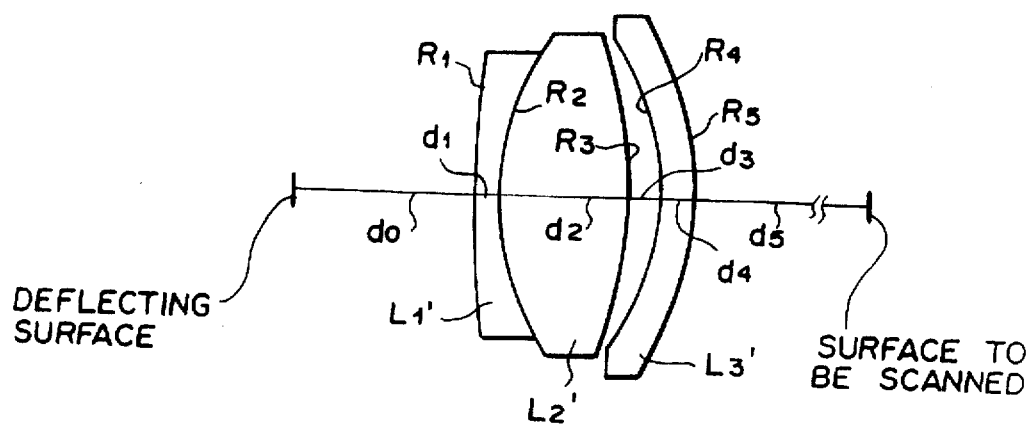
FIG. 15A is a view showing the arrangement of the lens elements in an fθ lens of a second embodiment in accordance with the second aspect of the present invention.

In the second embodiment shown in FIG. 15A, the first lens L1' has a negative refracting power, the second lens L2' has a positive refracting power and the power of the first lens group is set substantially at the middle of the range defined by the formula (8). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 15.

TABLE 15 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 0.96791 | 0.01905 | $n_{d1}$ 1.48749 | $v_{d1}$ 70.4 |
| 2 | 0.22673 | 0.09524 | $n_{d2}$ 1.49700 | $v_{d2}$ 81.6 |
| 3 | −0.36345 | 0.02250 | | |
| 4 | −0.20429 | 0.02370 | $n_{d3}$ 1.80450 | $v_{d3}$ 39.6 |

TABLE 15-continued wavelength W1;680 nm, W2;532 nm, W3;473 nm, angle of view 55.7°

| i | Ri | di | $n_d$ | $v_d$ |
|---|---|---|---|---|
| 5 | −0.27455 | 0.94015 | | |
| surface scanned | infinity | — | | |

$|v_{d1} - v_{d2}| = 11.2$
$\Sigma(\phi i/v_{di}) = -0.004$
$v_{dL} = 81.6$
$\phi_{12} = 1.86$
$d_{12} = 0.02250$
lateral color aberration $0.037 \times 10^{-3}$
curvature of field 0.023
fθ characteristic 1.35%

Figure 15B:
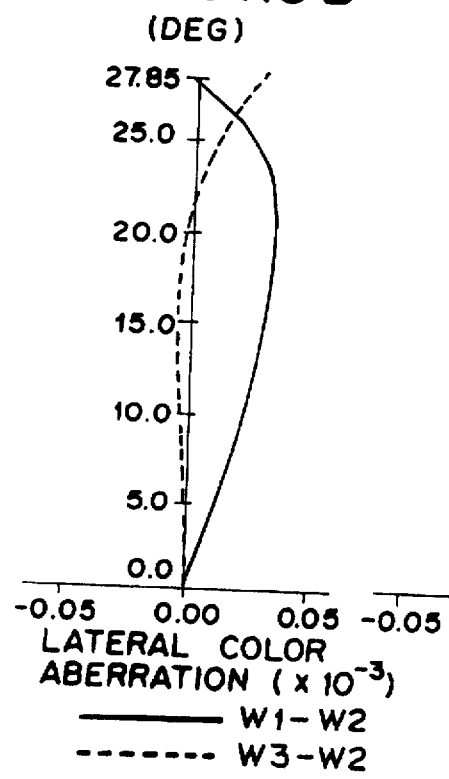
FIG. 15B is a graph showing the lateral color aberration of the fθ lens shown in FIG. 15A for three wavelengths W1, W2 and W3.
Figure 15C:
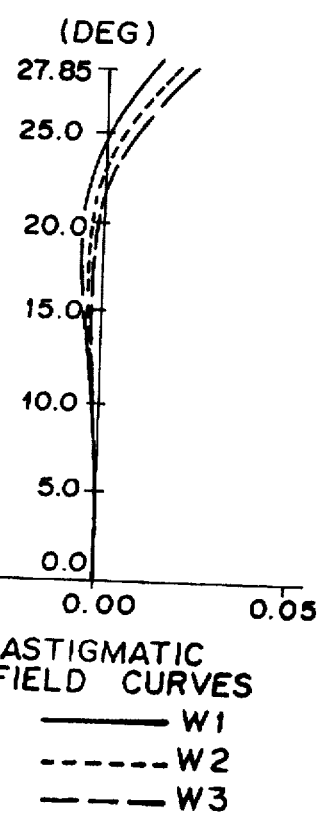
FIG. 15C is a graph showing the astigmatic field curves (curvature of field) of the fθ lens shown in FIG. 15A for the three wavelengths W1, W2 and W3.
Figure 15D:
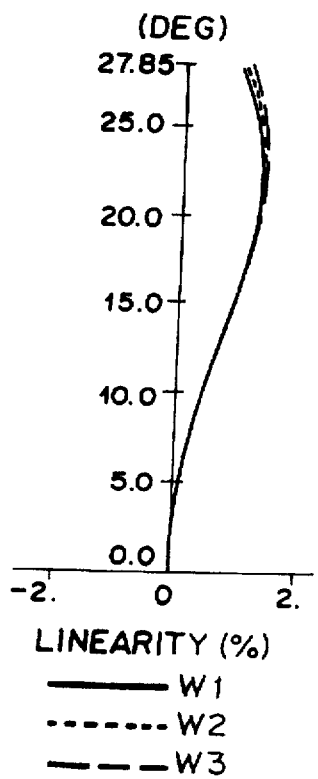
FIG. 15D is a graph showing the linearity (fθ characteristic) of the fθ lens shown in FIG. 15A for the three wavelengths W1, W2 and W3.

FIGS. 15B to 15D respectively show the lateral color aberration, the astigmatic field curves in the scanning direction and the linearity of the fθ lens of the second embodiment when laser beams having wavelengths of 680 nm (W1), 532 nm (W2) and 473 nm (W3) enter the fθ lens.

As can be understood from FIGS. 15B to 15D, in the fθ lens of this embodiment, the lateral color aberration is well corrected for the respective wavelengths in spite of a simple structure consisting of only three lens elements in two lens groups.

Figure 16A:
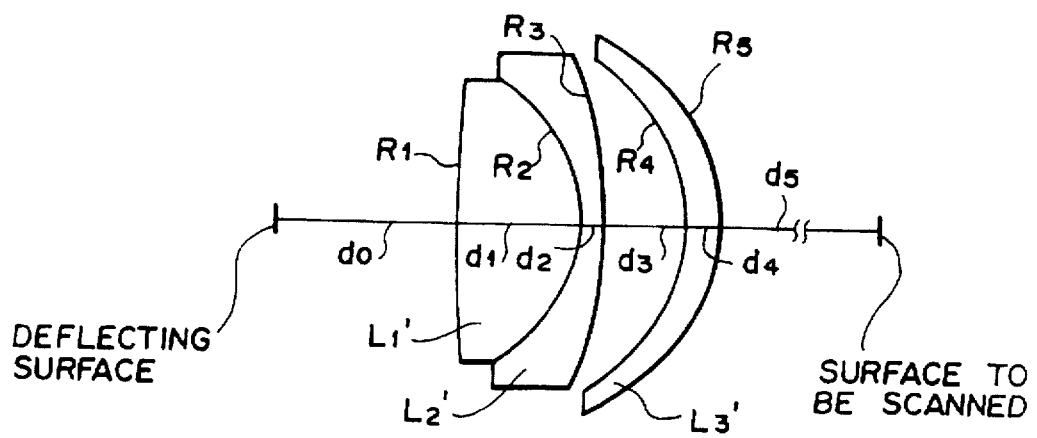
FIG. 16A is a view showing the arrangement of the lens elements in an fθ lens of a third embodiment in accordance with the second aspect of the present invention.

In the third embodiment shown in FIG. 16A, the first lens L1' has a positive refracting power, the second lens L2' has a negative refracting power and the third lens L3' has a positive refracting power. Further the sum of the values obtained by dividing the powers of the respective lenses by the Abbe's numbers of the respective lenses is set close to the lower limit of the range defined by the formula (6) and the power of the first lens group is set close to the lower limit of the range defined by the formula (8). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 16.

TABLE 16 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 1.65490 | 0.09480 | $n_{d1}$ 1.49700 | $v_{d1}$ 81.6 |
| 2 | −0.12295 | 0.01896 | $n_{d2}$ 1.62012 | $v_{d2}$ 49.8 |
| 3 | −0.34948 | 0.05834 | | |
| 4 | −0.14919 | 0.02370 | $n_{d3}$ 1.80610 | $v_{d3}$ 33.3 |
| 5 | −0.15976 | 0.97879 | | |
| surface scanned | infinity | — | | |

$|v_{d1} - v_{d2}| = 31.8$
$\Sigma(\phi i/v_{di}) = -0.011$
$v_{dL} = 81.6$
$\phi_{12} = 1.07$
$d_{12} = 0.05834$
lateral color aberration $0.046 \times 10^{-3}$
curvature of field 0.023
fθ characteristic 0.92%

Figure 16B:
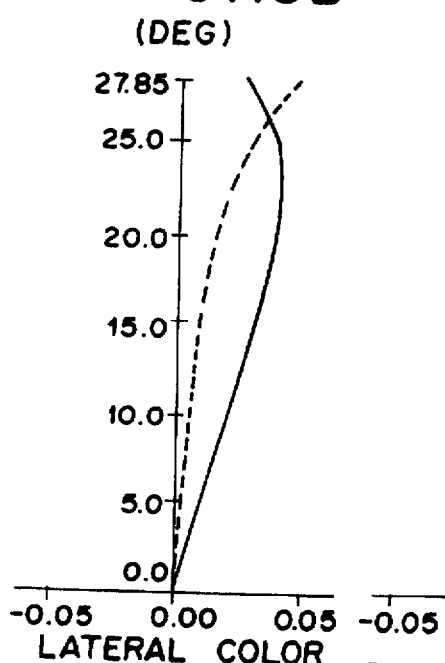
FIG. 16B is a graph showing the lateral color aberration of the fθ lens shown in FIG. 16A for three wavelengths W1, W2 and W3.
Figure 16C:
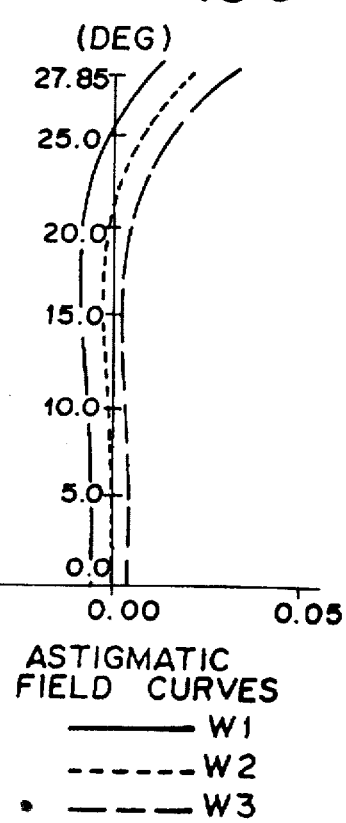
FIG. 16C is a graph showing the astigmatic field curves (curvature of field) of the fθ lens shown in FIG. 16A for the three wavelengths W1, W2 and W3.
Figure 16D:
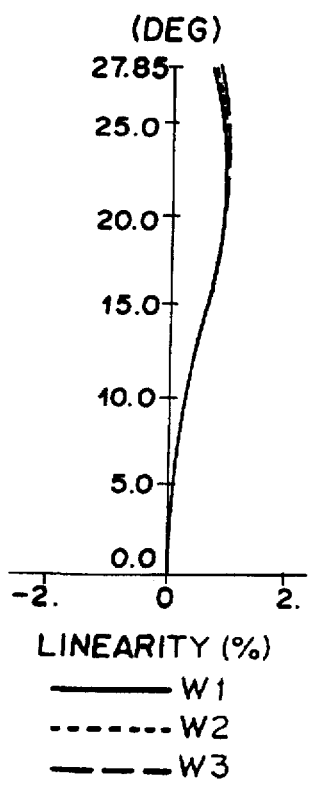
FIG. 16D is a graph showing the linearity (fθ characteristic) of the fθ lens shown in FIG. 16A for the three wavelengths W1, W2 and W3.

FIGS. 16B to 16D respectively show the lateral color aberration, the astigmatic field curves in the scanning direction and the linearity of the fθ lens of the third embodiment when laser beams having wavelengths of 680 nm (W1), 532 nm (W2) and 473 nm (W3) enter the fθ lens.

As can be understood from FIGS. 16B to 16D, in the fθ lens of this embodiment, the lateral color aberration is well corrected for the respective wavelengths in spite of a simple structure consisting of only three lens elements in two lens groups.

Figure 17A:
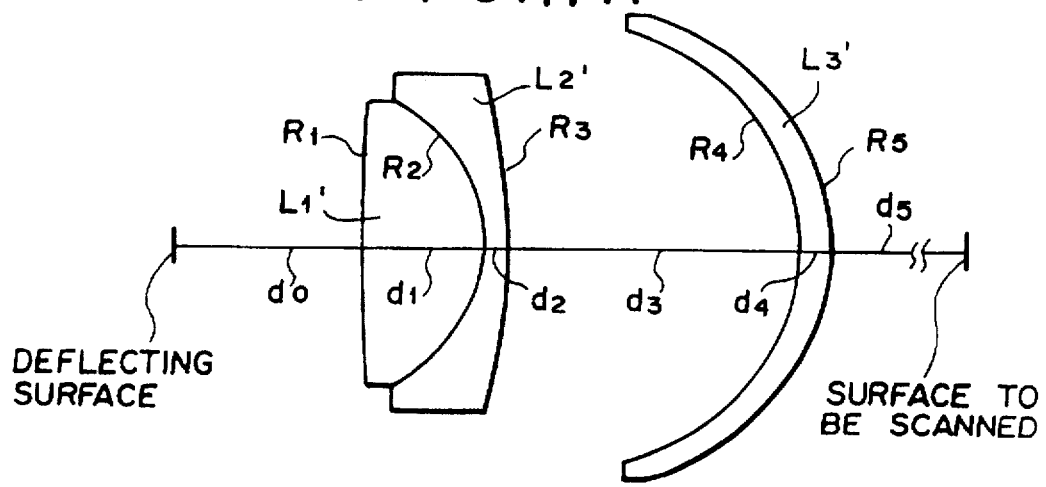
FIG. 17A is a view showing the arrangement of the lens elements in an fθ lens of a fourth embodiment in accordance with the second aspect of the present invention.

In the fourth embodiment shown in FIG. 17A, the first lens L1' has a positive refracting power, the second lens L2' has a negative refracting power and the surface separation $d_{12}$ between the first and second lens groups is set close to the upper limit of the range defined by the formula (9). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 17.

TABLE 17 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 1.21407 | 0.09480 | $n_{d1}$ 1.49700 | $v_{d1}$ 81.6 |
| 2 | −0.11808 | 0.18960 | $n_{d2}$ 1.53996 | $v_{d2}$ 59.7 |
| 3 | −0.49715 | 0.21251 | | |
| 4 | −0.16849 | 0.02370 | $n_{d3}$ 1.56873 | $v_{d3}$ 63.1 |
| 5 | −0.18138 | 0.75813 | | |
| surface scanned | infinity | — | | |

$|v_{d1} - v_{d2}| = 21.9$
$\Sigma(\phi i/v_{di}) = -0.004$
$v_{dL} = 81.6$
$\phi_{12} = 1.11$
$d_{12} = 0.21251$
lateral color aberration 0.018 × 10$^{-3}$
curvature of field 0.026
fθ characteristic 1.40%

Figure 17B:
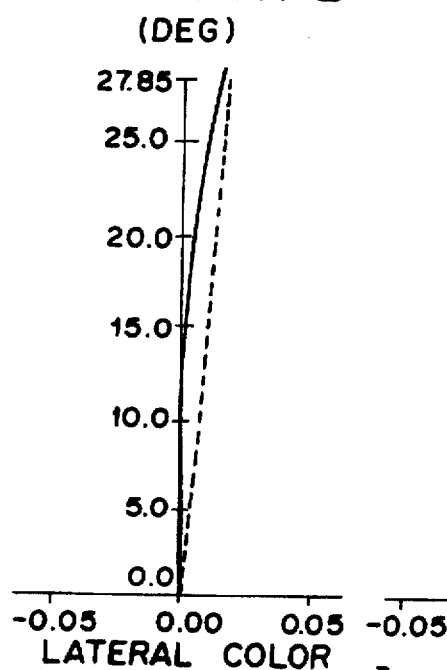
FIG. 17B is a graph showing the lateral color aberration of the fθ lens shown in FIG. 17A for three wavelengths W1, W2 and W3.
Figure 17C:
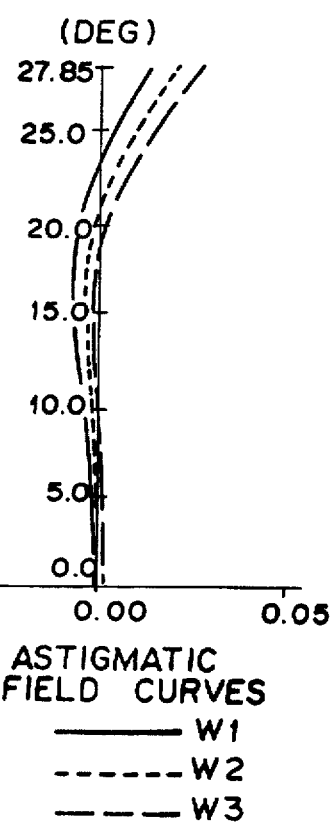
FIG. 17C is a graph showing the astigmatic field curves (curvature of field) of the fθ lens shown in FIG. 17A for the three wavelengths W1, W2 and W3.
Figure 17D:
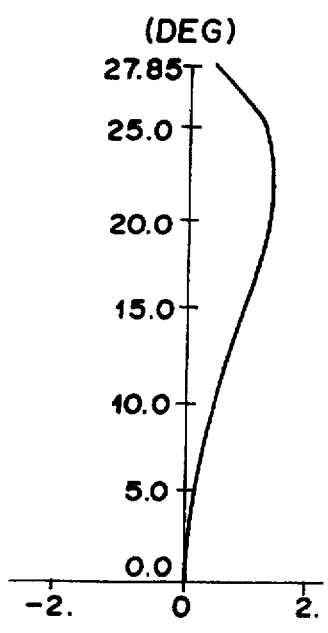
FIG. 17D is a graph showing the linearity (fθ characteristic) of the fθ lens shown in FIG. 17A for the three wavelengths W1, W2 and W3.

FIGS. 17B to 17D respectively show the lateral color aberration, the astigmatic field curves in the scanning direction and the linearity of the fθ lens of the fourth embodiment when laser beams having wavelengths of 680 nm (W1), 532 nm (W2) and 473 nm (W3) enters the fθ lens.

As can be understood from FIGS. 17B to 17D, in the fθ lens of this embodiment, the lateral color aberration is well corrected for the respective wavelengths in spite of a simple structure consisting of only three lens elements in two lens groups.

Figure 18A:
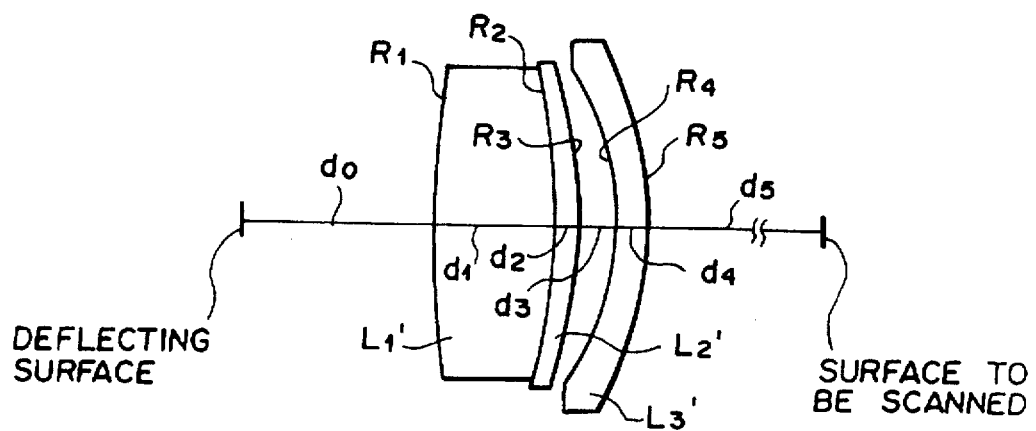
FIG. 18A is a view showing the arrangement of the lens elements in an fθ lens of a fifth embodiment in accordance with the second aspect of the present invention.

In the fifth embodiment shown in FIG. 18A, both the first and second lenses L1' and L2' have positive refracting powers, the difference in the Abbe's number between the first and second lenses is set close to the upper limit of the range which is defined by the formula (5) and determined from the practical viewpoints such as manufacturing cost and the like. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 18.

TABLE 18 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 0.77508 | 0.09480 | $n_{d1}$ 1.45650 | $v_{d1}$ 90.8 |
| 2 | −0.46275 | 0.18960 | $n_{d2}$ 1.80518 | $v_{d2}$ 25.5 |
| 3 | −0.37110 | 0.02889 | | |
| 4 | −0.21405 | 0.02370 | $n_{d3}$ 1.80518 | $v_{d3}$ 25.5 |
| 5 | −0.30344 | 0.92581 | | |

TABLE 18-continued wavelength W1;680 nm, W2;532 nm, W3;473 nm, angle of view 55.7°

| i | Ri | di | $n_d$ | $v_d$ |
|---|---|---|---|---|
| surface scanned | infinity | — | | |

$|v_{d1} - v_{d2}| = 65.3$
$\Sigma(\phi i/v_{di}) = -0.001$
$v_{dL} = 90.8$
$\phi_{12} = 1.97$
$d_{12} = 0.02889$
lateral color aberration 0.066 × 10$^{-3}$
curvature of field 0.026
fθ characteristic 1.44%

Figure 18B:
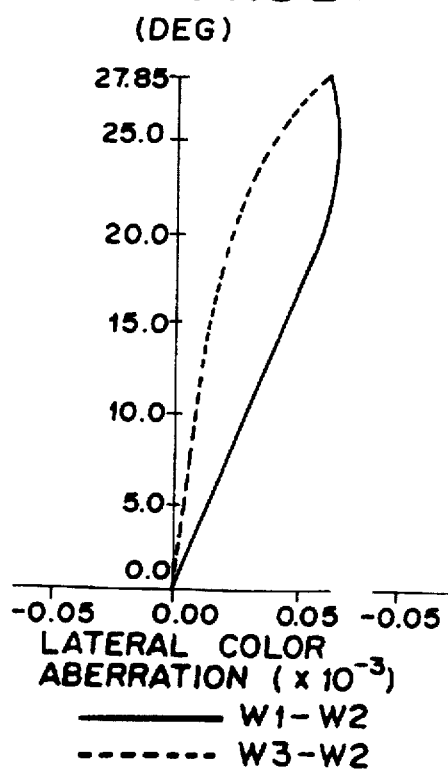
FIG. 18B is a graph showing the lateral color aberration of the fθ lens shown in FIG. 18A for three wavelengths W1, W2 and W3.
Figure 18C:
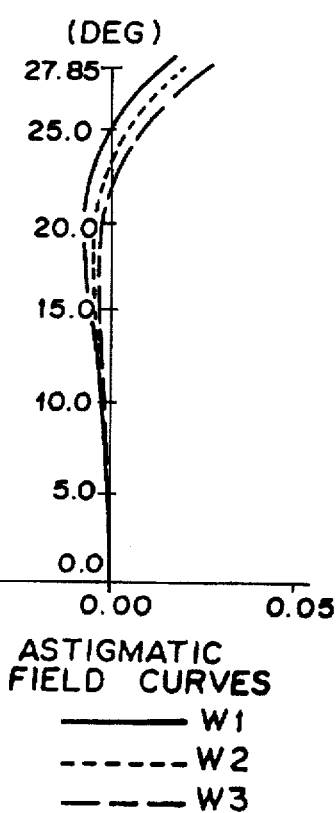
FIG. 18C is a graph showing the astigmatic field curves (curvature of field) of the fθ lens shown in FIG. 18A for the three wavelengths W1, W2 and W3.
Figure 18D:
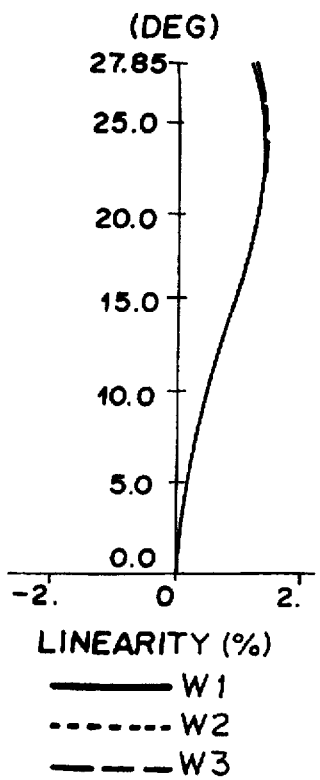
FIG. 18D is a graph showing the linearity (fθ characteristic) of the fθ lens shown in FIG. 18A for the three wavelengths W1, W2 and W3.

FIGS. 18B to 18D respectively show the lateral color aberration, the astigmatic field curves in the scanning direction and the linearity of the fθ lens of the fifth embodiment when laser beams having wavelengths of 680 nm (W1), 532 nm (W2) and 473 nm (W3) enter the fθ lens.

As can be understood from FIGS. 18B to 18D, in the fθ lens of this embodiment, the lateral color aberration is well corrected for the respective wavelengths in spite of a simple structure consisting of only three lens elements in two lens groups.

Figure 19A:
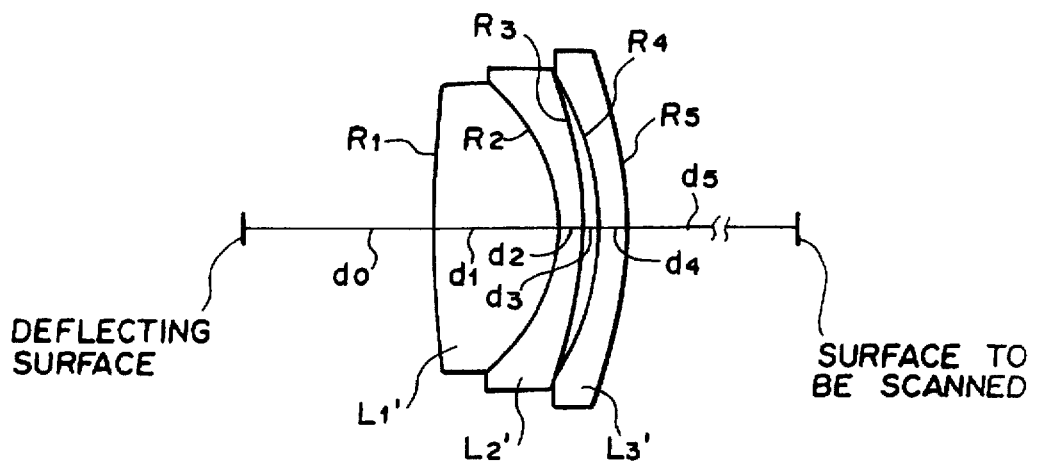
FIG. 19A is a view showing the arrangement of the lens elements in an fθ lens of a sixth embodiment in accordance with the second aspect of the present invention.

In the sixth embodiment shown in FIG. 19A, the first lens L1' has a positive refracting power and the second lens L2' has a negative refracting power. Further the sum of the values obtained by dividing the powers of the respective lenses by the Abbe's numbers of the respective lenses is set close to the upper limit of the range defined by the formula (6). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 19.

TABLE 19 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 0.99859 | 0.09480 | $n_{d1}$ 1.49700 | $v_{d1}$ 81.6 |
| 2 | −0.13870 | 0.01896 | $n_{d2}$ 1.50378 | $v_{d2}$ 66.9 |
| 3 | −0.32198 | 0.01262 | | |
| 4 | −0.21507 | 0.02370 | $n_{d3}$ 1.60729 | $v_{d3}$ 49.3 |
| 5 | −0.34034 | 0.94833 | | |
| surface scanned | infinity | — | | |

$|v_{d1} - v_{d2}| = 14.7$
$\Sigma(\phi i/v_{di}) = -0.001$
$v_{dL} = 81.6$
$\phi_{12} = 1.96$
$d_{12} = 0.01262$
lateral color aberration 0.025 × 10$^{-3}$
curvature of field 0.023
fθ characteristic 2.04%

Figure 19B:
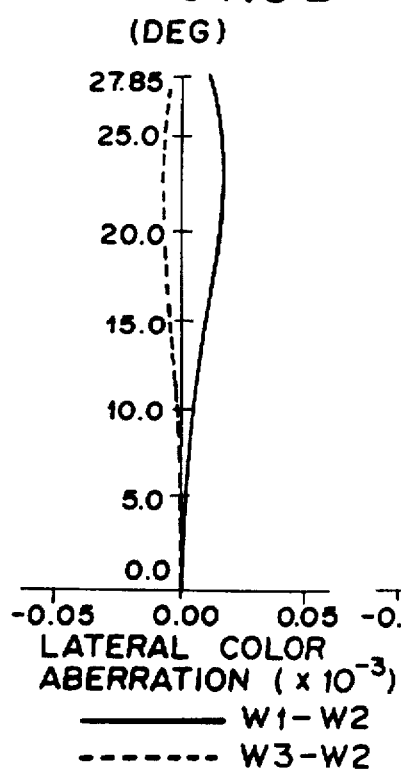
FIG. 19B is a graph showing the lateral color aberration of the fθ lens shown in FIG. 19A for three wavelengths W1, W2 and W3.
Figure 19C:
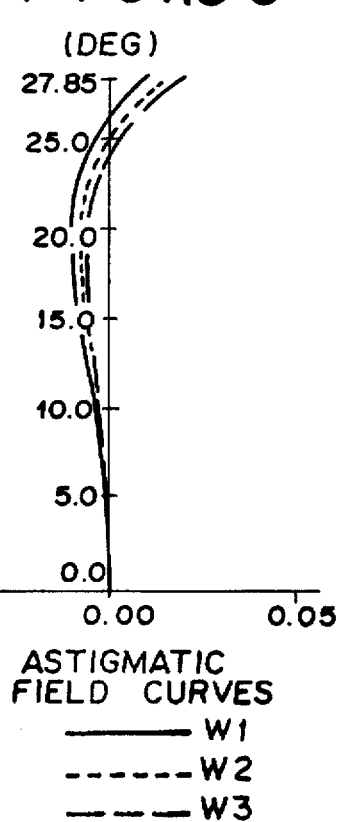
FIG. 19C is a graph showing the astigmatic field curves (curvature of field) of the fθ lens shown in FIG. 19A for the three wavelengths W1, W2 and W3.
Figure 19D:
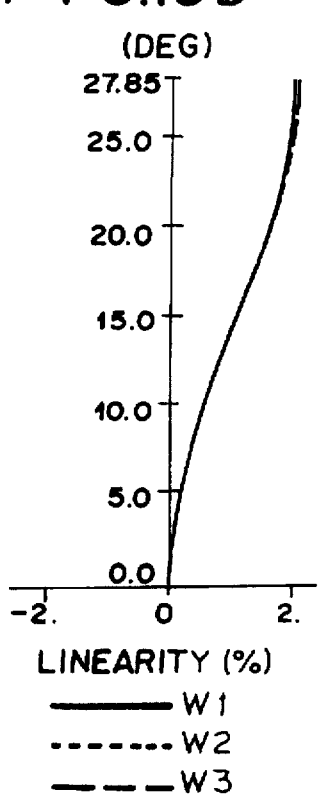
FIG. 19D is a graph showing the linearity (fθ characteristic) of the fθ lens shown in FIG. 19A for the three wavelengths W1, W2 and W3.

FIGS. 19B to 19D respectively show the lateral color aberration, the astigmatic field curves in the scanning direction and the linearity of the fθ lens of the sixth embodiment when laser beams having wavelengths of 680 nm (W1), 532 nm (W2) and 473 nm (W3) enter the fθ lens.

As can be understood from FIGS. 19B to 19D, in the fθ lens of this embodiment, the lateral color aberration is well corrected for the respective wavelengths in spite of a simple structure consisting of only three lens elements in two lens groups.

Figure 20A:
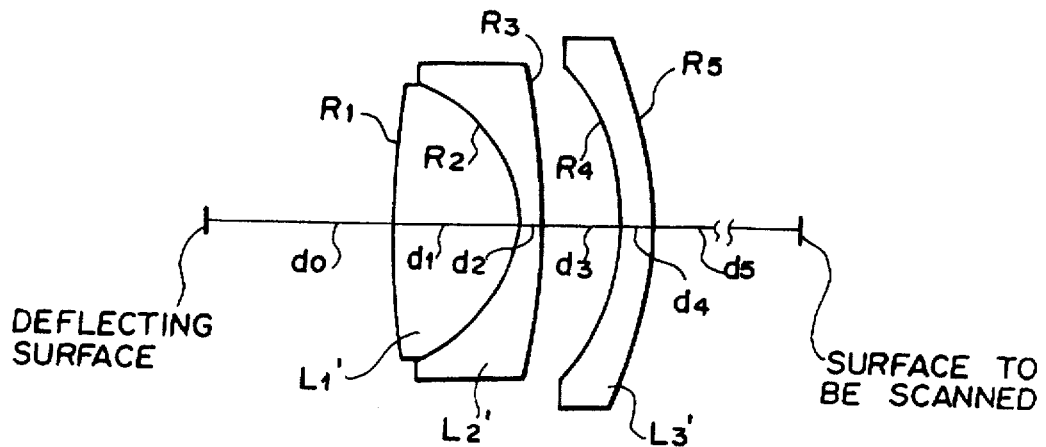
FIG. 20A is a view showing the arrangement of the lens elements in an fθ lens of a seventh embodiment in accordance with the second aspect of the present invention.

In the seventh embodiment shown in FIG. 20A, the first lens L1' has a positive refracting power and the second lens L2' has a negative refracting power. Further the difference in the Abbe's number between the first and second lenses is set close to the lower limit of the range defined by the formula (5) and the Abbe's number $v_{dL}$ for the sodium d-line of one of the first and second lenses having the smaller dispersive power than the other is set close to the lower limit of the range defined by the formula (7). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 20.

TABLE 20 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14220 | | |
| 1 | 0.63606 | 0.09480 | $n_{d1}$ 1.66446 | $v_{d1}$ 35.9 |
| 2 | −0.11059 | 0.01896 | $n_{d2}$ 1.64769 | $v_{d2}$ 33.8 |
| 3 | −0.52266 | 0.05358 | | |
| 4 | −0.18894 | 0.02370 | $n_{d3}$ 1.78470 | $v_{d3}$ 26.1 |
| 5 | −0.32143 | 0.81368 | | |
| surface scanned | infinity | — | | |

$|v_{d1} - v_{d2}| = 2.1$
$\Sigma(\phi i/v_{di}) = -0.008$
$v_{dL} = 35.9$
$\phi_{12} = 2.35$
$d_{12} = 0.05358$
lateral color aberration $0.091 \times 10^{-3}$
curvature of field 0.023
fθ characteristic 1.47%

Figure 20B:
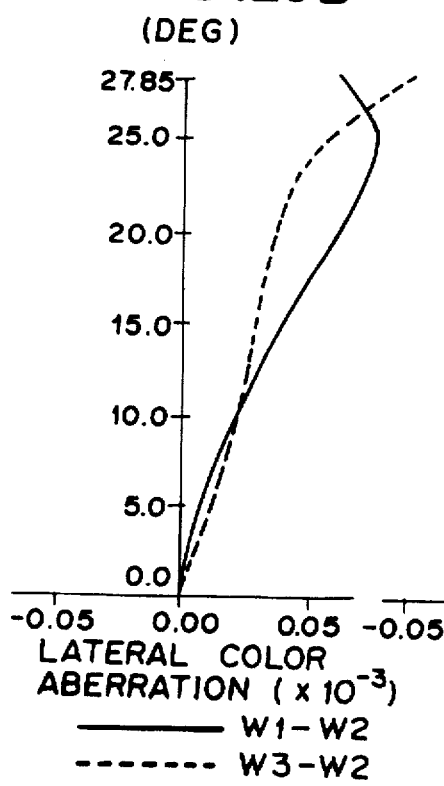
FIG. 20B is a graph showing the lateral color aberration of the fθ lens shown in FIG. 20A for three wavelengths W1, W2 and W3.
Figure 20C:
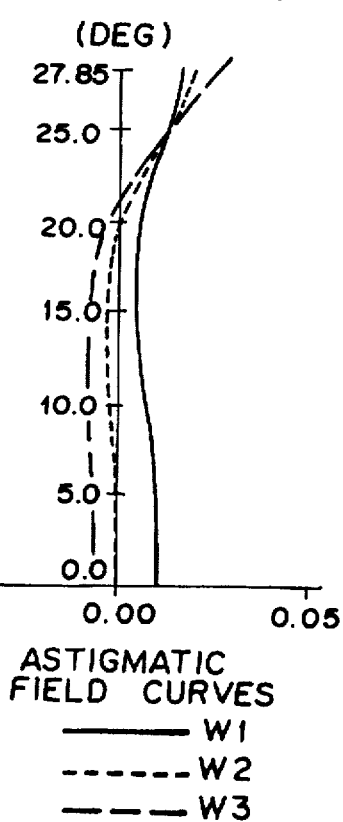
FIG. 20C is a graph showing the astigmatic field curves (curvature of field) of the fθ lens shown in FIG. 20A for the three wavelengths W1, W2 and W3.
Figure 20D:
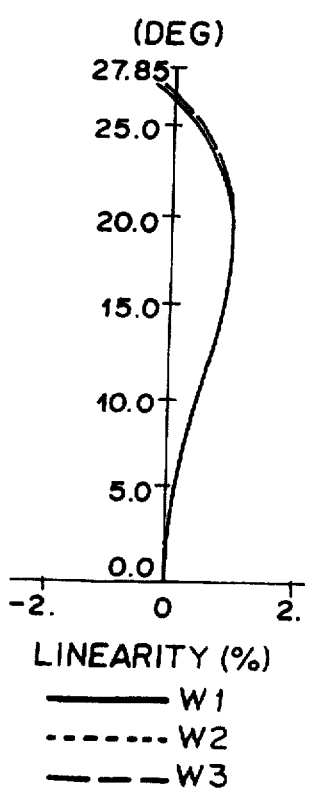
FIG. 20D is a graph showing the linearity (fθ characteristic) of the fθ lens shown in FIG. 20A for the three wavelengths W1, W2 and W3.

FIGS. 20B to 20D respectively show the lateral color aberration, the astigmatic field curves in the scanning direction and the linearity of the fθ lens of the seventh embodiment when laser beams having wavelengths of 680 nm (W1), 532 nm (W2) and 473 nm (W3) enter the fθ lens.

As can be understood from FIGS. 20B to 20D, in the fθ lens of this embodiment, the lateral color aberration is well corrected for the respective wavelengths in spite of a simple structure consisting of only three lens elements in two lens groups.

As can be understood from the description above, in the fθ lens in accordance with the second aspect of the present invention, the color aberration can be corrected with a high accuracy over a wide wavelength range, and accordingly, the error in superimposing the beam spots can be reduced in the scanning optical system or the like using a plurality of laser beams having different wavelengths. Further since the structure, is simple in design the fθ lens in accordance with the second aspect of the present invention can be manufactured at low cost.

The fθ lens in accordance with the second aspect of the present invention need not be limited to those described above but may be variously modified so long as the formulae (5) to (9) are satisfied.

The fθ lenses of eighth to eleventh embodiments shown in FIGS. 21A to 24A comprise an aspheric lens represented by the formula (13).

Figure 21A:
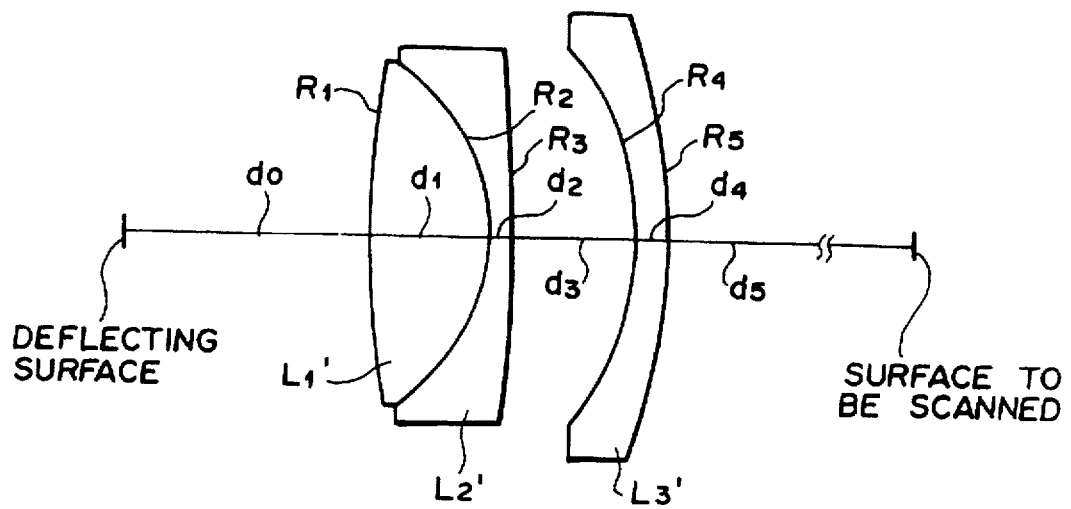
FIG. 21A is a view showing the arrangement of the lens elements in an fθ lens of an eighth embodiment in accordance with the second aspect of the present invention.

In the eighth embodiment shown in FIG. 21A, the first surface of the first lens L1' (the entrance surface) is an aspheric surface as shown in table 21 and the first lens has a positive refracting power. The second lens L2' has a negative refracting power. Further the power of the first lens group is set close to the upper limit of the range defined by the formula (8) and the surface separation $d_{12}$ between the first and second lens groups is set substantially at the middle of the range defined by the formula (9). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 21.

TABLE 21 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.19093 | | |
| 1 | 0.60502★ | 0.09489 | $n_{d1}$ 1.62280 | $v_{d1}$ 56.9 |
| 2 | −0.15804 | 0.01898 | $n_{d2}$ 1.54041 | $v_{d2}$ 51.0 |
| 3 | −1.04490 | 0.09063 | | |
| 4 | −0.24204 | 0.02372 | $n_{d3}$ 1.57845 | $v_{d3}$ 41.7 |
| 5 | −0.55340 | 0.73573 | | |
| surface scanned | infinity | — | | |

$|v_{d1} - v_{d2}| = 5.9$
$\Sigma(\phi i/v_{di}) = -0.005$
$v_{dL} = 56.9$
$\phi_{12} = 2.01$
$d_{12} = 0.09063$
$k = -1.9206$
$a_1 = -3.3812$
$a_2 = 1.6691$
$a_3 = 0$
$a_4 = 0$
lateral color aberration $0.067 \times 10^{-3}$
curvature of field 0.011
fθ characteristic 1.01%

Figure 21B:
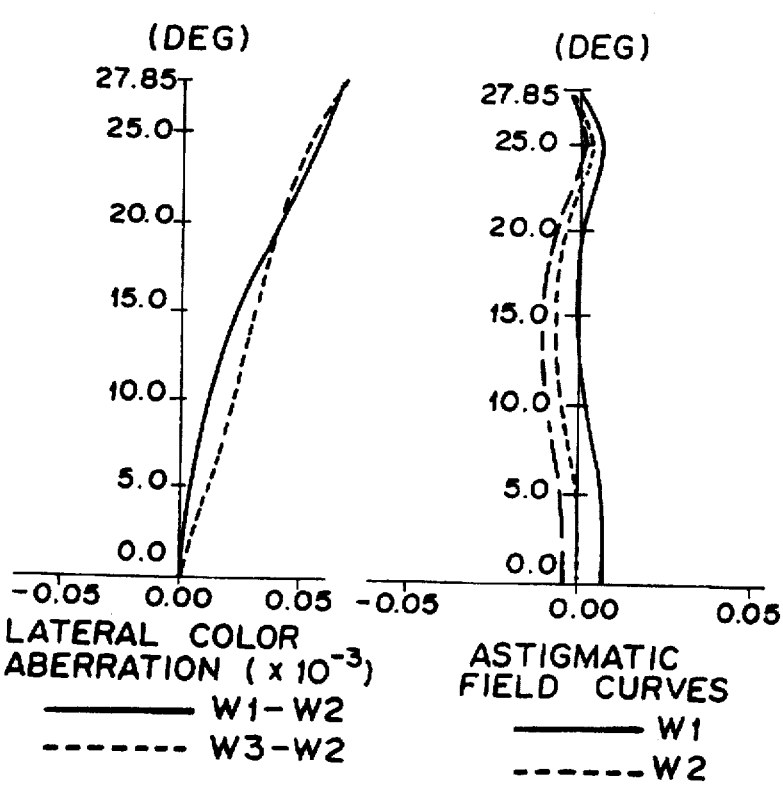
FIG. 21B is a graph showing the lateral color aberration of the fθ lens shown in FIG. 21A for three wavelengths W1, W2 and W3.
Figure 21C:
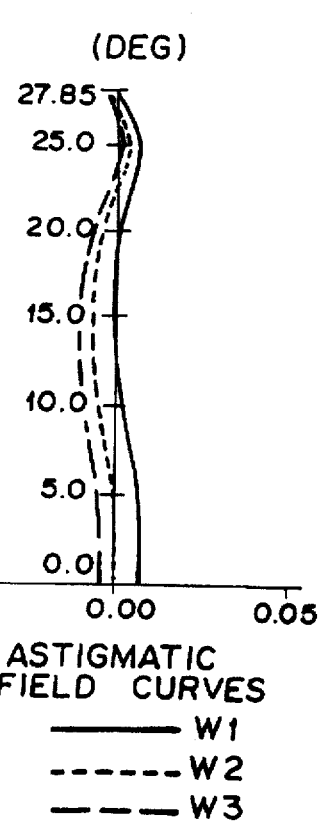
FIG. 21C is a graph showing the astigmatic field curves (curvature of field) of the fθ lens shown in FIG. 21A for the three wavelengths W1, W2 and W3.
Figure 21D:
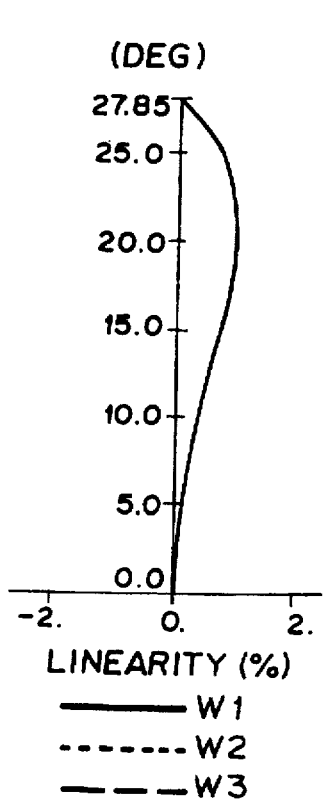
FIG. 21D is a graph showing the linearity (fθ characteristic) of the fθ lens shown in FIG. 21A for the three wavelengths W1, W2 and W3.

FIGS. 21B to 21D respectively show the lateral color aberration, the astigmatic field curves in the scanning direction and the linearity of the fθ lens of the eighth embodiment when laser beams having wavelengths of 680 nm (W1), 532 nm (W2) and 473 nm (W3) enter the fθ lens.

As can be understood from FIGS. 21B to 21D, in the fθ lens of this embodiment, the lateral color aberration is well corrected for the respective wavelengths in spite of a simple structure consisting of only three lens elements in two lens groups.

Figure 22A:
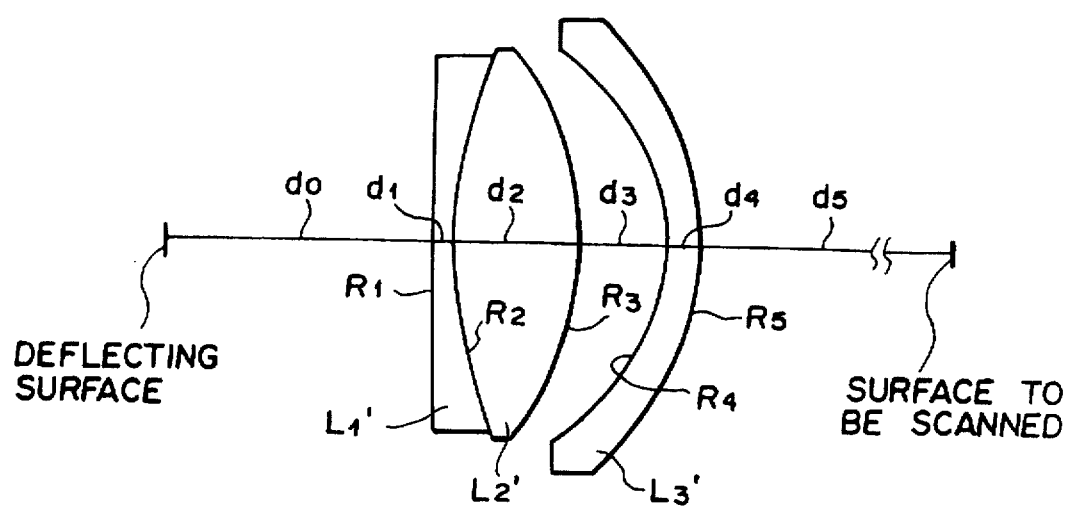
FIG. 22A is a view showing the arrangement of the lens elements in an fθ lens of a ninth embodiment in accordance with the second aspect of the present invention.

In the ninth embodiment shown in FIG. 22A, the second surface of the second lens L2' (the exit surface) is an aspheric surface as shown in table 22 and the second lens L2' has a positive refracting power. The first lens L1' has a negative refracting power. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 22.

TABLE 22 wavelength W1;680 nm, W2;532 nm, W3;473 nm, angle of view 55.7°

| i | Ri | di | $n_d$ | vd |
|---|---|---|---|---|
| OBJ | — | infinity | | |
| 0 | infinity | 0.20745 | | |
| 1 | 9.65432 | 0.01905 | $n_{d1}$ 1.48749 | $v_{d1}$ 70.4 |
| 2 | 0.38653 | 0.09525 | $n_{d2}$ 1.49700 | $v_{d2}$ 81.6 |
| 3 | −0.26969★ | 0.06585 | | |
| 4 | −0.17725 | 0.02381 | $n_{d3}$ 1.80450 | $v_{d3}$ 39.6 |
| 5 | −0.23743 | 0.89559 | | |
| surface scanned | infinity | — | | |

$|v_{d1}-v_{d2}| = 11.2$       lateral color aberration  $0.048 \times 10^{-3}$
$\Sigma(\phi i/v_{di}) = -0.005$   curvature of field        0.001
$v_{dL} = 81.6$                  fθ characteristic         0.85%

TABLE 22-continued wavelength W1;680 nm, W2;532 nm, W3;473 nm, angle of view 55.7°

| i | Ri | di | $n_d$ | vd |
|---|---|---|---|---|

Figure 22B:
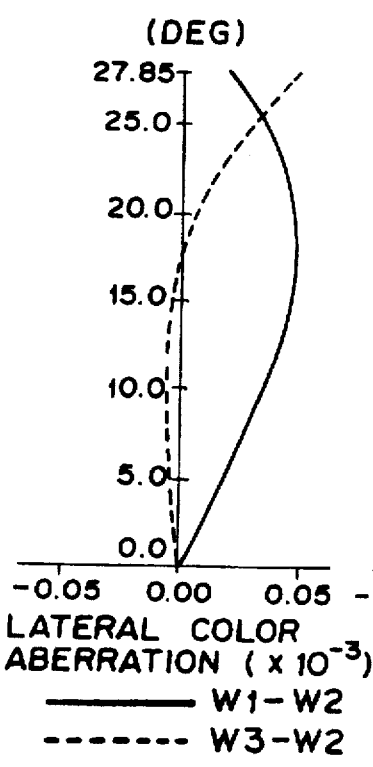
FIG. 22B is a graph showing the lateral color aberration of the fθ lens shown in FIG. 22A for three wavelengths W1, W2 and W3.
Figure 22C:
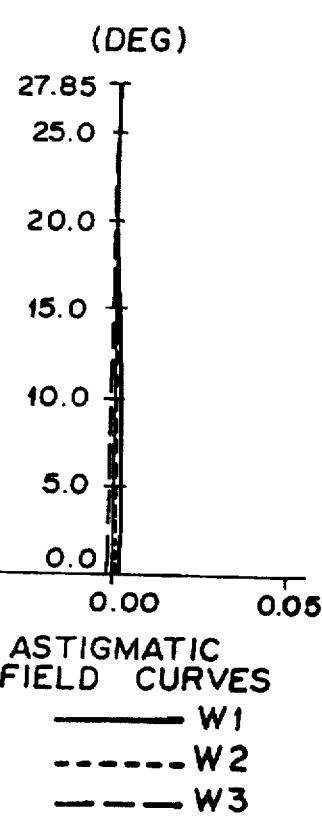
FIG. 22C is a graph showing the astigmatic field curves (curvature of field) of the fθ lens shown in FIG. 22A for the three wavelengths W1, W2 and W3.
Figure 22D:
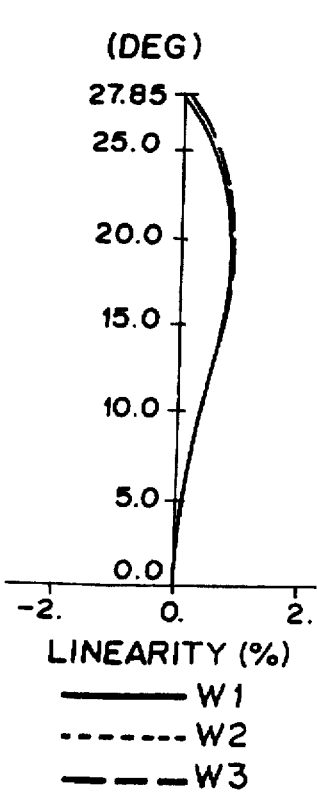
FIG. 22D is a graph showing the linearity (fθ characteristic) of the fθ lens shown in FIG. 22A for the three wavelengths W1, W2 and W3.

$\phi_{12} = 1.92$
$d_{12} = 0.06585$
$k = 1.1996$    $a_1 = 0.7967$    $a_2 = 3.8706$    $a_3 = 0$    $a_4 = 0$ FIGS. 22B to 22D respectively show the lateral color aberration, the astigmatic field curves in the scanning direction and the linearity of the fθ lens of the ninth embodiment when laser beams having wavelengths of 680 nm (W1), 532 nm (W2) and 473 nm (W3) enter the fθ lens.

As can be understood from FIGS. 22B to 22D, in the fθ lens of this embodiment, the lateral color aberration is well corrected for the respective wavelengths in spite of a simple structure consisting of only three lens elements in two lens groups.

Figure 23A:
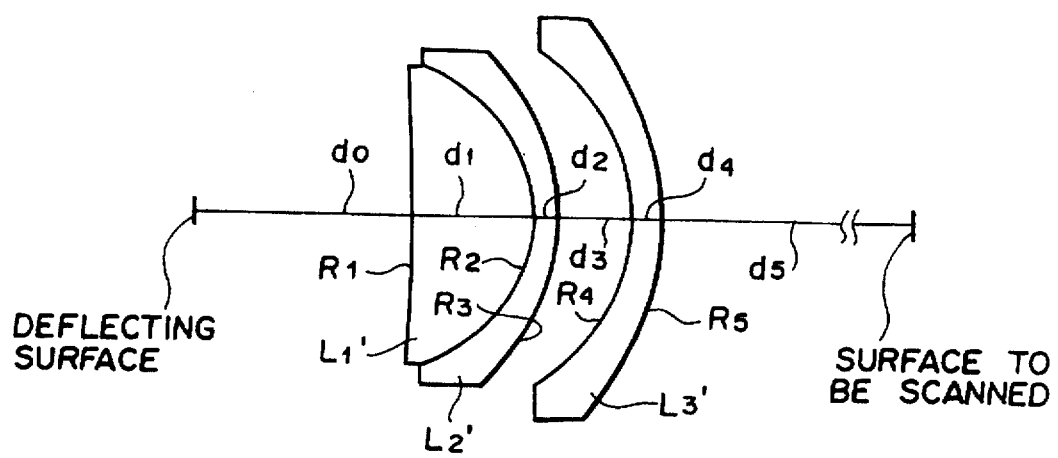
FIG. 23A is a view showing the arrangement of the lens elements in an fθ lens of a tenth embodiment in accordance with the second aspect of the present invention.

In the tenth embodiment shown in FIG. 23A, the first surface of the third lens L3' (the entrance surface) is an aspheric surface as shown in table 23. The power of the first lens group is set to the upper limit of the range defined by the formula (8). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 23.

TABLE 23 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.16651 | | |
| 1 | −1.43764 | 0.09515 | $n_{d1}$ 1.49700 | $v_{d1}$ 81.6 |
| 2 | −0.12062 | 0.01903 | $n_{d2}$ 1.50378 | $v_{d2}$ 66.9 |
| 3 | −0.17870 | 0.05837 | | |
| 4 | −0.13985★ | 0.02368 | $n_{d3}$ 1.60729 | $v_{d3}$ 49.3 |
| 5 | −0.23434 | 0.90103 | | |
| surface scanned | infinity | | | |

| | | |
|---|---|---|
| $|v_{d1}-v_{d2}| = 14.7$ | lateral color aberration | $0.048 \times 10^{-3}$ |
| $\Sigma(\phi_i/v_{di}) = -0.003$ | curvature of field | 0.002 |
| $v_{dL} = 81.6$ | fθ characteristic | 0.72% |
| $\phi_{12} = 2.50$ | | |
| $d_{12} = 0.05837$ | | |
| $k = -0.2987$    $a_1 = -1.1856$    $a_2 = -61.0250$    $a_3 = 0$    $a_4 = 0$ | | |

Figure 23B:
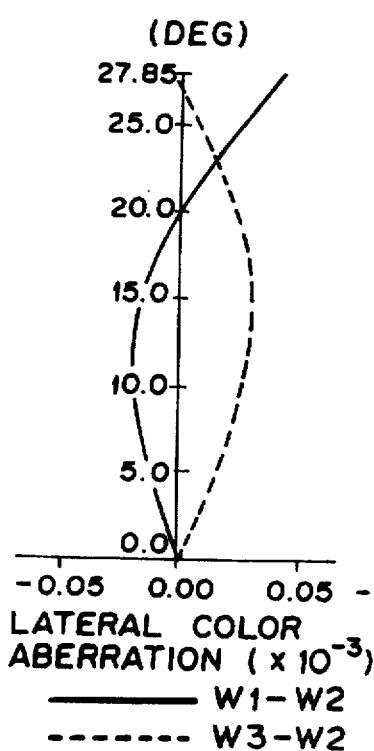
FIG. 23B is a graph showing the lateral color aberration of the fθ lens shown in FIG. 23A for three wavelengths W1, W2 and W3.
Figure 23C:
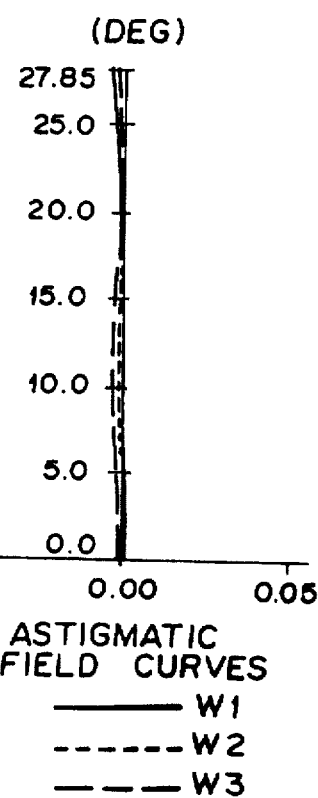
FIG. 23C is a graph showing the astigmatic field curves (curvature of field) of the fθ lens shown in FIG. 23A for the three wavelengths W1, W2 and W3.
Figure 23D:
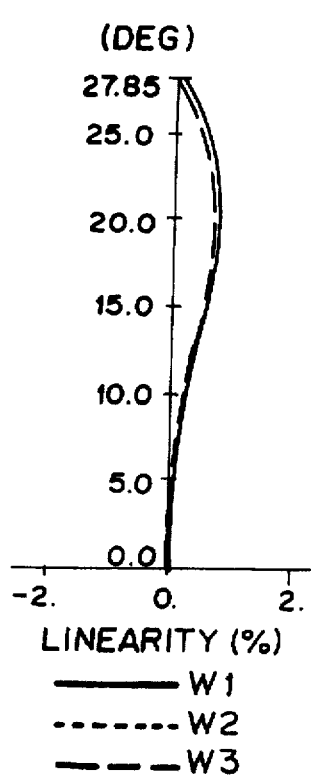
FIG. 23D is a graph showing the linearity (fθ characteristic) of the fθ lens shown in FIG. 23A for the three wavelengths W1, W2 and W3.

FIGS. 23B to 23D respectively show the lateral color aberration, the astigmatic field curves in the scanning direction and the linearity of the fθ lens of the tenth embodiment when laser beams having wavelengths of 680 nm (W1), 532 nm (W2) and 473 nm (W3) enter the fθ lens.

As can be understood from FIGS. 23B to 23D, in the fθ lens of this embodiment, the lateral color aberration is well corrected for the respective wavelengths in spite of a simple structure consisting of only three lens elements in two lens groups.

Figure 24A:
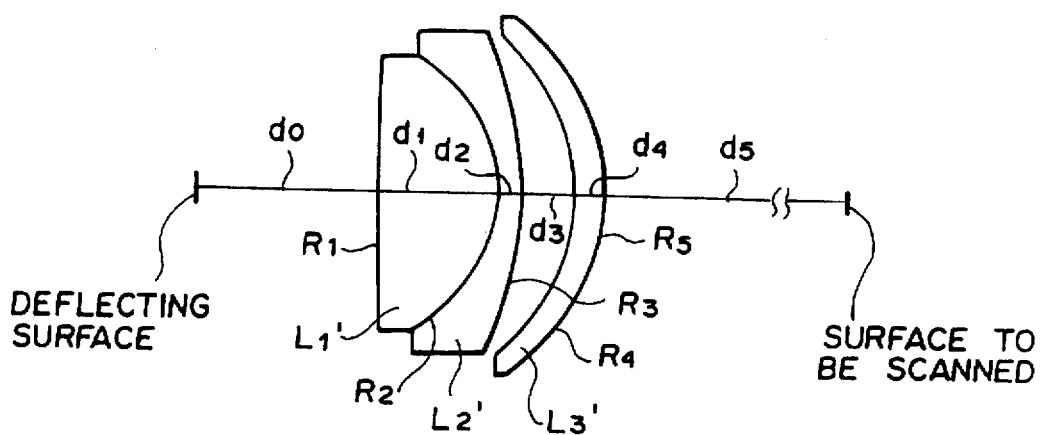
FIG. 24A is a view showing the arrangement of the lens elements in an fθ lens of an eleventh embodiment in accordance with the second aspect of the present invention.

In the eleventh embodiment shown in FIG. 24A, the second surface (the exit surface) of the third lens L3' is an aspheric surface as shown in table 24. Further the sum of the values obtained by dividing the powers of the respective lenses by the Abbe's numbers of the respective lenses is set substantially at the middle of the range defined by the formula (6) and the power of the first lens group is set close to the lower limit of the range defined by the formula (8).

The radii of curvature R of the refracting surfaces, the axial surface separations d, and the refractive indexes $n_d$ and the Abbe's numbers $v_d$ of the lenses for the sodium d-line in the fθ lens of this embodiment are shown in table 24.

TABLE 24 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14195 | | |
| 1 | −42.5251 | 0.09463 | $n_{d1}$ 1.49700 | $v_{d1}$ 81.6 |
| 2 | −0.12060 | 0.01893 | $n_{d2}$ 1.62012 | $v_{d2}$ 49.8 |
| 3 | −0.28146 | 0.04029 | | |
| 4 | −0.16066 | 0.02366 | $n_{d3}$ 1.80610 | $v_{d3}$ 33.3 |
| 5 | −0.17571★ | 1.01298 | | |
| surface scanned | infinity | — | | |

| | | |
|---|---|---|
| $|v_{d1}-v_{d2}| = 31.8$ | lateral color aberration | $0.048 \times 10^{-3}$ |
| $\Sigma(\phi_i/v_{di}) = -0.010$ | curvature of field | 0.008 |
| $v_{dL} = 81.6$ | fθ characteristic | 0.55% |
| $\phi_{12} = 1.20$ | | |
| $d_{12} = 0.04029$ | | |
| $k = 0.0608$    $a_1 = 0.1573$    $a_2 = 9.2171$    $a_3 = 0$    $a_4 = 0$ | | |

Figure 24B:
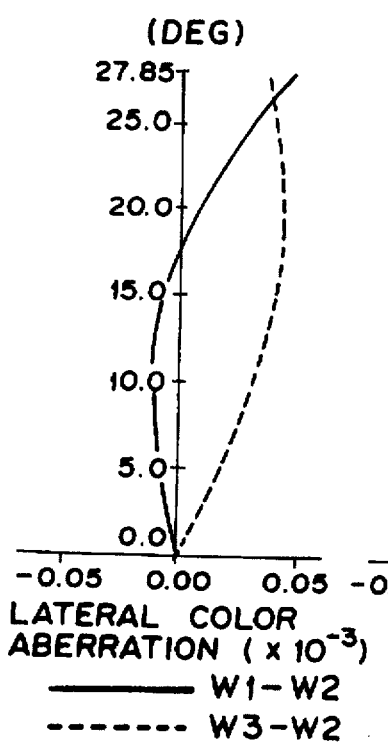
FIG. 24B is a graph showing the lateral color aberration of the fθ lens shown in FIG. 24A for three wavelengths W1, W2 and W3.
Figure 24C:
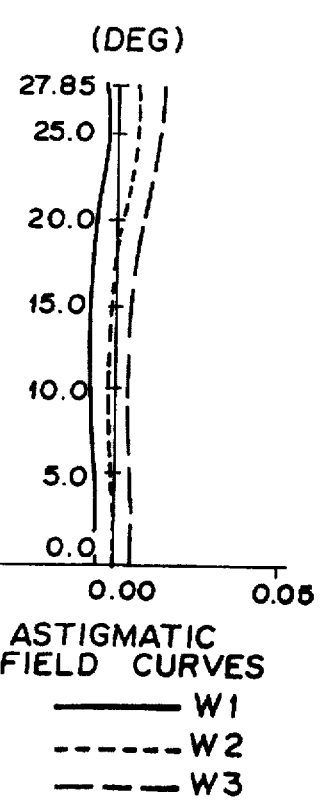
FIG. 24C is a graph showing the astigmatic field curves (curvature of field) of the fθ lens shown in FIG. 24A for the three wavelengths W1, W2 and W3.
Figure 24D:
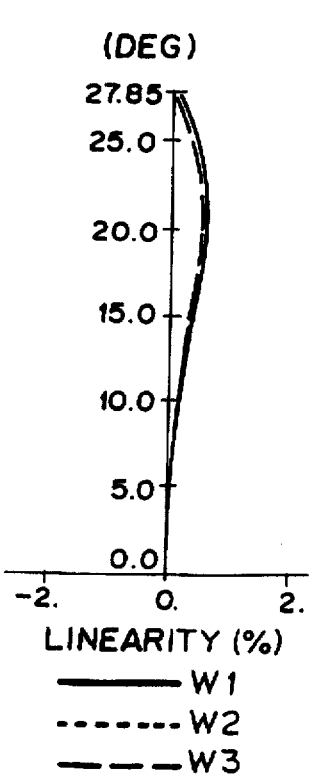
FIG. 24D is a graph showing the linearity (fθ characteristic) of the fθ lens shown in FIG. 24A for the three wavelengths W1, W2 and W3.

FIGS. 24B to 24D respectively show the lateral color aberration, the astigmatic field curves in the scanning direction and the linearity of the fθ lens of the eleventh embodiment when laser beams having wavelengths of 680 nm (W1), 532 nm (W2) and 473 nm (W3) enter the fθ lens.

As can be understood from FIGS. 24B to 24D, in the fθ lens of this embodiment, the lateral color aberration is well corrected for the respective wavelengths in spite of a simple structure consisting of only three lens elements in two lens groups.

fθ lenses of eleven embodiments in accordance with the third aspect of the present invention will be described with reference to FIGS. 25 (25A to 25D) to 35 (35A to 35D) and tables 25 to 35, hereinbelow. FIGS. 25A to 35A respectively show the arrangements of the lens elements of the fθ lenses of first to eleventh embodiments, and FIGS. 25B, 25C and 25D to 35B, 35C and 35D respectively show the lateral color aberration, the astigmatic field curves (curvature of field) and the linearity (fθ characteristic) of the fθ lenses of the first to eleventh embodiments when three laser beams having different wavelengths W1, W2 and W3 used in a scanning optical system enter the respective fθ lenses. The values of the wavelengths W1, W2 and W3 are shown on the top of the tables corresponding to the fθ lenses.

Each of the fθ lenses in accordance with the third aspect of the present invention is for scanning light emanating from a deflecting point and comprises a first lens L1" having a positive refracting power and second lens L2" having a negative refracting power, the first and second lenses L1" and L2" being cemented together with the first lens L1" positioned on the entrance pupil side (deflecting point side). The fθ lens satisfies the following formulae (10) to (12), $$n_{d1} < n_{d2} \tag{10}$$

$$0.4 \leq v_{d2}/v_{d1} \leq 0.8 \tag{11}$$

$$1.5 \leq \phi_1 \leq 4.7 \tag{12}$$

wherein $n_{d1}$ and $n_{d2}$ respectively represent the refractive indexes for the sodium d-line of the first and second lenses L1" and L2", $v_{d1}$ and $v_{d2}$ respectively represent the Abbe's numbers for the sodium d-line of the first and second lenses L1" and L2", and $\phi_1$ represents the power of the first lens L1" standardized on the basis of the power of the whole system. The fθ lens is used in a position where the distance $d_0$ between the deflecting point and the entrance pupil side surface of the first lens L1" standardized on the basis of the focal length of the whole system is in the range of 0.1 to 0.4 inclusive ($0.1 \leq d_0 \leq 0.4$; either of these values being standardized on the basis of the focal length of the whole system).

Figure 25A:
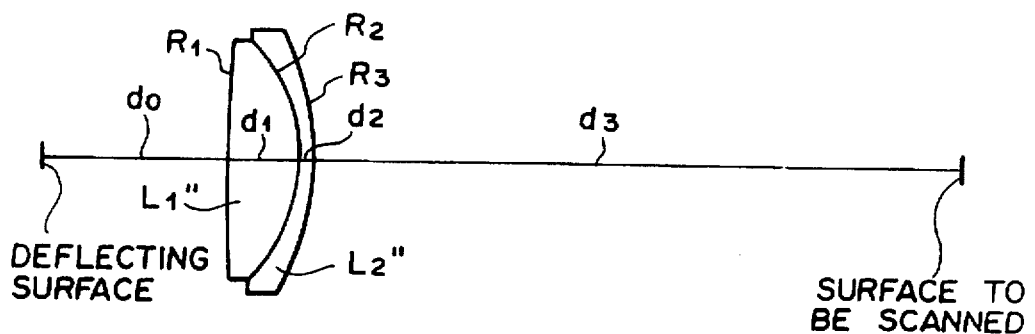
FIG. 25A is a view showing the arrangement of the lens elements in an fθ lens of a first embodiment in accordance with the third aspect of the present invention.

In the first embodiment shown in FIG. 25A, the factors respectively limited by the formulae (11) and (12) are set close to the lower limits of the ranges respectively defined by the formulae (11) and (12) and the distance $d_0$ is set close to the upper limit. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 25.

TABLE 25 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.30415 | | |
| 1 | 3.22923 | 0.10930 | $n_{d1}$ 1.49700 | $v_{d1}$ 81.6 |
| 2 | −0.27449 | 0.02376 | $n_{d2}$ 1.72342 | $v_{d2}$ 38.0 |
| 3 | −0.43441 | 0.99803 | | |
| surface scanned | infinity | — | | |

| | | | |
|---|---|---|---|
| $n_{d1}$ = 1.497, $n_{d2}$ = 1.723 | | lateral color aberration | $0.138 \times 10^{-3}$ |
| $v_{d1}/v_{d2}$ = 0.47 | | curvature of field | 0.011 |
| $\phi_1$ = 1.95 | | fθ characteristic | 0.43% |
| $d_0$ = 0.30415 | | | |

Figure 25B:
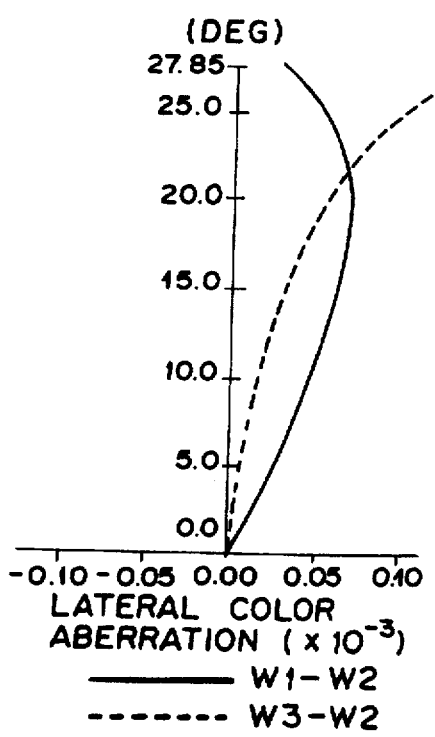
FIG. 25B is a graph showing the lateral color aberration of the fθ lens shown in FIG. 25A for three wavelengths W1, W2 and W3.
Figure 25C:
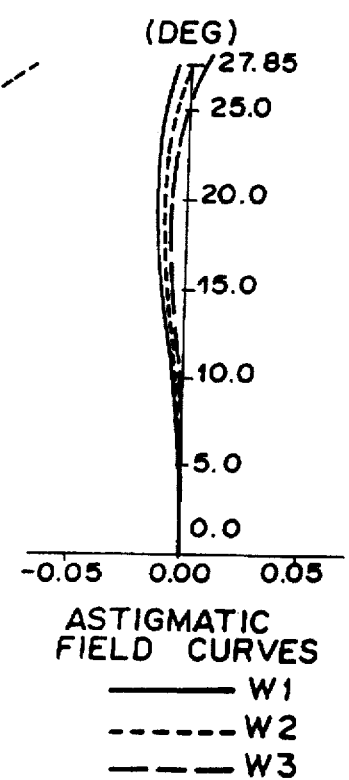
FIG. 25C is a graph showing the astigmatic field curves (curvature of field) of the fθ lens shown in FIG. 25A for the three wavelengths W1, W2 and W3.
Figure 25D:
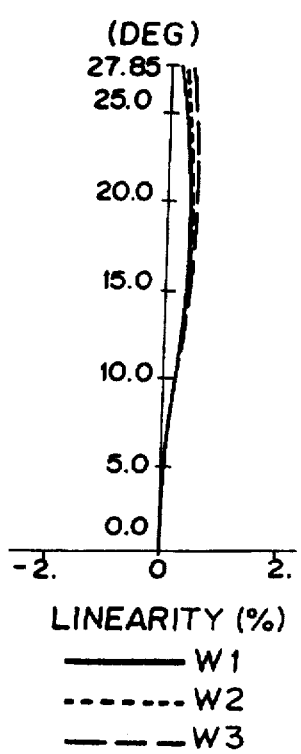
FIG. 25D is a graph showing the linearity (fθ characteristic) of the fθ lens shown in FIG. 25A for the three wavelengths W1, W2 and W3.

FIGS. 25B to 25D respectively show the lateral color aberration, the astigmatic field curves in the scanning direction and the linearity of the fθ lens of the first embodiments when laser beams having wavelengths of 680 nm (W1), 532 nm (W2) and 473 nm (W3) enter the fθ lens.

As can be understood from FIGS. 25B to 25D, in the fθ lens of this embodiment, the lateral color aberration is well corrected for the respective wavelengths in spite of a very simple structure consisting of only two lens elements in one lens group.

Figure 26A:
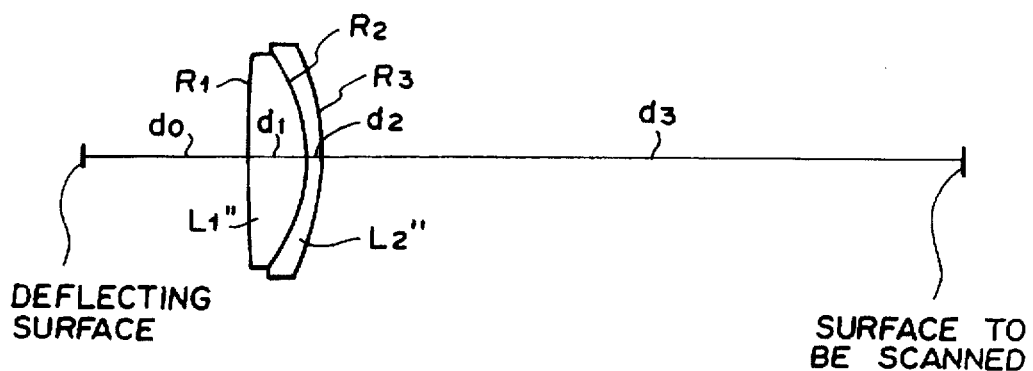
FIG. 26A is a view showing the arrangement of the lens elements in an fθ lens of a second embodiment in accordance with the third aspect of the present invention.

In the second embodiment shown in FIG. 26A, the ratio of the Abbe's number of the first lens to that of the second lend is set close to the lower limit of the range defined by the formula (11). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 26.

TABLE 26 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.26657 | | |
| 1 | 2.79072 | 0.09520 | $n_{d1}$ 1.48749 | $v_{d1}$ 70.4 |
| 2 | −0.26207 | 0.02380 | $n_{d2}$ 1.80610 | $v_{d2}$ 33.3 |
| 3 | −0.39849 | 1.00254 | | |
| surface scanned | infinity | | | |

TABLE 26-continued wavelength W1;680 nm, W2;532 nm, W3;473 nm, angle of view 55.7°

| i | Ri | di | $n_d$ | $v_d$ |
|---|---|---|---|---|
| $n_{d1}$ = 1.487, $n_{d2}$ = 1.806 | | lateral color aberration | | $0.143 \times 10^{-3}$ |
| $v_{d1}/v_{d2}$ = 0.47 | | curvature of field | | 0.011 |
| $\phi_1$ = 2.02 | | fθ characteristic | | 0.77% |
| $d_0$ = 0.26657 | | | | |

Figure 26B:
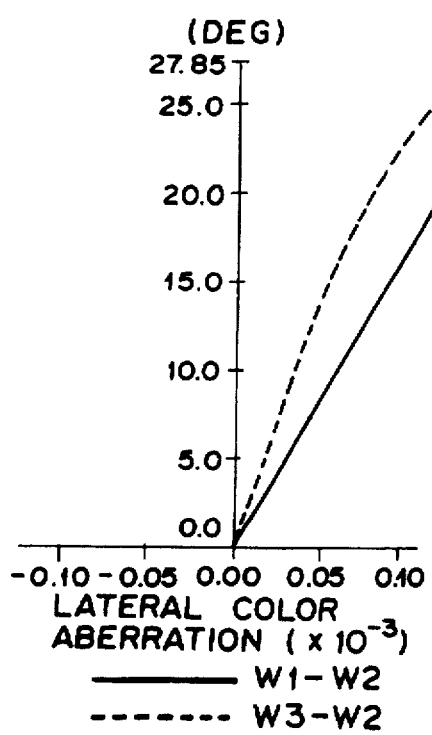
FIG. 26B is a graph showing the lateral color aberration of the fθ lens shown in FIG. 26A for three wavelengths W1, W2 and W3.
Figure 26C:
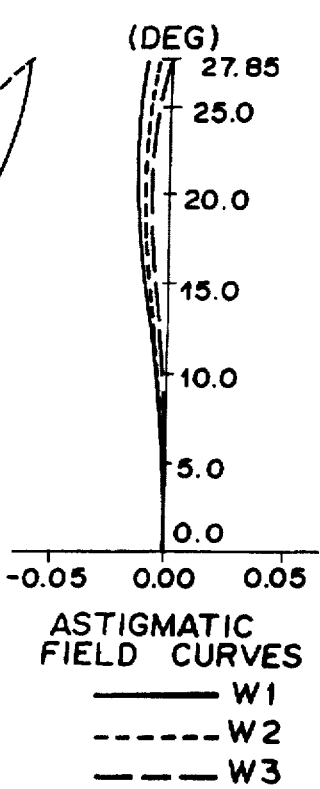
FIG. 26C is a graph showing the astigmatic field curves (curvature of field) of the fθ lens shown in FIG. 26A for the three wavelengths W1, W2 and W3.
Figure 26D:
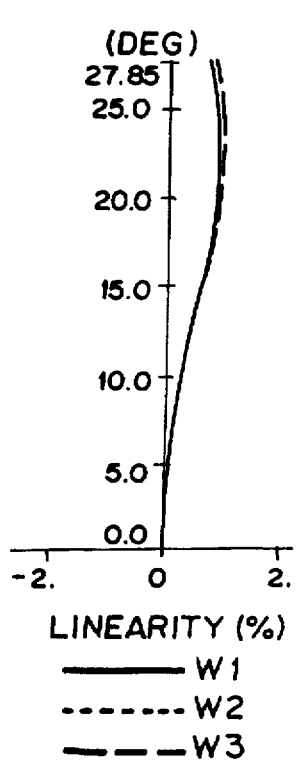
FIG. 26D is a graph showing the linearity (fθ characteristic) of the fθ lens shown in FIG. 26A for the three wavelengths W1, W2 and W3.

FIGS. 26B to 26D respectively show the lateral color aberration, the astigmatic field curves in the scanning direction and the linearity of the fθ lens of the second embodiment when laser beams having wavelengths of 680 nm (W1), 532 nm (W2) and 473 nm (W3) enter the fθ lens.

As can be understood from FIGS. 25B to 25D, in the fθ lens of this embodiment, the lateral color aberration is well corrected for the respective wavelengths in spite of a very simple structure consisting of only two lens elements in one lens group.

Figure 27A:
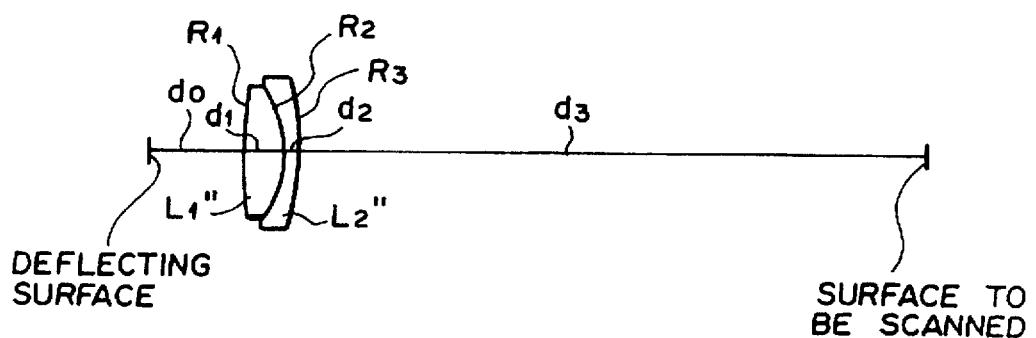
FIG. 27A is a view showing the arrangement of the lens elements in an fθ lens of a third embodiment in accordance with the third aspect of the present invention.

In the third embodiment shown in FIG. 27A, the distance $d_0$ is set close to the lower limit. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 27.

TABLE 27 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.14865 | | |
| 1 | 1.09840 | 0.06713 | $n_{d1}$ 1.51680 | $v_{d1}$ 64.2 |
| 2 | −0.14539 | 0.01918 | $n_{d2}$ 1.67003 | $v_{d2}$ 47.2 |
| 3 | −0.42289 | 0.98566 | | |
| surface scanned | infinity | — | | |

| | | | |
|---|---|---|---|
| $n_{d1}$ = 1.517, $n_{d2}$ = 1.670 | | lateral color aberration | $0.115 \times 10^{-3}$ |
| $v_{d1}/v_{d2}$ = 0.74 | | curvature of field | 0.027 |
| $\phi_1$ = 3.97 | | fθ characteristic | 2.90% |
| $d_0$ = 0.14865 | | | |

Figure 27B:
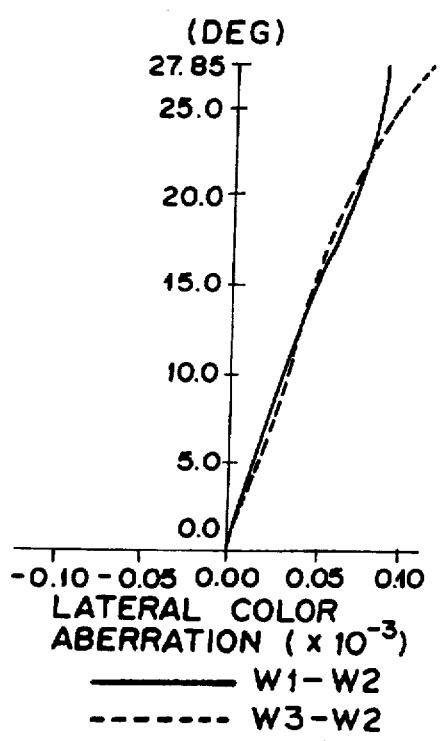
FIG. 27B is a graph showing the lateral color aberration of the fθ lens shown in FIG. 27A for three wavelengths W1, W2 and W3.
Figure 27C:
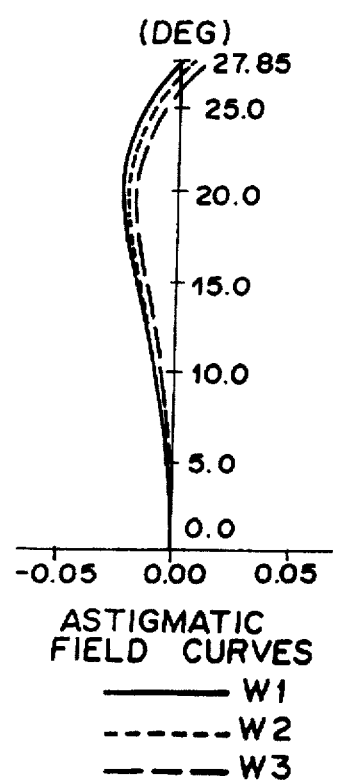
FIG. 27C is a graph showing the astigmatic field curves (curvature of field) of the fθ lens shown in FIG. 27A for the three wavelengths W1, W2 and W3.
Figure 27D:
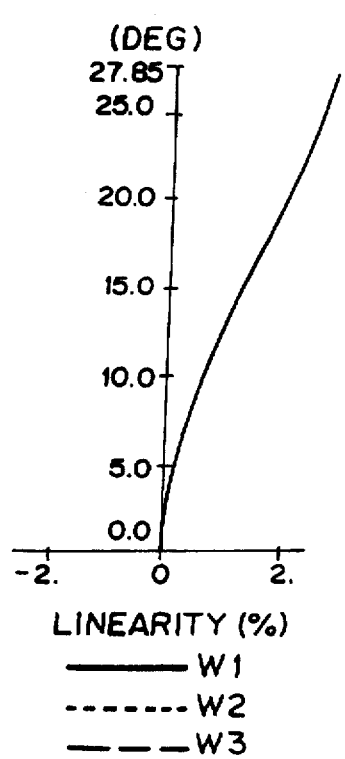
FIG. 27D is a graph showing the linearity (fθ characteristic) of the fθ lens shown in FIG. 27A for the three wavelengths W1, W2 and W3.

FIGS. 27B to 27D respectively show the lateral color aberration, the astigmatic field curves in the scanning direction and the linearity of the fθ lens of the third embodiment when laser beams having wavelengths of 680 nm (W1), 532 nm (W2) and 473 nm (W3) enter the fθ lens.

As can be understood from FIGS. 27B to 27D, in the fθ lens of this embodiment, the lateral color aberration is well corrected for the respective wavelengths in spite of a very simple structure consisting of only two lens elements in one lens group.

Figure 28A:
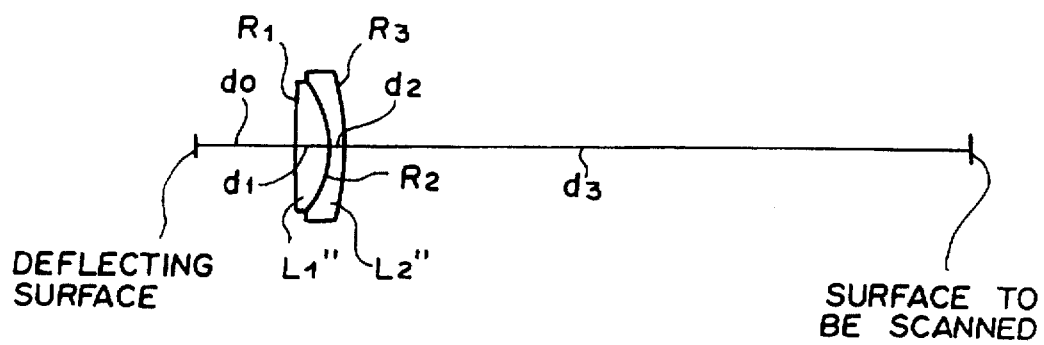
FIG. 28A is a view showing the arrangement of the lens elements in an fθ lens of a fourth embodiment in accordance with the third aspect of the present invention.

In the fourth embodiment shown in FIG. 28A, the factors respectively limited by the formulae (11) and (12) are set close to the upper limits of the ranges respectively defined by the formulae (11) and (12). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 28.

TABLE 28 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.15435 | | |
| 1 | 1.33208 | 0.05788 | $n_{d1}$ 1.56883 | $v_{d1}$ 56.0 |
| 2 | −0.14870 | 0.01929 | $n_{d2}$ 1.72000 | $v_{d2}$ 42.0 |
| 3 | −0.45323 | 0.99074 | | |
| surface scanned | infinity | | | |

| | | |
|---|---|---|
| $n_{d1} = 1.569$, $n_{d2} = 1.720$ | lateral color aberration | $0.106 \times 10^{-3}$ |
| $v_{d1}/v_{d2} = 0.75$ | curvature of field | 0.027 |
| $\phi_1 = 4.21$ | fθ characteristic | 3.00% |
| $d_0 = 0.15435$ | | |

Figure 28B:
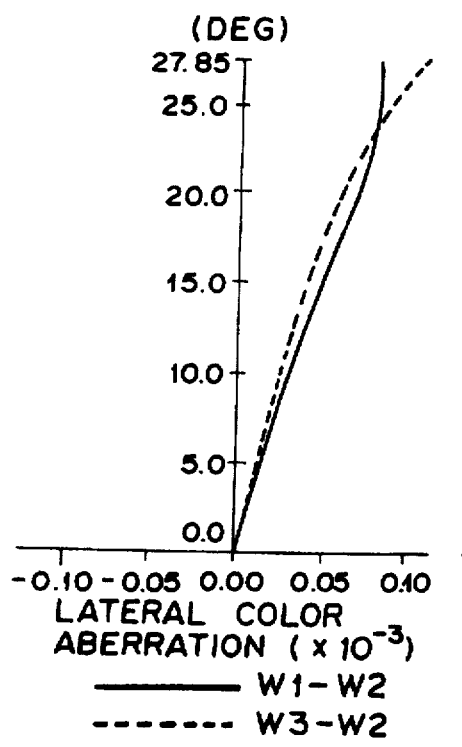
FIG. 28B is a graph showing the lateral color aberration of the fθ lens shown in FIG. 28A for three wavelengths W1, W2 and W3.
Figure 28C:
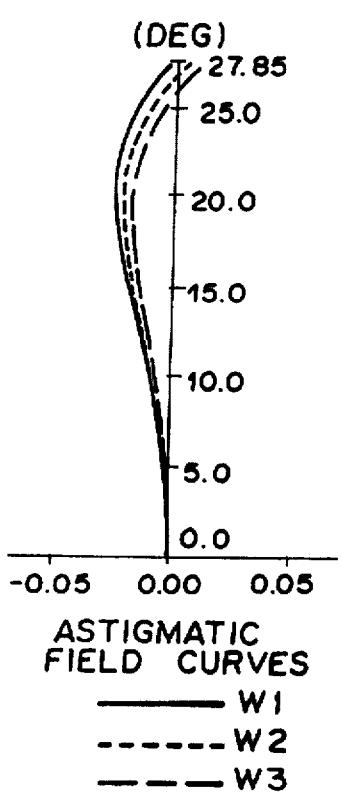
FIG. 28C is a graph showing the astigmatic field curves (curvature of field) of the fθ lens shown in FIG. 28A for the three wavelengths W1, W2 and W3.
Figure 28D:
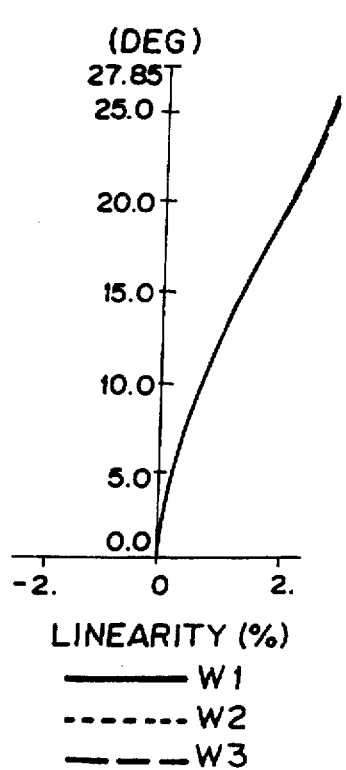
FIG. 28D is a graph showing the linearity (fθ characteristic) of the fθ lens shown in FIG. 28A for the three wavelengths W1, W2 and W3.

FIGS. 28B to 28D respectively show the lateral color aberration, the astigmatic field curves in the scanning direction and the linearity of the fθ lens of the fourth embodiment when laser beams having wavelengths of 680 nm (W1), 532 nm (W2) and 473 nm (W3) enter the fθ lens.

As can be understood from FIGS. 28B to 28D, in the fθ lens of this embodiment, the lateral color aberration is well corrected for the respective wavelengths in spite of a very simple structure consisting of only two lens elements in one lens group.

Figure 29A:
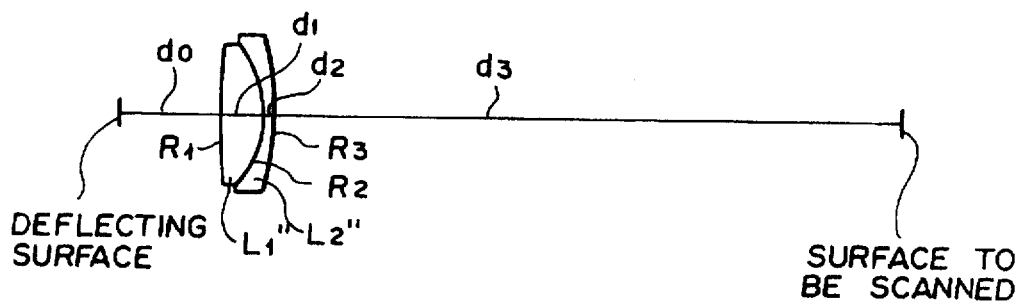
FIG. 29A is a view showing the arrangement of the lens elements in an fθ lens of a fifth embodiment in accordance with the third aspect of the present invention.

In the fifth embodiment shown in FIG. 29A, the Abbe's number $v_{d1}$ of the first lens L1" is smaller than that in the other embodiments. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 29.

TABLE 29 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.16754 | | |
| 1 | 1.62437 | 0.06702 | $n_{d1}$ 1.59270 | $v_{d1}$ 35.5 |
| 2 | −0.17459 | 0.01436 | $n_{d2}$ 1.80518 | $v_{d2}$ 25.5 |
| 3 | −0.43526 | 0.99134 | | |
| surface scanned | infinity | | | |

| | | |
|---|---|---|
| $n_{d1} = 1.593$, $n_{d2} = 1.805$ | lateral color aberration | $0.143 \times 10^{-3}$ |
| $v_{d1}/v_{d2} = 0.72$ | curvature of field | 0.022 |
| $\phi_1 = 3.74$ | fθ characteristic | 2.41% |
| $d_0 = 0.16754$ | | |

Figure 29B:
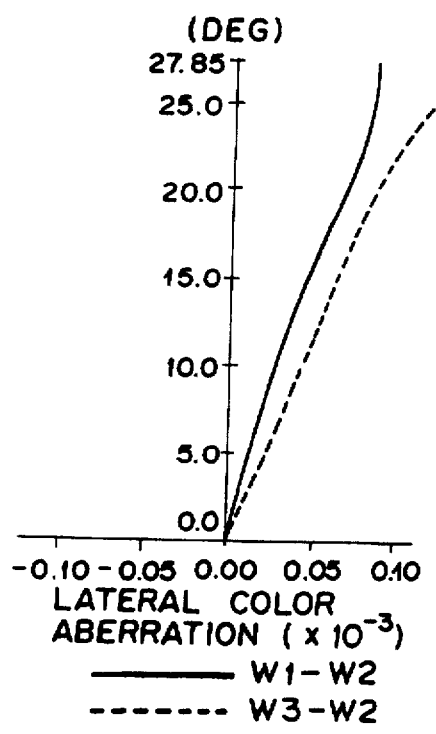
FIG. 29B is a graph showing the lateral color aberration of the fθ lens shown in FIG. 29A for three wavelengths W1, W2 and W3.
Figure 29C:
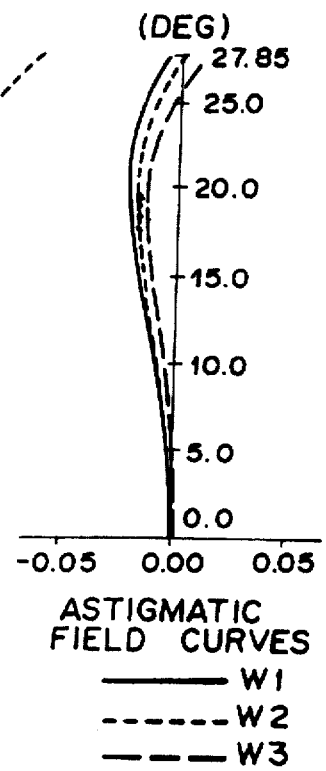
FIG. 29C is a graph showing the astigmatic field curves (curvature of field) of the fθ lens shown in FIG. 29A for the three wavelengths W1, W2 and W3.
Figure 29D:
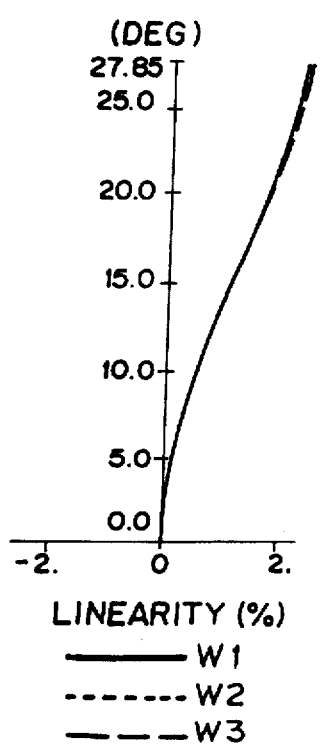
FIG. 29D is a graph showing the linearity (fθ characteristic) of the fθ lens shown in FIG. 29A for the three wavelengths W1, W2 and W3.

FIGS. 29B to 29D respectively show the lateral color aberration, the astigmatic field curves in the scanning direction and the linearity of the fθ lens of the fifth embodiment when laser beams having wavelengths of 680 nm (W1), 532 nm (W2) and 473 nm (W3) enter the fθ lens.

As can be understood from FIGS. 29B to 29D, in the fθ lens of this embodiment, the lateral color aberration is well corrected for the respective wavelengths in spite of such a small Abbe's number of the first lens L1" as shown in table 29 and in spite of a very simple structure consisting of only two lens elements in one lens group.

Figure 30A:
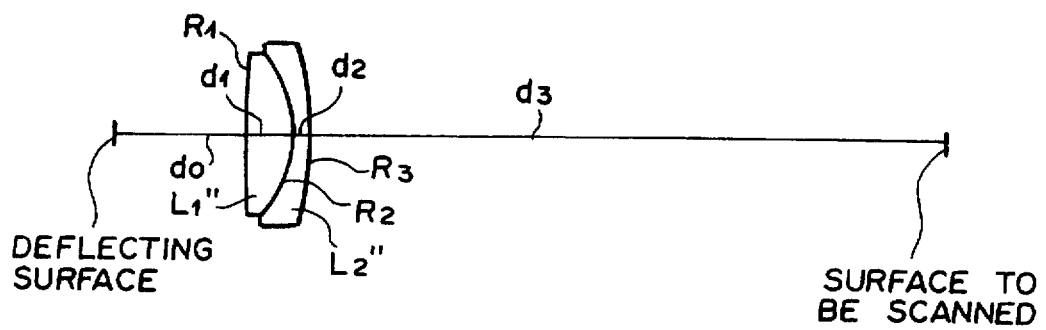
FIG. 30A is a view showing the arrangement of the lens elements in an fθ lens of a sixth embodiment in accordance with the third aspect of the present invention.

In the sixth embodiment shown in FIG. 30A, the refractive index $n_{d1}$ of the first lens L1" is higher than that in the other embodiments. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 30.

TABLE 30 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.20070 | | |
| 1 | 3.17313 | 0.07168 | $n_{d1}$ 1.72000 | $v_{d1}$ 50.3 |
| 2 | −0.19268 | 0.01911 | $n_{d2}$ 1.83400 | $v_{d2}$ 37.3 |
| 3 | −0.61013 | 0.99436 | | |
| surface scanned | infinity | — | | |

| | | |
|---|---|---|
| $n_{d1} = 1.720$, $n_{d2} = 1.834$ | lateral color aberration | $0.143 \times 10^{-3}$ |
| $v_{d1}/v_{d2} = 0.74$ | curvature of field | 0.018 |
| $\phi_1 = 3.95$ | fθ characteristic | 2.06% |
| $d_0 = 0.20070$ | | |

Figure 30B:
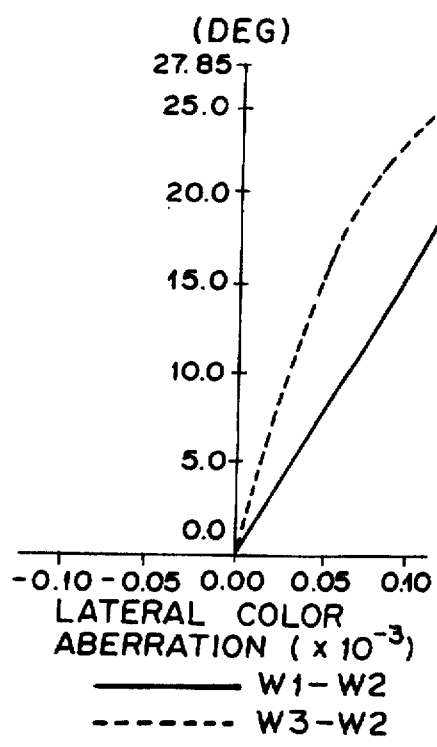
FIG. 30B is a graph showing the lateral color aberration of the fθ lens shown in FIG. 30A for three wavelengths W1, W2 and W3.
Figure 30C:
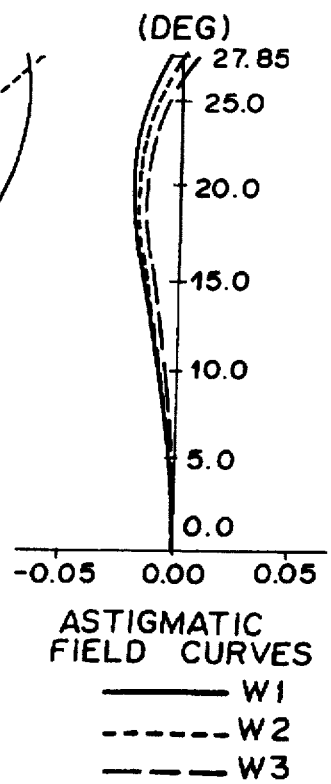
FIG. 30C is a graph showing the astigmatic field curves (curvature of field) of the fθ lens shown in FIG. 30A for the three wavelengths W1, W2 and W3.
Figure 30D:
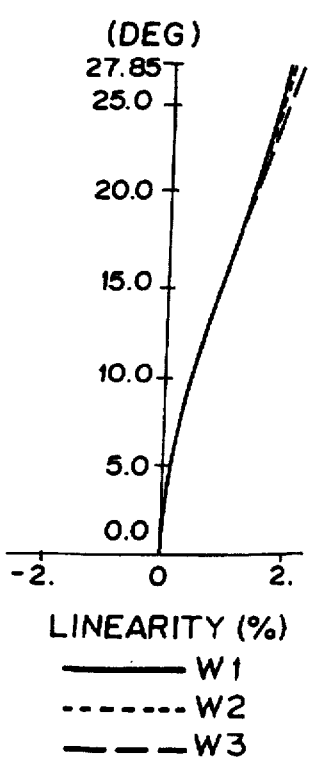
FIG. 30D is a graph showing the linearity (fθ characteristic) of the fθ lens shown in FIG. 30A for the three wavelengths W1, W2 and W3.

FIGS. 30B to 30D respectively show the lateral color aberration, the astigmatic field curves in the scanning direction and the linearity of the fθ lens of the sixth embodiment when laser beams having wavelengths of 680 nm (W1), 532 nm (W2) and 473 nm (W3) enter the fθ lens.

As can be understood from FIGS. 30B to 30D, in the fθ lens of this embodiment, the lateral color aberration is well corrected for the respective wavelengths in spite of such a high refractive index of the first lens L1" as shown in table 30 and in spite of a very simple structure consisting of only two lens elements in one lens group.

Figure 31A:
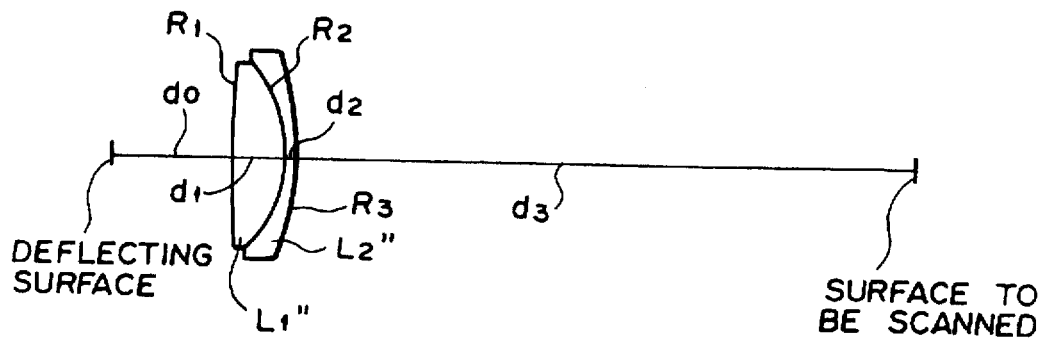
FIG. 31A is a view showing the arrangement of the lens elements in an fθ lens of a seventh embodiment in accordance with the third aspect of the present invention.

In the seventh embodiment shown in FIG. 31A, the factors respectively limited by the formulae (11) and (12) are set substantially at the middle of the ranges respectively defined by the formulae (11) and (12). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 31.

TABLE 31 wavelength W1;810 nm, W2;750 nm, W3;680 nm, angle of view 62.5°

| i | Ri | di | $n_d$ | $v_d$ |
|---|---|---|---|---|
| OBJ | — | infinity | | |
| 0 | infinity | 0.19948 | | |
| 1 | 1.90834 | 0.08976 | $n_{d1}$ 1.51680 | $v_{d1}$ 64.2 |
| 2 | −0.20983 | 0.01995 | $n_{d2}$ 1.71852 | $v_{d2}$ 33.5 |
| 3 | −0.42608 | 0.99160 | | |
| surface scanned | infinity | — | | |

| | | |
|---|---|---|
| $n_{d1} = 1.517$, $n_{d2} = 1.719$ | lateral color aberration | $0.071 \times 10^{-3}$ |
| $v_{d1}/v_{d2} = 0.52$ | curvature of field | 0.024 |
| $\phi_1 = 2.67$ | fθ characteristic | 1.49% |
| $d_0 = 0.19948$ | | |

Figure 31B:
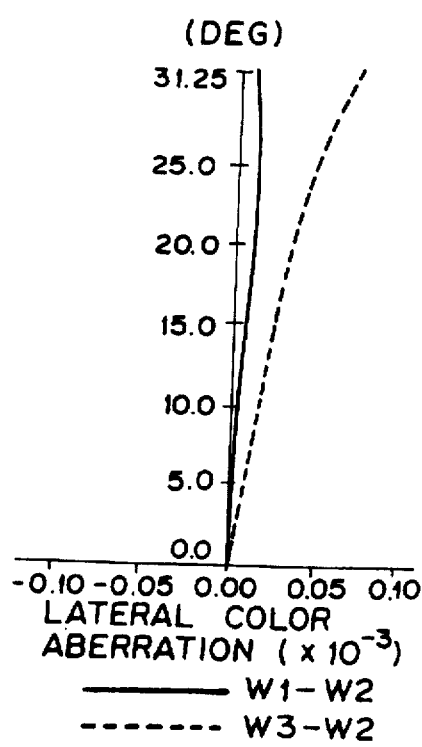
FIG. 31B is a graph showing the lateral color aberration of the fθ lens shown in FIG. 31A for three wavelengths W1, W2 and W3.
Figure 31C:
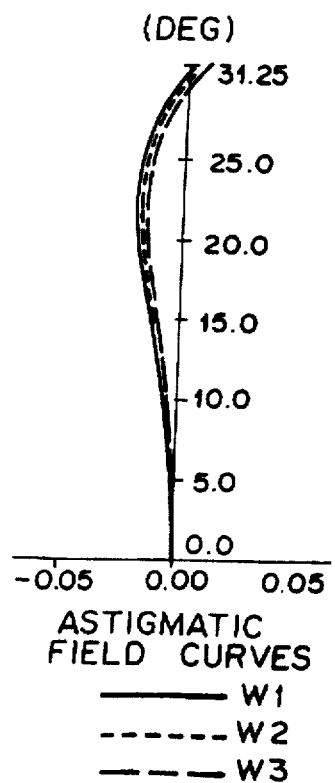
FIG. 31C is a graph showing the astigmatic field curves (curvature of field) of the fθ lens shown in FIG. 31A for the three wavelengths W1, W2 and W3.
Figure 31D:
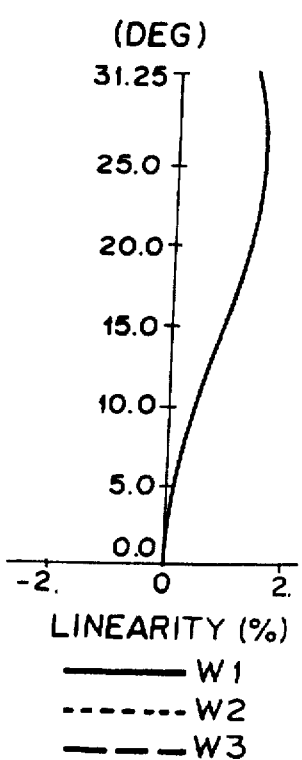
FIG. 31D is a graph showing the linearity (fθ characteristic) of the fθ lens shown in FIG. 31A for the three wavelengths W1, W2 and W3.

FIGS. 31B to 31D respectively show the lateral color aberration, the astigmatic field curves in the scanning direction and the linearity of the fθ lens of the seventh embodiment when laser beams having wavelengths of 810 nm (W1), 750 nm (W2) and 680 nm (W3) which are different from those of the laser beams used in the first to sixth embodiments enter the fθ lens.

As can be understood from FIGS. 31B to 31D, in the fθ lens of this embodiment, the lateral color aberration is well corrected irrespective of wavelength in spite of a very simple structure consisting of only two lens elements in one lens group.

Figure 32A:
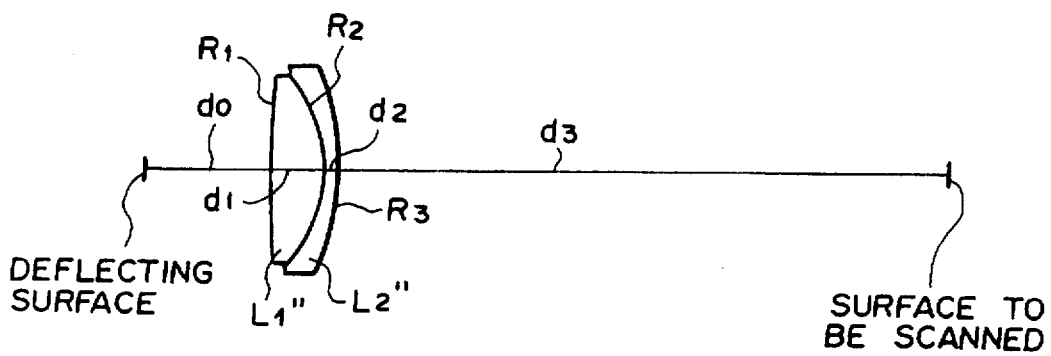
FIG. 32A is a view showing the arrangement of the lens elements in an fθ lens of an eighth embodiment in accordance with the third aspect of the present invention.

In the eighth embodiment shown in FIG. 32A, the factors respectively limited by the formulae (11) and (12) are set substantially at the middle of the ranges respectively defined by the formulae (11) and (12) as in the seventh embodiment. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 32.

TABLE 32 wavelength W1;810 nm, W2;810 nm, W3;750 nm, angle of view 62.5°

| i | Ri | di | $n_d$ | $v_d$ |
|---|---|---|---|---|
| OBJ | — | infinity | | |
| 0 | infinity | 0.19905 | | |
| 1 | 1.64325 | 0.08957 | $n_{d1}$ 1.51742 | $v_{d1}$ 52.2 |
| 2 | −0.20875 | 0.01991 | $n_{d2}$ 1.72825 | $v_{d2}$ 28.3 |
| 3 | −0.43041 | 0.98895 | | |
| surface scanned | infinity | | | |

| | | |
|---|---|---|
| $n_{d1}$ = 1.517, $n_{d2}$ = 1.728 | lateral color aberration | 0.064 × 10⁻³ |
| $v_{d1}/v_{d2}$ = 0.54 | curvature of field | 0.024 |
| φi = 2.71 | fθ characteristic | 1.05% |
| $d_0$ = 0.19905 | | |

Figure 32B:
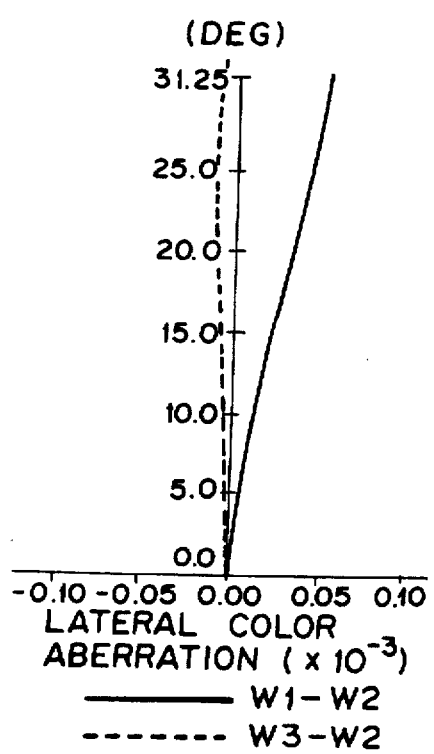
FIG. 32B is a graph showing the lateral color aberration of the fθ lens shown in FIG. 32A for three wavelengths W1, W2 and W3.
Figure 32C:
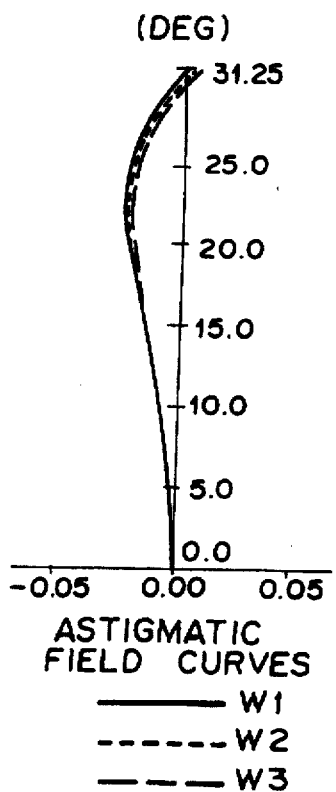
FIG. 32C is a graph showing the astigmatic field curves (curvature of field) of the fθ lens shown in FIG. 32A for the three wavelengths W1, W2 and W3.
Figure 32D:
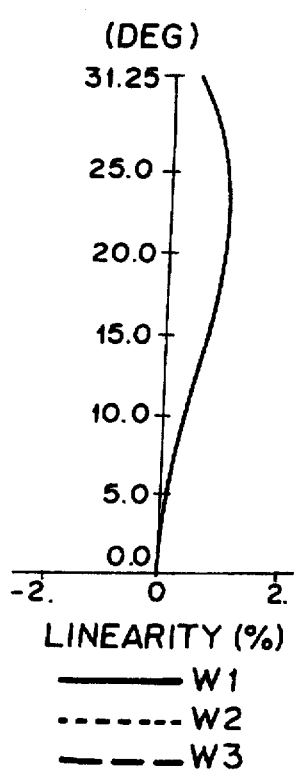
FIG. 32D is a graph showing the linearity (fθ characteristic) of the fθ lens shown in FIG. 32A for the three wavelengths W1, W2 and W3.

FIGS. 32B to 32D respectively show the lateral color aberration, the astigmatic field curves in the scanning direction and the linearity of the fθ lens of the eighth embodiment when laser beams having wavelengths of 870 nm (W1), 810 nm (W2) and 750 nm (W3) which are different from those of the laser beams used in the first to seventh embodiments enter the fθ lens.

As can be understood from FIGS. 32B to 32D, in the fθ lens of this embodiment, the lateral color aberration is well corrected irrespective of wavelength in spite of a very simple structure consisting of only two lens elements in one lens group.

Figure 33A:
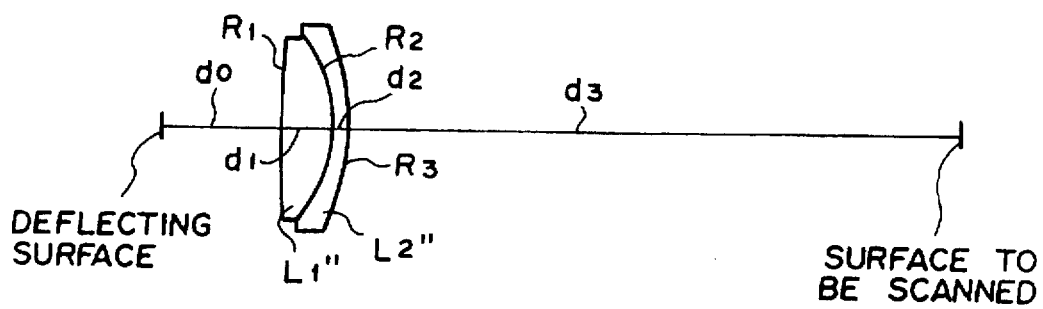
FIG. 33A is a view showing the arrangement of the lens elements in an fθ lens of a ninth embodiment in accordance with the third aspect of the present invention.

In the ninth embodiment shown in FIG. 33A, the factors respectively limited by the formulae (11) and (12) are set substantially at the middle of the ranges respectively defined by the formulae (11) and (12) as in the seventh and eighth embodiments. The radii of curvature R of the refracting surfaces, the axial surface separations d, and the refractive indexes $n_d$ and the Abbe's numbers $v_d$ of the lenses for the sodium d-line in the fθ lens of this embodiment are shown in table 33.

TABLE 33 wavelength W1;890 nm, W2;830 nm, W3;780 nm, angle of view 62.5°

| i | Ri | di | $n_d$ | $v_d$ |
|---|---|---|---|---|
| OBJ | — | infinity | | |
| 0 | infinity | 0.19915 | | |
| 1 | 1.74894 | 0.08962 | $n_{d1}$ 1.51742 | $v_{d1}$ 52.2 |
| 2 | −0.21778 | 0.01991 | $n_{d2}$ 1.80518 | $v_{d2}$ 25.5 |
| 3 | −0.40058 | 0.99321 | | |
| surface scanned | infinity | — | | |

| | | |
|---|---|---|
| $n_{d1}$ = 1.517, $n_{d2}$ = 1.805 | lateral color aberration | 0.028 × 10⁻³ |
| $v_{d1}/v_{d2}$ = 0.49 | curvature of field | 0.022 |
| φi = 2.59 | fθ characteristic | 1.13% |
| $d_0$ = 0.19915 | | |

Figure 33B:
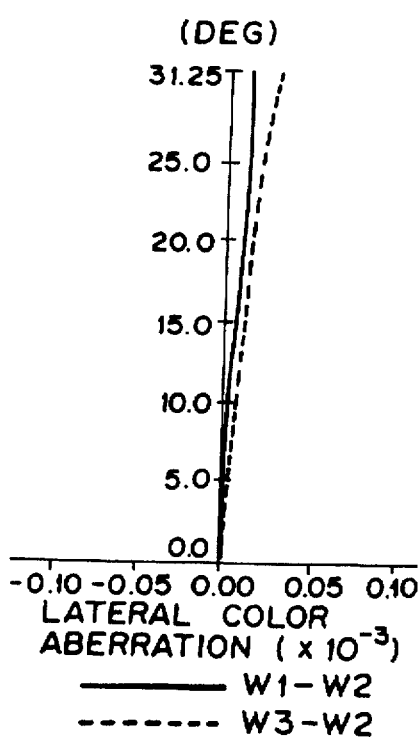
FIG. 33B is a graph showing the lateral color aberration of the fθ lens shown in FIG. 33A for three wavelengths W1, W2 and W3.
Figure 33C:
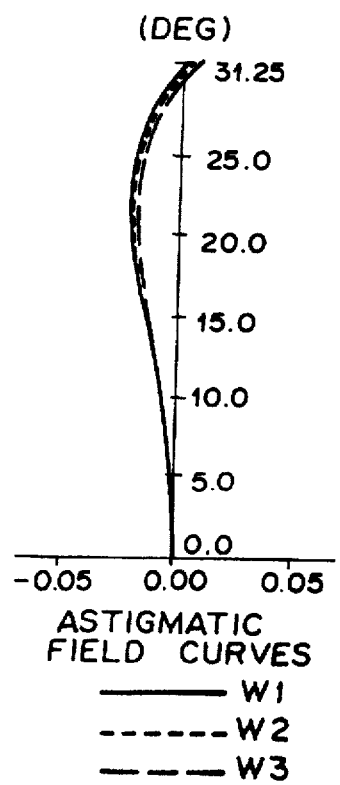
FIG. 33C is a graph showing the astigmatic field curves (curvature of field) of the fθ lens shown in FIG. 33A for the three wavelengths W1, W2 and W3.
Figure 33D:
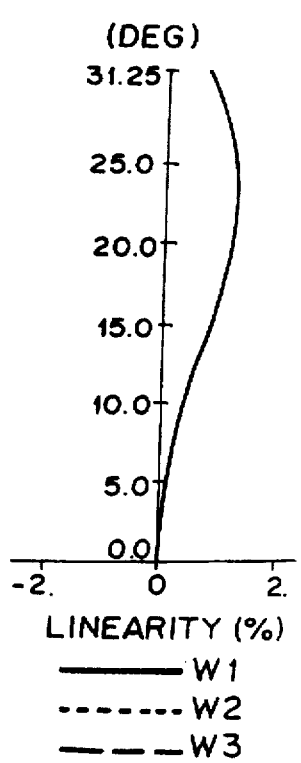
FIG. 33D is a graph showing the linearity (fθ characteristic) of the fθ lens shown in FIG. 33A for the three wavelengths W1, W2 and W3.

FIGS. 33B to 33D respectively show the lateral color aberration, the astigmatic field curves in the scanning direction and the linearity of the fθ lens of the ninth embodiment when laser beams having wavelengths of 890 nm (W1), 830 nm (W2) and 780 nm (W3) which are different from those of the laser beams used in the first to eighth embodiments enter the fθ lens.

As can be understood from FIGS. 33B to 33D, in the fθ lens of this embodiment, the lateral color aberration is well corrected irrespective of wavelength in spite of a very simple structure consisting of only two lens elements in one lens group.

As can be understood from the description above, in the fθ lens in accordance with the third aspect of the present invention, the color aberration can be corrected with a high accuracy over a wide wavelength range, and accordingly, the error in superimposing the beam spots can be reduced in the scanning optical system or the like using a plurality of laser beams having different wavelengths. Further since being very simple in structure, the fθ lens in accordance with the third aspect of the present invention can be manufactured at low cost, and at the same time, the scanning optical system can be small in size, assembly of the fθ lens is facilitated and the error in assembly can be reduced.

The fθ lens in accordance with the third aspect of the present invention need not be limited to those described above but may be variously modified so long as the formulae (10) to (12) are satisfied.

Figure 34A:
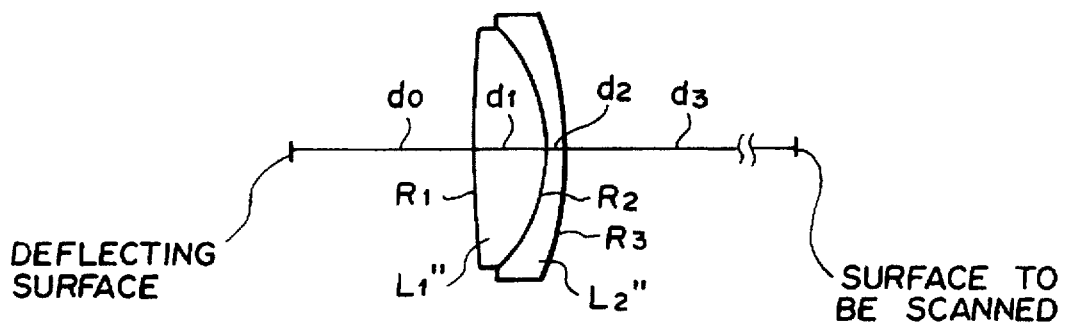
FIG. 34A is a view showing the arrangement of the lens elements in an fθ lens of a tenth embodiment in accordance with the third aspect of the present invention.
Figure 35A:
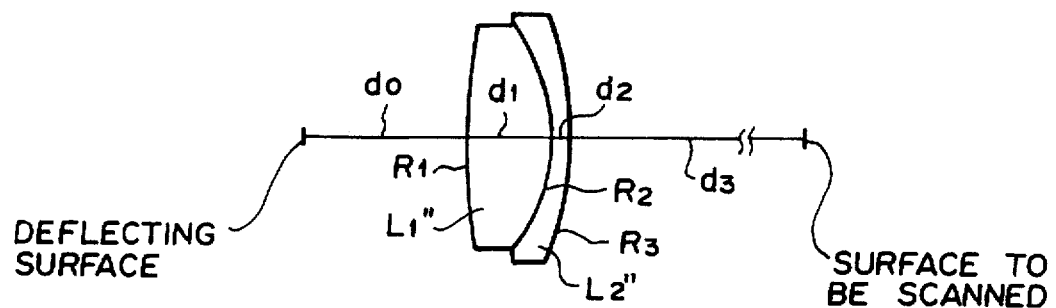
FIG. 35A is a view showing the arrangement of the lens elements in an fθ lens of a eleventh embodiment in accordance with the third aspect of the present invention.

The fθ lenses of tenth and eleventh embodiments shown in FIGS. 34A and 35A comprise an aspheric lens represented by the formula (13).

In the tenth embodiment shown in FIG. 34A, the second surface of the second lens L2" (the exit surface) is an aspheric surface as shown in table 34. Further, the factors respectively limited by the formulae (11) and (12) are set substantially at the middle of the ranges respectively defined by the formulae (11) and (12). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 34.

TABLE 34 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.21449 | | |
| 1 | 1.58428 | 0.08580 | $n_{d1}$ 1.49700 | $v_{d1}$ 81.6 |
| 2 | −0.19942 | 0.02383 | $n_{d2}$ 1.65844 | $v_{d2}$ 50.9 |
| 3 | −0.43956★ | 0.98901 | | |
| surface scanned | infinity | — | | |

| | | |
|---|---|---|
| $n_{d1}$ = 1.497, $n_{d2}$ = 1.658 | lateral color aberration | 0.057 × 10⁻³ |
| $v_{d1}/v_{d2}$ = 0.62 | curvature of field | 0.003 |
| φi = 2.77 | fθ characteristic | 1.00% |
| $d_0$ = 0.21449 | | |
| k = 1.02636 $a_1$ = 1.74145 $a_2$ = −0.88321 | | |
| $a_3$ = 0.41777 × 10³ $a_4$ = −0.61915 × 10⁴ | | |

Figure 34B:
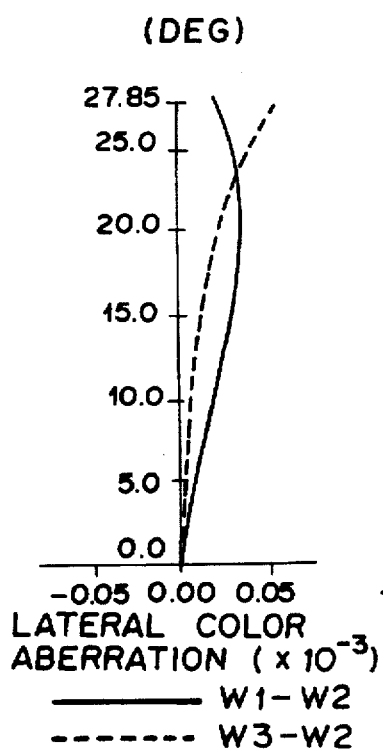
FIG. 34B is a graph showing the lateral color aberration of the fθ lens shown in FIG. 34A for three wavelengths W1, W2 and W3.
Figure 34C:
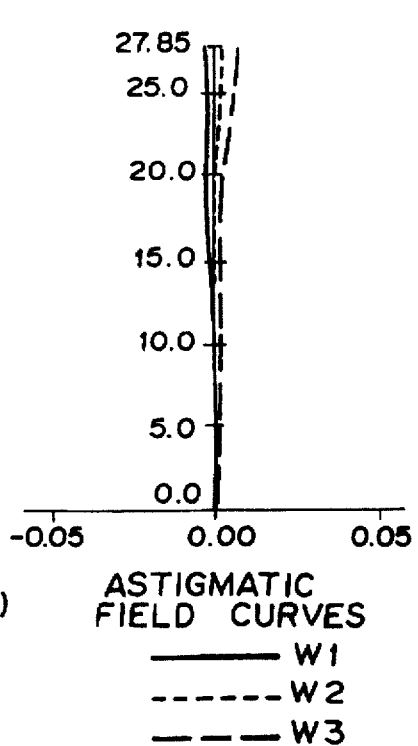
FIG. 34C is a graph showing the astigmatic field curves (curvature of field) of the fθ lens shown in FIG. 34A for the three wavelengths W1, W2 and W3.
Figure 34D:
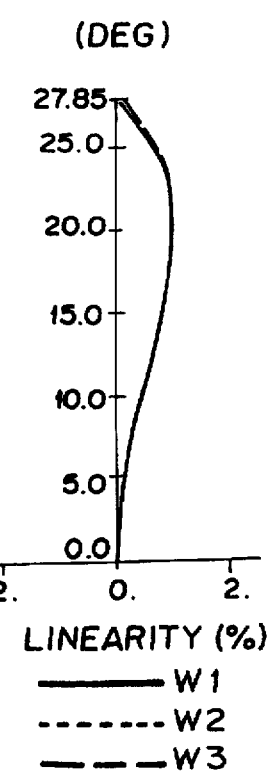
FIG. 34D is a graph showing the linearity (fθ characteristic) of the fθ lens shown in FIG. 34A for the three wavelengths W1, W2 and W3.

FIGS. 34B to 34D respectively show the lateral color aberration, the astigmatic field curves in the scanning direction and the linearity of the fθ lens of the tenth embodiment when laser beams having wavelengths of 680 nm (W1), 532 nm (W2) and 473 nm (W3) enter the fθ lens.

As can be understood from FIGS. 34B to 34D, in the fθ lens of this embodiment, the lateral color aberration is well corrected for the respective wavelengths irrespective of a very simple structure consisting of only two lens elements in one lens group.

In the eleventh embodiment shown in FIG. 35A, the first surface of the first lens L1" (the entrance surface) is an aspheric surface as shown in table 35. Further, the factors respectively limited by the formulae (11) and (12) are set substantially at the middle of the ranges respectively defined by the formulae (11) and (12). The radii of curvature R of the refracting surfaces, the axial surface separations d, and the refractive indexes $n_d$ and the Abbe's numbers $v_d$ of the lenses for the sodium d-line in the fθ lens of this embodiment are shown in table 35.

TABLE 35 wavelength W1;680 nm, W2;532 nm, W3;473 nm, angle of view 55.7°

| i | Ri | di | $n_d$ | $v_d$ |
|---|---|---|---|---|
| OBJ | — | infinity | | |
| 0 | infinity | 0.18333 | | |
| 1 | 0.89104★ | 0.09532 | $n_{d1}$ 1.48749 | $v_{d1}$ 70.4 |
| 2 | −0.20918 | 0.01906 | $n_{d2}$ 1.74400 | $v_{d2}$ 44.7 |
| 3 | −0.44194 | 0.97190 | | |
| surface scanned | infinity | — | | |

Figure 35B:
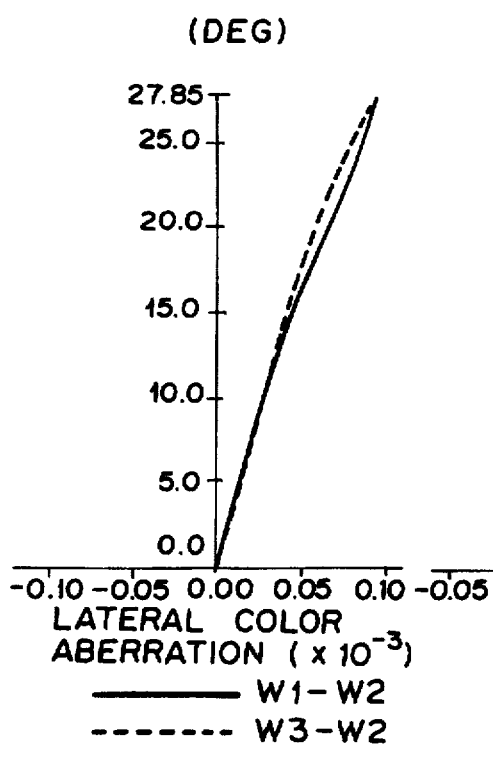
FIG. 35B is a graph showing the lateral color aberration of the fθ lens shown in FIG. 35A for three wavelengths W1, W2 and W3.
Figure 35C:
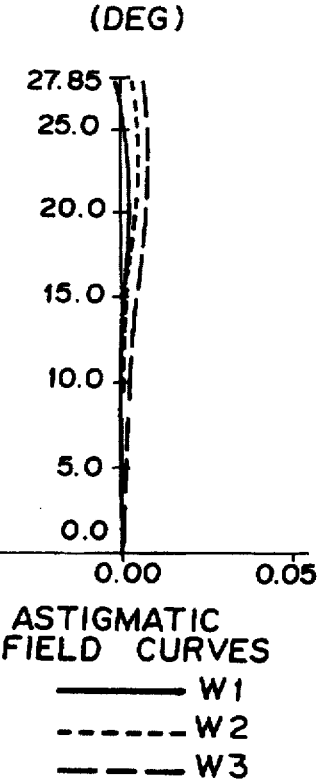
FIG. 35C is a graph showing the astigmatic field curves (curvature of field) of the fθ lens shown in FIG. 35A for the three wavelengths W1, W2 and W3.
Figure 35D:
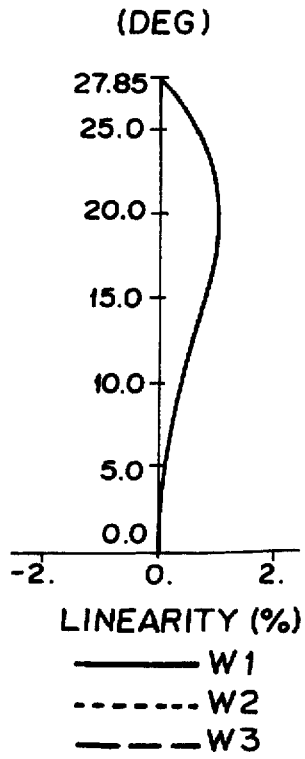
FIG. 35D is a graph showing the linearity (fθ characteristic) of the fθ lens shown in FIG. 35A for the three wavelengths W1, W2 and W3.

$n_{d1} = 1.487$, $n_{d2} = 1.744$   lateral color aberration   $0.096 \times 10^{-3}$
$v_{d1}/v_{d2} = 0.63$   curvature of field   0.005
$\phi_i = 2.81$   fθ characteristic   1.02%
$d_0 = 0.18333$
$k = -18.4838$   $a_1 = 0.3965$   $a_2 = 35.0041$   $a_3 = 0$   $a_4 = 0$ FIGS. 35B to 35D respectively show the lateral color aberration, the astigmatic field curves in the scanning direction and the linearity of the fθ lens of the eleventh embodiment when laser beams having wavelengths of 680 nm (W1), 532 nm (W2) and 473 nm (W3) enter the fθ lens.

As can be understood from FIGS. 35B to 35D, in the fθ lens of this embodiment, the lateral color aberration is well corrected for the respective wavelengths irrespective of a very simple structure consisting of only two lens elements in one lens group.

What is claimed is:

1. An fθ lens of an optical system employing a plurality of laser beams each having a different wavelength, said fθ lens comprising: a first lens group which consists of a first lens having a negative or positive refracting power, and a second lens group which consists of a second lens having a positive refracting power and a third lens having a negative refracting power, the second and third lenses being cemented together, the second lens group having a positive refracting power as a whole, wherein the first and second lens groups are arranged in this order from the entrance pupil side and satisfy the following formulae (1) to (4), $$12 \leq v_{d2} - v_{d3} \tag{1}$$

$$-0.035 \leq \Sigma(\phi_i/v_{di}) \leq 0.005 \tag{2}$$

$$0.7 \leq \phi_{23} \leq 2.0 \tag{3}$$

$$0.03 \leq d_{12} \leq 0.20 \tag{4}$$

wherein $\phi_i$ represents power of i-th lens as numbered from the entrance pupil side standardized based on power of the system, $\phi_{23}$ represents power of the second lens group standardized based on the power of the system, $v_{di}$ represents the Abbe's number for the sodium d-line of the i-th lens as numbered from the entrance pupil side and $d_{12}$ represents surface separation between the first and second lens groups standardized based on a focal length of the system.

2. An fθ lens of an optical system employing a plurality of laser beams each having a different wavelength, said fθ lens comprising: first and second lens groups arranged in this order from an entrance pupil side, the first lens group consisting of first and second lenses cemented together, the refracting powers of the first and second lenses being One of the combinations of negative and positive, positive and positive, and positive and negative, the second lens group consisting of a third lens having a positive or negative refracting power, wherein the first and second lens groups satisfy the following formulae (5) to (9), $$2 \leq |v_{d1} - v_{d2}| \tag{5}$$

$$-0.020 \leq \Sigma(\phi_i/v_{di}) \leq 0.005 \tag{6}$$

$$35 \leq v_{dL} \tag{7}$$

$$1.0 \leq \phi_{12} \leq 2.5 \tag{8}$$

$$0.01 \leq d_{12} \leq 0.22 \tag{9}$$

wherein $\phi_i$ represents power of i-th lens as numbered from the entrance pupil side standardized based on power of the system, $\phi_{12}$ represents power of the first lens group standardized based on the power of the system, $v_{di}$ represents the Abbe's number for the sodium d-line of the i-th lens as numbered from the entrance pupil side, $v_{dL}$ represents the Abbe's number for the sodium d-line of one of the first and second lenses having the smaller dispersive power than the other, and $d_{12}$ represents surface separation between the first and second lens groups standardized based on a focal length of the system.

3. An fθ lens in an optical system for scanning light emanating from a deflecting point comprising a plurality of laser beams each having a different wavelength, said fθ lens comprising: a first lens having a positive refracting power and a second lens having a negative refracting power, the first and second lenses being cemented together and the first lens being positioned on an entrance pupil side, wherein the first and second lens satisfy the following formulae (10) to (12), $$n_{d1} < n_{d2} \tag{10}$$

$$0.4 \leq v_{d2}/v_{d1} \leq 0.8 \tag{11}$$

$$1.5 \leq \phi_1 \leq 4.7 \tag{12}$$

wherein $n_{d1}$ and $n_{d2}$ respectively represent refractive indices for the sodium d-line of the first and second lenses, $v_{d1}$ and $v_{d2}$ respectively represent the Abbe's numbers for the sodium d-line of the first and second lenses, and $\phi_1$ represents power of the first lens standardized based on the power of the system, said fθ lens being used in a position where a distance between a deflecting point and the entrance pupil side surface of the first lens standardized based on a focal length of the system is in the range of 0.1 to 0.4 inclusive.

* * * * *